(12) United States Patent
Gharabegian

(10) Patent No.: US 10,912,357 B2
(45) Date of Patent: *Feb. 9, 2021

(54) REMOTE CONTROL OF SHADING OBJECT AND/OR INTELLIGENT UMBRELLA

(71) Applicant: Armen Sevada Gharabegian, Glendale, CA (US)

(72) Inventor: Armen Sevada Gharabegian, Glendale, CA (US)

(73) Assignee: Shadecraft, LLC, Glendale, CA (US)

( * ) Notice: Subject to any disclaimer, the term of this patent is extended or adjusted under 35 U.S.C. 154(b) by 579 days.

This patent is subject to a terminal disclaimer.

(21) Appl. No.: 15/225,838

(22) Filed: Aug. 2, 2016

(65) Prior Publication Data

US 2017/0318924 A1    Nov. 9, 2017

Related U.S. Application Data

(63) Continuation-in-part of application No. 15/219,292, filed on Jul. 26, 2016, which is a continuation-in-part
(Continued)

(51) Int. Cl.
*A45B 25/14* (2006.01)
*A45B 23/00* (2006.01)
(Continued)

(52) U.S. Cl.
CPC ............ *A45B 25/143* (2013.01); *A45B 17/00* (2013.01); *A45B 23/00* (2013.01); *A45B 25/18* (2013.01);
(Continued)

(58) Field of Classification Search
CPC ....... A45B 25/143; A45B 25/18; A45B 23/00; A45B 17/00; A45B 2200/1018;
(Continued)

(56) References Cited

U.S. PATENT DOCUMENTS

| 138,774 A | 6/1873 | Whitcomb |
| 2,070,045 A | 2/1937 | Gilpin |

(Continued)

FOREIGN PATENT DOCUMENTS

| CH | 203073199 | 7/2013 |
| CN | 102258250 | 11/2011 |

(Continued)

OTHER PUBLICATIONS

McDonald E. et al. "Smart Umbrella Senior Design II Documentation" Dept. Electrical Engineering and Computer Science, University of Central Florida, Fall 2015—Senior Design II, Group #9 (Year: 2015).*

(Continued)

*Primary Examiner* — Richard A Hansell, Jr.

(57) ABSTRACT

An intelligent shading umbrella includes a processor, a base assembly, a stem assembly coupled to a base assembly and a central support assembly coupled to a stem assembly, the central support assembly including one or more arm support assemblies. The intelligent shading umbrella further comprises one or more blades, coupled to the arm support assemblies. The intelligent shading umbrella further comprises an infrared receiver, the infrared receiver receiving signals from a remote device and communicating signals to control movement of the intelligent shading umbrella.

10 Claims, 46 Drawing Sheets

Related U.S. Application Data of application No. 15/214,471, filed on Jul. 20, 2016, which is a continuation-in-part of application No. 15/212,173, filed on Jul. 15, 2016, which is a continuation-in-part of application No. 15/160,856, filed on May 20, 2016, now Pat. No. 9,949,540.

(60) Provisional application No. 62/333,822, filed on May 9, 2016.

(51) Int. Cl.

| | | |
|---|---|---|
| *A45B 17/00* | (2006.01) | |
| *G08C 23/04* | (2006.01) | |
| *G05B 15/02* | (2006.01) | |
| *A45B 25/18* | (2006.01) | |

(52) U.S. Cl.
CPC ............. *G05B 15/02* (2013.01); *G08C 23/04* (2013.01); *A45B 2017/005* (2013.01); *A45B 2023/0012* (2013.01); *A45B 2200/1009* (2013.01); *A45B 2200/1018* (2013.01); *A45B 2200/1027* (2013.01)

(58) Field of Classification Search
CPC .... A45B 2200/1009; A45B 2023/0012; A45B 2200/1027; A45B 2017/005; G05B 15/02; G08C 23/04
See application file for complete search history.

(56) References Cited

U.S. PATENT DOCUMENTS

| | | |
|---|---|---|
| 2,087,537 A | 7/1937 | Finkel |
| 2,485,118 A | 10/1949 | Simpson |
| 2,960,094 A | 11/1960 | Small |
| 3,028,856 A | 4/1962 | Daymon |
| 3,917,942 A | 11/1975 | McCay |
| 4,107,521 A | 8/1978 | Winders |
| 4,174,532 A | 11/1979 | Kelley |
| 4,215,410 A | 7/1980 | Weslow et al. |
| 4,684,230 A | 8/1987 | Smith |
| 4,787,019 A | 11/1988 | van den Broeke |
| 4,915,670 A | 4/1990 | Nesbit |
| 5,002,082 A | 3/1991 | Roder |
| 5,007,811 A | 4/1991 | Hopkins |
| 5,029,239 A | 7/1991 | Nesbit |
| 5,161,561 A | 11/1992 | Jamieson |
| 5,213,122 A | 5/1993 | Grady, II |
| 5,273,062 A | 12/1993 | Mozdzanowski |
| 5,275,364 A | 1/1994 | Burger et al. |
| 5,318,055 A | 6/1994 | Olaniyan |
| 5,321,579 A | 6/1994 | Brown et al. |
| 5,349,975 A | 9/1994 | Valdner |
| 5,683,064 A | 11/1997 | Copeland et al. |
| 5,868,152 A * | 2/1999 | Brown .................... A45B 3/00 135/19 |
| 5,979,793 A | 11/1999 | Louis |
| 5,996,511 A | 12/1999 | Swoger |
| 6,017,188 A | 1/2000 | Benton |
| 6,027,309 A | 2/2000 | Rawls et al. |
| 6,058,951 A | 5/2000 | Wilson |
| 6,113,054 A | 9/2000 | Ma |
| 6,134,103 A | 10/2000 | Ghanma |
| 6,138,970 A | 10/2000 | Sohrt et al. |
| 6,158,701 A | 12/2000 | Deshler |
| 6,199,570 B1 | 3/2001 | Patarra |
| 6,298,866 B1 | 10/2001 | Molnar, IV |
| 6,302,560 B1 | 10/2001 | Lai |
| 6,347,776 B1 | 2/2002 | Chuang |
| 6,374,840 B1 | 4/2002 | Ma |
| 6,397,869 B1 | 6/2002 | Jennings |
| 6,405,742 B1 | 6/2002 | Driscoll |
| 6,412,889 B1 | 7/2002 | Hummell et al. |
| 6,439,249 B1 | 8/2002 | Spatafora et al. |
| 6,446,650 B1 | 9/2002 | Ma |
| 6,453,621 B1 | 9/2002 | Bundy et al. |
| 6,488,254 B2 | 12/2002 | Li |
| 6,511,033 B2 | 1/2003 | Li |
| 6,519,144 B1 | 2/2003 | Henrie et al. |
| 6,536,721 B1 | 3/2003 | Kao |
| 6,554,012 B2 | 4/2003 | Paterra |
| 6,565,060 B2 | 5/2003 | Li |
| 6,575,183 B2 | 6/2003 | Tung |
| 6,585,219 B2 | 7/2003 | Li |
| 6,598,990 B2 | 7/2003 | Li |
| 6,612,713 B1 | 9/2003 | Kuelbs |
| 6,636,918 B1 | 10/2003 | Aguilar et al. |
| 6,637,717 B2 | 10/2003 | Li |
| 6,666,284 B2 | 12/2003 | Stirm |
| 6,692,135 B2 | 2/2004 | Li |
| 6,785,789 B1 | 8/2004 | Kekre et al. |
| 6,830,058 B2 | 11/2004 | Li |
| 6,837,255 B2 | 1/2005 | Bunch |
| 6,840,657 B2 | 1/2005 | Tung |
| 6,845,780 B2 | 1/2005 | Bishirjian |
| 6,966,667 B2 | 1/2005 | Li |
| 6,959,996 B2 | 7/2005 | Ip |
| 6,923,193 B2 | 8/2005 | Chen |
| 6,923,194 B2 | 8/2005 | Li |
| 6,941,958 B1 | 9/2005 | Sobek et al. |
| 6,945,263 B2 | 9/2005 | Li |
| 6,961,237 B2 | 11/2005 | Dickie |
| 7,003,217 B2 | 2/2006 | Bachinski et al. |
| 7,013,903 B2 | 3/2006 | Li |
| 7,017,598 B2 | 3/2006 | Nipke |
| D518,629 S | 4/2006 | Ma |
| 7,034,902 B2 | 4/2006 | Tajima |
| 7,108,388 B2 | 9/2006 | Li |
| 7,111,954 B1 | 9/2006 | Lai |
| 7,128,076 B2 | 10/2006 | Freedman |
| 7,051,744 B2 | 11/2006 | Hung |
| 7,134,442 B2 | 11/2006 | Ma |
| 7,134,762 B2 | 11/2006 | Ma |
| 7,143,501 B2 | 12/2006 | Bramson et al. |
| 7,163,042 B2 | 1/2007 | Li |
| 7,188,633 B2 | 3/2007 | Zerillo |
| D539,632 S | 4/2007 | Ma |
| D558,444 S | 1/2008 | Ma |
| 7,331,684 B2 | 2/2008 | Tung |
| 7,407,178 B2 | 8/2008 | Freedman |
| 7,412,985 B2 | 8/2008 | Ma |
| 7,422,343 B2 | 9/2008 | Li |
| 7,431,469 B2 | 10/2008 | Li |
| 7,481,547 B2 | 1/2009 | Li |
| 7,493,909 B2 | 2/2009 | Ma |
| 7,497,225 B1 | 3/2009 | Klein, Jr. et al. |
| 7,497,583 B2 | 3/2009 | Ma |
| 7,513,479 B2 | 4/2009 | Li |
| 7,533,680 B2 | 5/2009 | Ma |
| 7,559,520 B2 | 7/2009 | Quijano et al. |
| 7,562,667 B2 | 7/2009 | Li |
| 7,593,220 B2 | 9/2009 | Proctor et al. |
| 7,604,015 B2 | 10/2009 | Fraser |
| 7,628,164 B2 | 12/2009 | Joen-an Ma |
| 7,641,165 B2 | 1/2010 | Li |
| 7,650,230 B1 | 1/2010 | Laverick et al. |
| 7,703,464 B2 | 4/2010 | Ma |
| 7,708,022 B2 | 5/2010 | Joen-an Ma |
| 7,726,326 B2 | 6/2010 | O'Donnell |
| 7,740,022 B2 | 6/2010 | Li |
| 7,755,970 B2 | 7/2010 | Welker et al. |
| 7,778,624 B2 | 8/2010 | Li |
| 7,784,761 B2 | 8/2010 | Ma |
| 7,798,161 B2 | 9/2010 | Ma |
| D626,324 S | 11/2010 | Ma |
| 7,856,996 B2 | 12/2010 | Ma |
| 7,861,734 B2 | 1/2011 | Ma |
| 7,891,367 B2 | 2/2011 | Ma |
| 7,891,633 B2 | 2/2011 | Li |
| 7,900,643 B2 | 3/2011 | Ma |
| 7,926,496 B2 | 4/2011 | Young et al. |
| 7,926,497 B2 | 4/2011 | Young et al. |
| 7,938,132 B2 | 5/2011 | Li |

(56) References Cited

U.S. PATENT DOCUMENTS

| | | |
|---|---|---|
| 7,963,293 B2 | 6/2011 | Ma |
| 7,963,295 B2 | 6/2011 | Li |
| 7,975,711 B2 | 7/2011 | Li |
| 8,015,988 B2 | 9/2011 | Li |
| 8,020,572 B2 | 9/2011 | Ma |
| 8,025,071 B2 | 9/2011 | Ma |
| 8,061,374 B2 | 11/2011 | Li |
| 8,061,375 B2 | 11/2011 | Ma |
| 8,066,021 B2 | 11/2011 | Ma |
| 8,069,868 B2 | 12/2011 | Kuelbs |
| 8,082,935 B2 | 12/2011 | Ma |
| 8,104,491 B2 | 1/2012 | Li |
| 8,267,104 B2 | 1/2012 | Li |
| 8,116,497 B2 | 2/2012 | Li |
| 8,118,045 B2 | 2/2012 | Li |
| 8,118,046 B2 | 2/2012 | Li |
| D660,137 S | 5/2012 | Ma |
| 8,166,986 B2 | 5/2012 | Ma |
| 8,169,921 B2 | 5/2012 | Yang et al. |
| 8,205,656 B2 | 6/2012 | Ma |
| 8,251,078 B2 | 8/2012 | Ma |
| 8,291,923 B2 | 10/2012 | Young et al. |
| 8,297,294 B2 | 10/2012 | Li |
| 8,331,598 B2 | 12/2012 | Li |
| 8,345,889 B2 | 1/2013 | Li |
| 8,356,613 B2 | 1/2013 | Ma |
| 8,360,079 B2 | 1/2013 | Li |
| 8,387,641 B1 | 3/2013 | Ilan |
| 8,393,341 B2 | 3/2013 | Li |
| 8,413,671 B2 * | 4/2013 | Li ........................ A45B 23/00 135/16 |
| 8,444,104 B2 | 5/2013 | Li |
| 8,453,659 B2 | 6/2013 | Li |
| 8,522,806 B2 | 9/2013 | Li |
| 8,555,905 B2 | 10/2013 | Ma |
| 8,555,906 B2 | 10/2013 | Ma |
| 8,616,226 B2 | 12/2013 | Ma et al. |
| D697,705 S | 1/2014 | Ma |
| 8,632,045 B2 | 1/2014 | Ma |
| 8,636,020 B2 | 1/2014 | Li |
| 8,657,246 B2 | 2/2014 | Ma |
| 8,672,287 B2 | 3/2014 | Li |
| 8,727,555 B2 | 5/2014 | Kuelbs |
| 8,740,170 B2 | 6/2014 | Li |
| 8,919,722 B2 | 6/2014 | Ma |
| 8,794,781 B2 | 8/2014 | Kuelbs |
| 8,851,093 B2 | 10/2014 | Li |
| D719,342 S | 12/2014 | Ma |
| D719,343 S | 12/2014 | Ma |
| 8,910,646 B2 | 12/2014 | Li |
| 8,919,361 B2 | 12/2014 | Ma |
| 8,960,625 B2 | 2/2015 | Ma |
| D724,309 S | 3/2015 | Ma |
| 8,983,534 B2 * | 3/2015 | Patel ........................ G08C 17/02 340/5.25 |
| 9,030,829 B2 | 5/2015 | Ma |
| D731,166 S | 6/2015 | Ma |
| 9,078,497 B2 | 7/2015 | Ma |
| 9,113,683 B2 | 8/2015 | Ma |
| D738,609 S | 9/2015 | Ma |
| D738,610 S | 9/2015 | Ma |
| 9,125,462 B2 | 9/2015 | Akin |
| 9,192,215 B2 | 11/2015 | Ma |
| 9,220,325 B2 | 12/2015 | Ma |
| 9,222,693 B2 | 12/2015 | Gourlay et al. |
| 9,237,785 B2 | 1/2016 | Ma |
| 9,241,549 B2 | 1/2016 | Ma |
| 9,289,039 B2 | 3/2016 | Akin |
| 9,345,295 B2 | 5/2016 | Li |
| 9,510,653 B2 | 12/2016 | Akin |
| 2001/0001083 A1 | 5/2001 | Helot |
| 2002/0074027 A1 | 6/2002 | Maidment |
| 2002/0078985 A1 | 6/2002 | Farr |
| 2002/0144721 A1 | 10/2002 | Kronin et al. |
| 2002/0185582 A1 | 12/2002 | Li |
| 2003/0000557 A1 | 1/2003 | Lai |
| 2003/0000559 A1 | 1/2003 | Wu |
| 2003/0192579 A1 | 10/2003 | Llamas Garijo |
| 2004/0055627 A1 | 3/2004 | P Moga |
| 2004/0103934 A1 | 6/2004 | Szumlic |
| 2004/0154653 A1 | 8/2004 | Brutsaert |
| 2004/0228118 A1 | 11/2004 | Peterson |
| 2004/0240167 A1 | 12/2004 | Ledbetter et al. |
| 2004/0261827 A1 | 12/2004 | Chen |
| 2005/0016571 A1 | 1/2005 | Wu |
| 2005/0072451 A1 | 4/2005 | Vivian et al. |
| 2005/0161067 A1 | 7/2005 | Hollins |
| 2005/0279396 A1 | 12/2005 | Choi |
| 2006/0016465 A1 | 1/2006 | Johannes van Loosbroek et al. |
| 2006/0016955 A1 | 1/2006 | Kao |
| 2006/0124122 A1 * | 6/2006 | Young ........................ A45B 17/00 126/573 |
| 2006/0127034 A1 | 6/2006 | Brooking et al. |
| 2006/0196532 A1 | 9/2006 | Tung |
| 2007/0040647 A1 | 2/2007 | Saenz et al. |
| 2007/0070588 A1 | 3/2007 | Lin |
| 2007/0126208 A1 * | 6/2007 | Freedman ........................ A45B 11/00 280/647 |
| 2007/0127231 A1 | 6/2007 | Li |
| 2007/0151588 A1 | 7/2007 | Yul et al. |
| 2007/0211450 A1 | 9/2007 | You |
| 2007/0242450 A1 | 10/2007 | Blatecky |
| 2007/0279856 A1 | 12/2007 | Bragg |
| 2007/0283987 A1 | 12/2007 | Reyes |
| 2007/0285053 A1 * | 12/2007 | Noguchi ........................ H02J 7/32 320/114 |
| 2008/0056898 A1 | 3/2008 | Li |
| 2008/0062128 A1 | 3/2008 | Brodersen et al. |
| 2008/0076379 A1 | 3/2008 | Li |
| 2008/0092440 A1 | 4/2008 | Johnson |
| 2008/0092936 A1 | 4/2008 | Carabillo |
| 2008/0262657 A1 | 10/2008 | Howell et al. |
| 2009/0056775 A1 | 3/2009 | Keulbs |
| 2009/0058354 A1 | 3/2009 | Harrison |
| 2009/0071516 A1 | 3/2009 | Li |
| 2009/0185809 A1 * | 7/2009 | Grace ........................ G08C 23/04 398/135 |
| 2009/0193578 A1 | 8/2009 | Jang et al. |
| 2009/0196020 A1 | 8/2009 | Tsai |
| 2009/0250982 A1 | 10/2009 | Cohen |
| 2009/0277486 A1 | 12/2009 | Stepaniuk et al. |
| 2009/0320827 A1 | 12/2009 | Thompson et al. |
| 2010/0012164 A1 | 1/2010 | Stoelinga |
| 2010/0097441 A1 | 4/2010 | Trachtenberg et al. |
| 2010/0132751 A1 | 6/2010 | Li |
| 2010/0245032 A1 | 9/2010 | Li |
| 2010/0320819 A1 | 12/2010 | Cohen et al. |
| 2011/0088734 A1 | 4/2011 | Garcia |
| 2011/0157801 A1 | 6/2011 | Satterfield |
| 2011/0203754 A1 * | 8/2011 | Mullet ........................ E06B 9/42 160/405 |
| 2013/0048829 A1 | 2/2013 | Herniak |
| 2013/0306628 A1 | 11/2013 | Volin |
| 2014/0041555 A1 | 2/2014 | Ramberg |
| 2014/0317168 A1 | 10/2014 | Suresh |
| 2015/0136944 A1 | 5/2015 | Segev |
| 2015/0216273 A1 * | 8/2015 | Akin ........................ A45B 23/00 135/16 |
| 2015/0216274 A1 | 8/2015 | Akin |
| 2015/0237975 A1 | 8/2015 | Ng |
| 2015/0245691 A1 | 9/2015 | Fitgerald |
| 2015/0374083 A1 | 12/2015 | Akin |
| 2016/0095398 A1 | 4/2016 | Li |
| 2016/0119699 A1 | 4/2016 | Caban |
| 2016/0198818 A1 | 7/2016 | Akin |
| 2016/0326765 A1 * | 11/2016 | Barbret ........................ E04H 15/02 |
| 2016/0338457 A1 | 11/2016 | Gharabegian |
| 2017/0055653 A1 | 3/2017 | Gharabegian |
| 2017/0071300 A1 | 3/2017 | Gharabegian |
| 2017/0086545 A1 | 3/2017 | Gharabegian |
| 2017/0086546 A1 | 3/2017 | Gharabegian |

(56) References Cited

U.S. PATENT DOCUMENTS

2017/0099919 A1* 4/2017 Mullet ................ A45B 25/143
2017/0105497 A1 4/2017 Gharabegian

FOREIGN PATENT DOCUMENTS

| | | | |
|---|---|---|---|
| CN | 202974544 | 6/2013 | |
| CN | 103405009 | 11/2013 | |
| CN | 104469162 | 3/2015 | |
| CN | 104835334 | 8/2015 | |
| CN | 105193034 | 12/2015 | |
| CN | 201580588 | 4/2016 | |
| CN | 106163041 | 11/2016 | |
| DE | 202008003392 U1 * | 5/2008 | ............ A45B 3/00 |
| ES | 1731055 | 12/2006 | |
| FR | 2977457 A1 | 1/2013 | |
| GR | 20060100244 | 11/2007 | |
| RU | 2251066 | 4/2005 | |
| RU | 47414 | 8/2005 | |
| RU | 55549 | 8/2006 | |
| WO | WO 03 073884 | 9/2003 | |
| WO | WO 2004103113 | 12/2004 | |
| WO | WO 2005092140 | 10/2005 | |
| WO | WO 2006059334 | 6/2006 | |
| WO | WO 2008102403 | 8/2008 | |
| WO | WO 2009124384 | 10/2009 | |
| WO | WO 2010/098735 | 9/2010 | |
| WO | WO 2011140557 | 11/2011 | |

OTHER PUBLICATIONS

International Search Report, PCT Application No. PCT/US2017/068771, dated May 10, 2018, Federal Institute of Industrial Property, Authorized Officer, A. Chekalkina.

International Search Report and Written Opinion of International Searching Authority, International Application No. PCT/US2017/045059, dated Jan. 25, 2018.

Interntional Search Report and Written Opinion of International Searching Authority, International Application No. PCT/US2017/043789, dated Nov. 23, 2017.

International Search Report and Written Opinion of International Searching Authority Application No. PCT/US2017/052595, dated Feb. 21, 2018.

GPS Sun Tracking Solar Panel; Alyammahi et al., published May 7, 2015, accessed Jun. 21, 2017 from https:repository.lib.fit.edu/handle/11141/628?show=full.

Written Opinion of the International Searching Authority, International Application No. PCT/US2016/033331, Written Opinion Completed: Jul. 27, 2016.

* cited by examiner

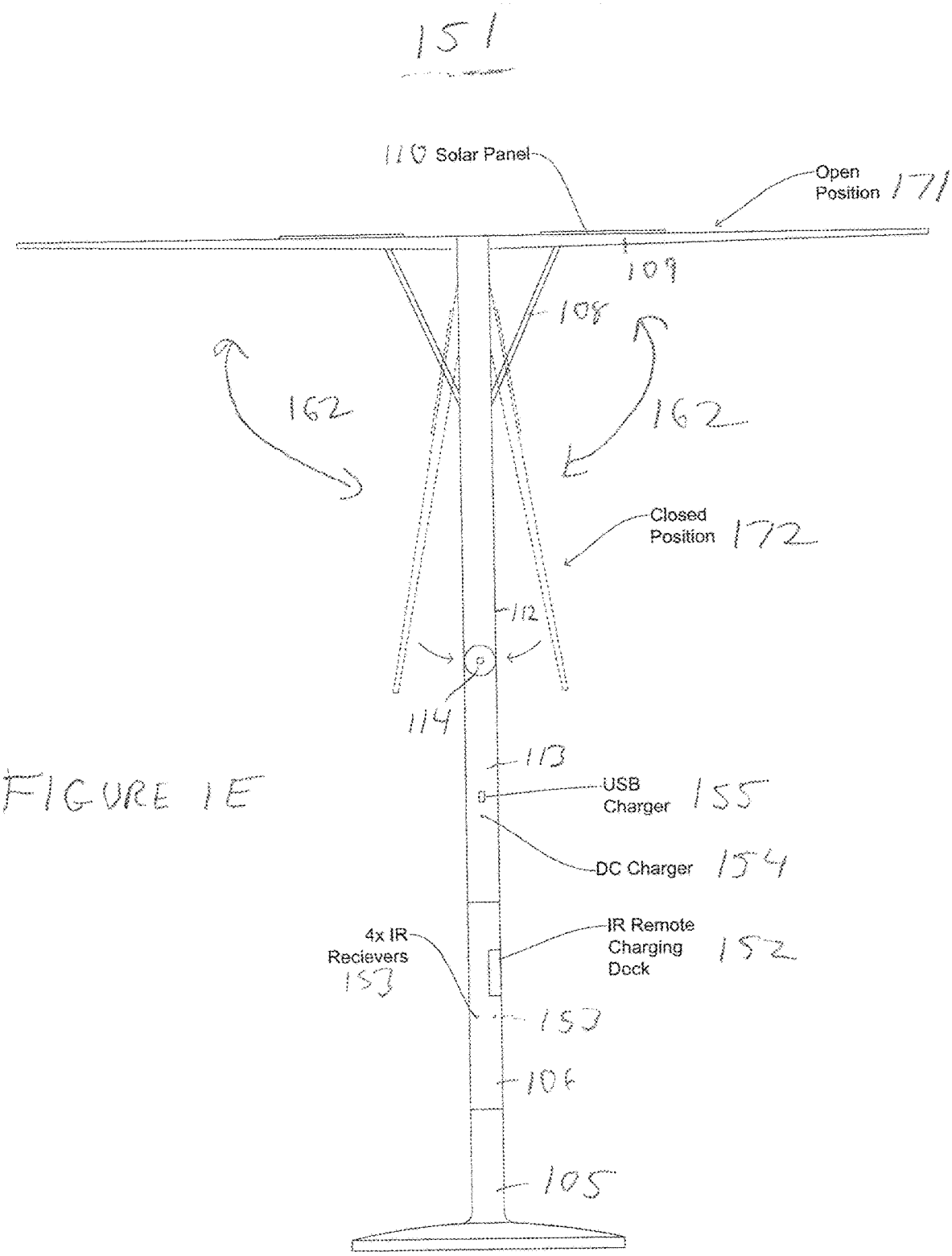

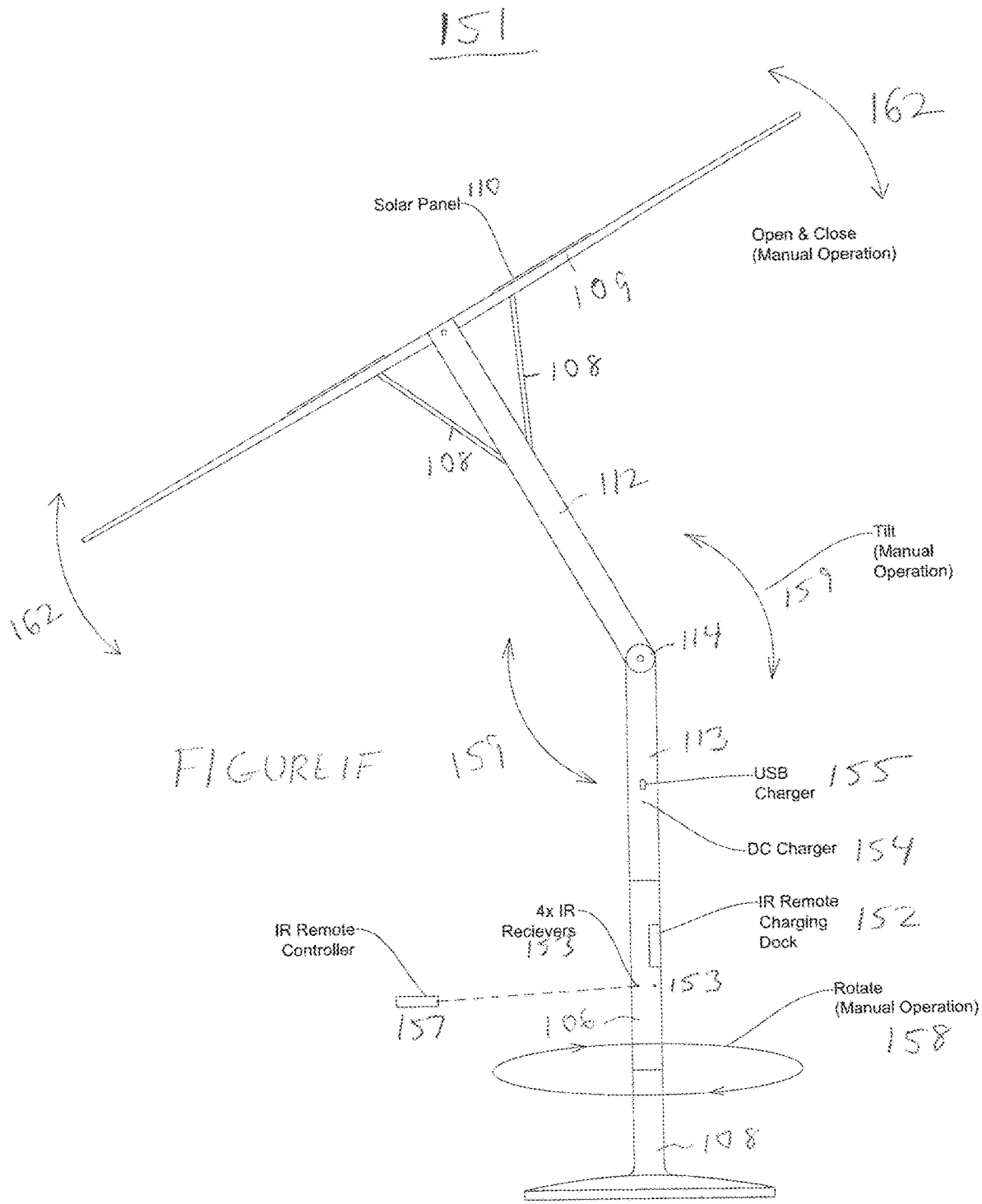

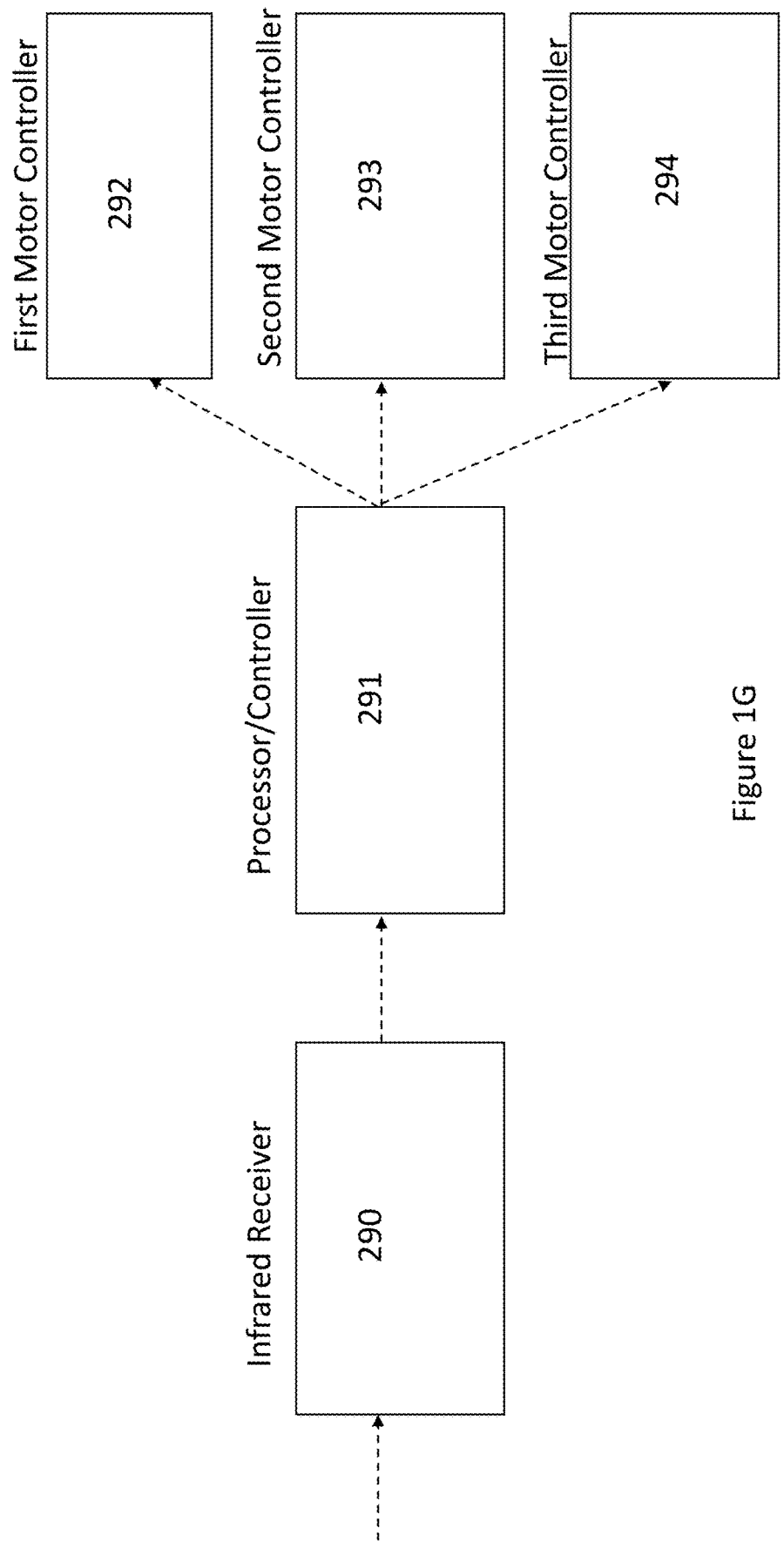

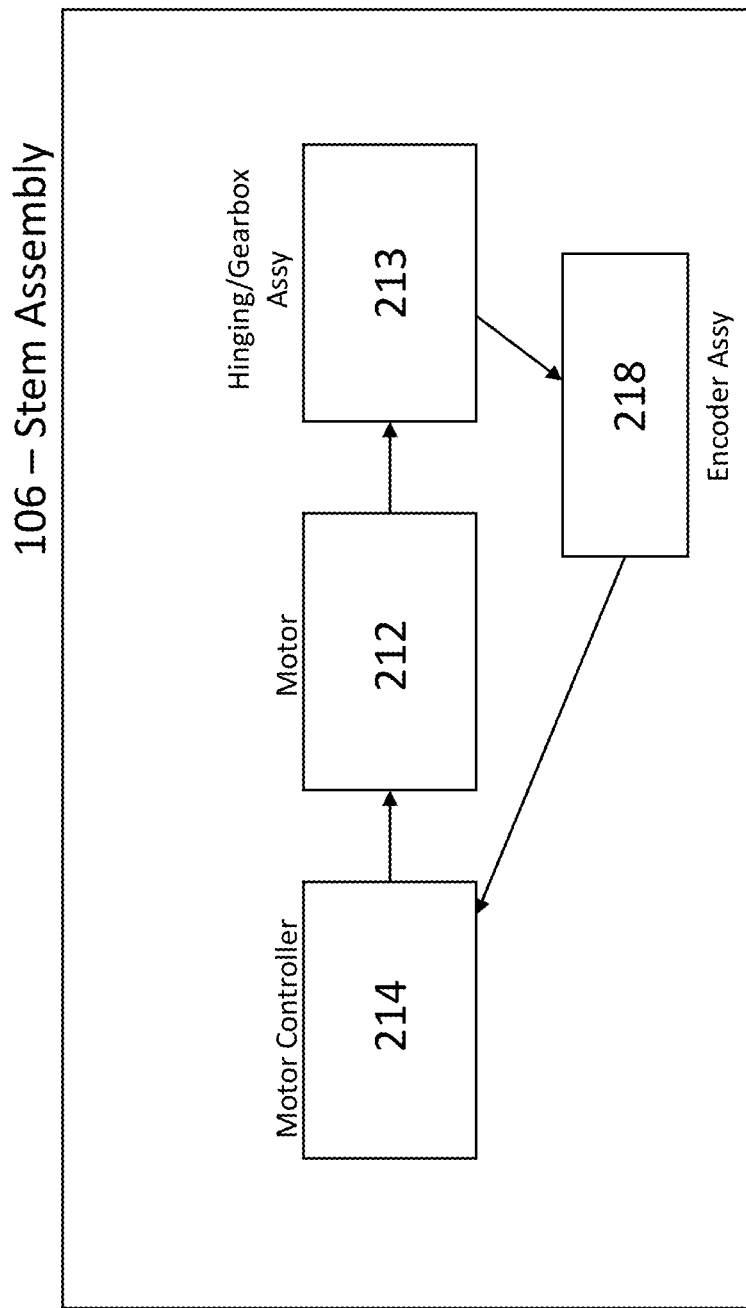

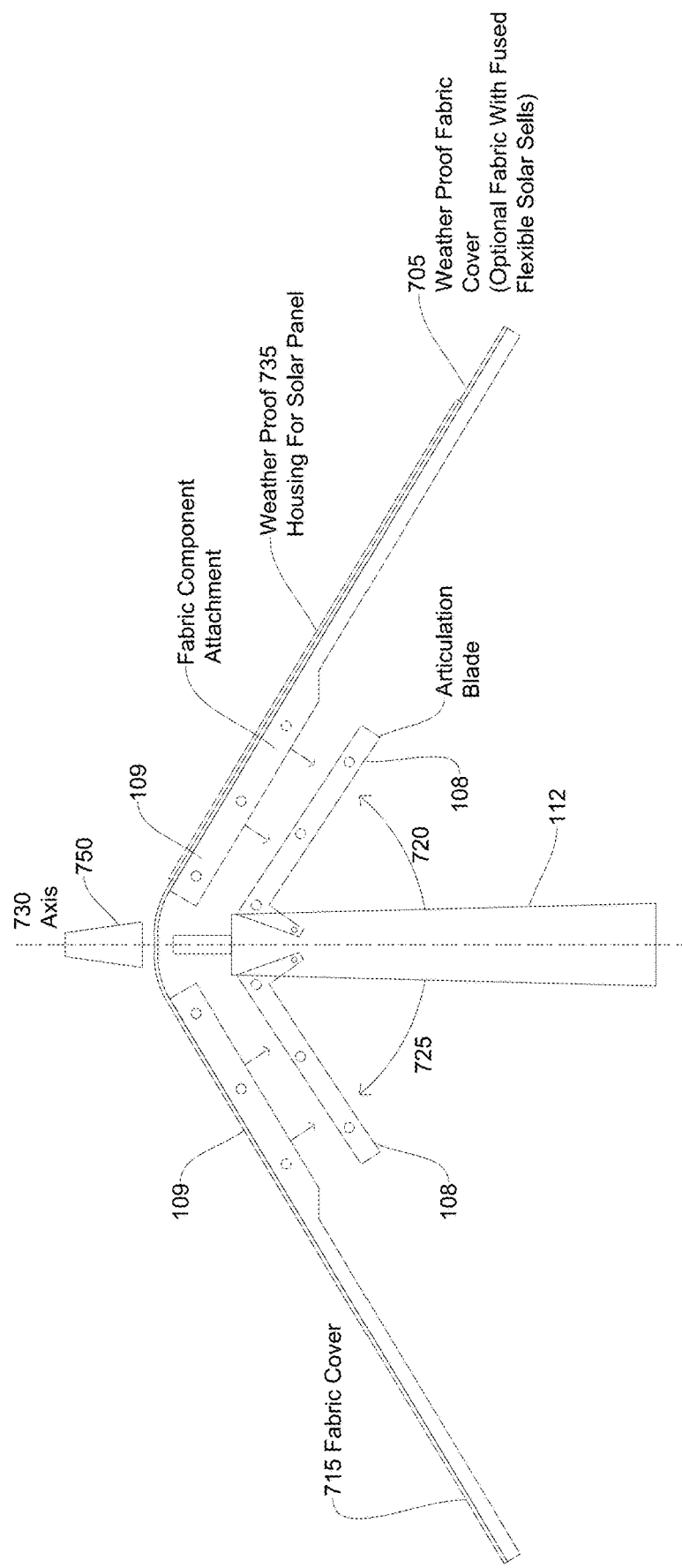

Fig. 8A

Hardware

| | | | |
|---|---|---|---|
| 805 | Telemetry Board With Slave Processor | GPS/GNSS | 806 |
| | | Digital Compass | 807 |
| 810 | Weather Variables Board With Slave Processor | Air Quality Sensor | 811 |
| | | UV Radiation Sensor | 812 |
| | | Digital Barometer | 813 |
| | | Temperature | 814 |
| | | Humidity | 816 |
| | | Wind Speed | 817 |
| 815 | Voice Recognition Board With Slave Processor | | |
| 820 | Rechargable Battery | | |
| 825 | Solar Panel | | |
| 830 | Power Tracking Solar Charger | | |
| 835 | AC Adapter Input | | |
| 840 | Proximity Sensor | | |
| 845 | Motion Sensor | | |

Function

- Provide Location and Orientation Information
- Sense Weather Variables Surrounding the Shade. Detect High Winds and Close Shade's Arms
- Enable Control Via Voice Commands, Provide Audible Warnings
- Store Electricity Collected Through Solar Panel/AC Charger. Provide Electricity for All Shade Components
- Generate Electricity To Charge the Battery
- Regulate and Balance the Charging Process. Provide Data Regarding Charging State
- Charge the Battery/Run System in Absence of Sun
- Identify the Location of A Person Relative to Moving Components
- Detect Presence of Person Around Shade

Fig. 8B

| # | Hardware | Function |
|---|---|---|
| 850 | Code Based Obstacle Detector | Detect Presence of Person/Object Within Shade's Path of Travel |
| 855 | Tilt Sensor | Detect movement/relocation of Shade and Reorient to Correct Position |
| 860 | Linux Based Computer With Integrated Wifi And 5xIP Cameras | Collect Video Feed along with Sensor data Communicate Through Wifi. |
| 865 | Bluetooth | Provides Short Distance Communication for App Based Control, Audio Transmission, and Data Retrieval. |
| 870 | LED Lighting | Provides Light During Night Operation |
| 875 | Class D Stereo Amplifier With Speakers | Provides Audio Playback Through Mobile App or Wifi Stream |
| 880 | Azimuth Servo Motor With Controller | Rotates Shade to Predetermined Azimuth Angle |
| 885 | Elevation Servo Motor With Controller | Rotates Shade to Predetermined Elevation Angle |
| 890 | Actuator Servo Motor With Controller | Extend/Retract Shade Blades |
| 895 | Motion Control PCB | |
| 857 | Digital Cameras | |
| 866 | Wind Turbine | |
| 877 | USB Device | |

870 – Lighting Assembly / First Lighting Assembly 199/ Lighting Subassembly 198

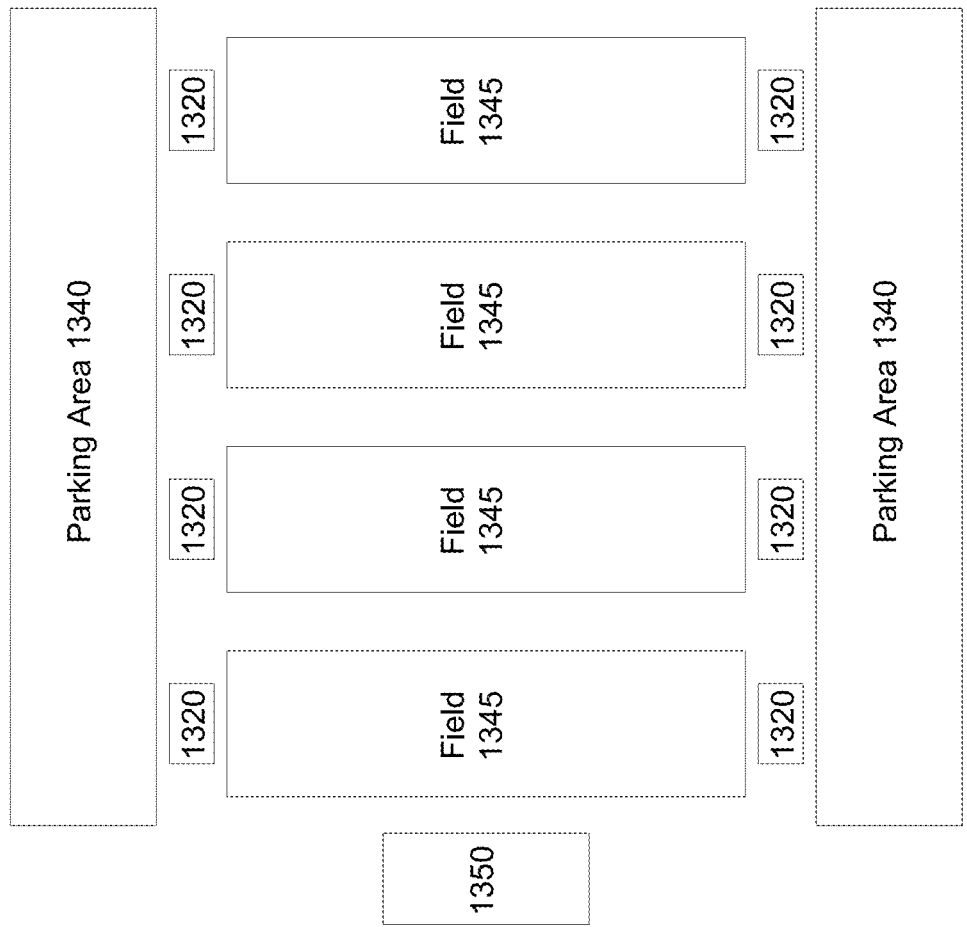

REMOTE CONTROL OF SHADING OBJECT AND/OR INTELLIGENT UMBRELLA

RELATED APPLICATIONS

This application is a continuation-in-part of U.S. non-provisional patent application Ser. No. 15/219,292, filed Jul. 26, 2016, entitled "Shading Object, Intelligent Umbrella and Intelligent Shading Charging System Integrated Camera and Method of Operation" which is a continuation-in-part of U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," which is a continuation-in-part of U.S. non-provisional patent application Ser. No. 15/212,173, filed Jul. 15, 2016, entitled "Intelligent Charging Shading Systems," which is a continuation-in-part of application of U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and is also a continuation-in-part of application of U.S. non-provisional patent application Ser. No. 15/160,822, filed May 20, 2016, entitled "Intelligent Shading Objects with Integrated Computing Device," both of which claim the benefit of U.S. provisional Patent Application Ser. No. 62/333,822, entitled "Automated Intelligent Shading Objects and Computer-Readable Instructions for Interfacing With, Communicating With and Controlling a Shading Object," filed May 9, 2016, all of which are hereby incorporated by reference.

BACKGROUND

1. Field

The subject matter disclosed herein relates to remote control of a shading object and/or intelligent umbrella.

2. Information/Background of the Invention

Conventional sun shading devices usually are comprised of a supporting frame and an awning or fabric mounted on the supporting frame to cover a predefined area. For example, a conventional sun shading device may be an outdoor umbrella or an outdoor awning.

However, current sun shading devices do not appear to be flexible, modifiable or able to adapt to changing environmental conditions, or user's desires. Many of the current sun shading devices appear to require manual operation in order to change inclination angle of the frame to more fully protect an individual from the environment. Further, the current sun shading devices appear to have one (or a single) awning or fabric piece that is mounted to an interconnected unitary frame. An interconnected unitary frame may not be able to be opened or deployed in many situations. Accordingly, alternative embodiments may be desired. Further, current sun shading devices may not have automated assemblies to allow a shading object to track movement of a sun and/or adjust to other environmental conditions. In addition, current sun shading devices do not communicate with external shading object related systems. Further, individuals utilizing current sun shading devices are limited in interactions with users. In addition, sun shading devices generally do not have software stored therein which controls and/or operates the sun-shading device. Further, current sun shading devices do not interact with the environment in which they are installed.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 1E illustrates a remote-controlled shading object or umbrella according to embodiments;

FIG. 1F illustrates a remote-controlled shading object or umbrella after an upper support assembly has moved according to embodiments;

FIG. 1G illustrates a block diagram of signal control in a remote-controlled shading object according to embodiments;

FIG. 2 illustrates a block diagram of a stem assembly according to embodiments;

FIG. 7 illustrates assemblies to deploy arms and/or blades according to embodiments;

FIGS. 8A and 8B illustrate a block diagram of a movement control PCB according to embodiments;

FIGS. 13A and 13B illustrates placements of intelligent shading charging systems according to embodiments;

DETAILED DESCRIPTION

Figure 1A:
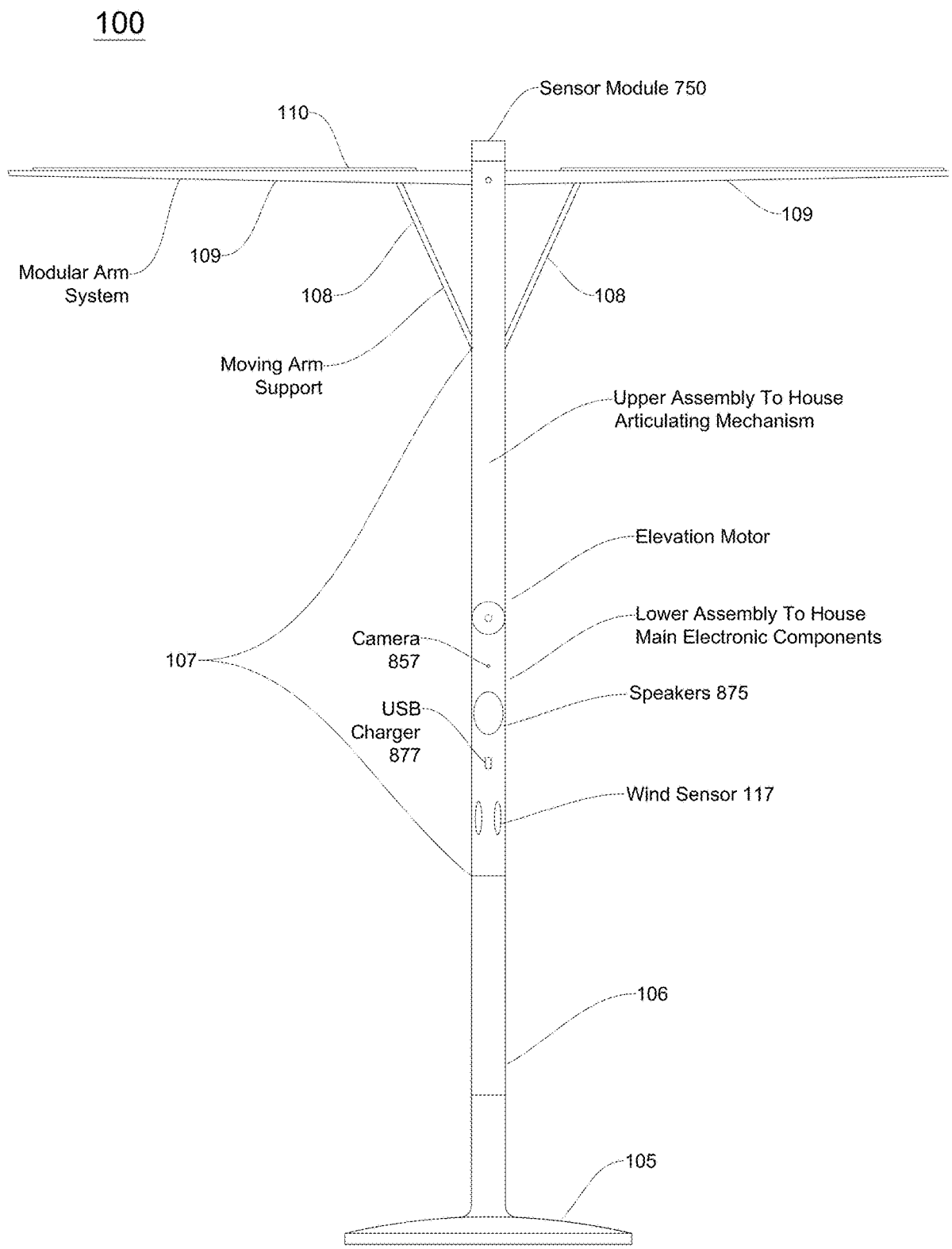
FIGS. 1A and 1B illustrates a shading object or shading object device according to embodiments.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

A network may comprise two or more network and/or computing devices and/or may couple network and/or computing devices so that signal communications, such as in the form of signal packets, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases, database servers, and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context. In a context of this application, if signals, instructions, and/or commands are transmitted from one component (e.g., a controller or processor) to another component (or assembly), it is understood that signals, instructions, and/or commands may be transmitted directly to a component, or may pass through a number of other components on a way to a destination component. For example, a signal transmitted from a motor controller or processor to a motor (or other driving assembly) may pass through glue logic, an amplifier, and/or an interface. Similarly, a signal communicated through a misting system may pass through an air conditioning and/or a heating module, and a signal communicated from any one or a number of sensors to a controller and/or processor may pass through a conditioning module, an analog-to-digital controller, and/or a comparison module.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), cloud storage, a storage area network (SAN), cloud storage, and/or other forms of computing and/or device readable media, for example. A network may include a portion of the Internet, one or more local area networks (LANs), one or more wide area networks (WANs), wire-line type connections, one or more personal area networks (PANs), wireless type connections, other connections, or any combination thereof. Thus, a network may be worldwide in scope and/or extent.

The Internet and/or a global communications network may refer to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet may include local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices and/or computing devices may engage in an HTTP session through an exchange of appropriately compatible and/or compliant signal packets and/or frames. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. A content delivery server and/or the Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. HTML and/or XML are merely example languages provided as illustrations and intended to refer to any version, now known and/or developed at another time and claimed subject matter is not intended to be limited to examples provided as illustrations, of course.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. Claimed subject matter is intended to embrace meaningful, descriptive parameters in any format, so long as the one or more parameters comprise physical signals and/or states, which may include, as parameter examples, name of the collection of signals and/or states.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a shading object may comprise a shading object computing device installed within or as part of a shading object, intelligent umbrella and/or intelligent shading charging system. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as a shading object computing device). In the context of this specification, therefore, a special purpose computer or a similar special purpose electronic computing device (e.g., a shading object computing device) is capable of manipulating or transforming signals (electronic and/or magnetic) in memories (or components thereof), other storage devices, transmission devices sound reproduction devices, and/or display devices.

In an embodiment, a controller and/or a processor typically performs a series of instructions resulting in data manipulation. In an embodiment, a microcontroller or microprocessor may be a compact microcomputer designed to govern the operation of embedded systems in electronic devices, e.g., an intelligent, automated shading object, umbrella, and/or shading charging systems, and various other electronic and mechanical devices coupled thereto or installed thereon. Microcontrollers may include processors, microprocessors, and other electronic components. Controller may be a commercially available processor such as an Intel Pentium, Motorola PowerPC, SGI MIPS, Sun Ultra-SPARC, or Hewlett-Packard PA-RISC processor, but may be any type of application-specific and/or specifically designed processor or controller. In an embodiment, a processor and/or controller may be connected to other system elements, including one or more memory devices, by a bus. Usually, a processor or controller, may execute an operating system which may be, for example, a Windows-based operating system (Microsoft), a MAC OS System X operating system (Apple Computer), one of many Linux-based operating system distributions (e.g., an open source operating system) a Solaris operating system (Sun), a portable electronic device operating system (e.g., mobile phone operating systems), and/or a UNIX operating systems. Embodiments are not limited to any particular implementation and/or operating system.

The specification may refer to an intelligent shading object as an apparatus that provides shade to a user from weather elements such as sun, wind, rain, and/or hail. In embodiments, the intelligent shading object may be an automated intelligent shading object, automated intelligent umbrella, and/or automated intelligent shading charging system. The automated intelligent shading object may also be referred to as a parasol, intelligent umbrella, sun shade, outdoor shade furniture, sun screen, sun shelter, awning, sun cover, sun marquee, brolly and other similar names, which may all be utilized interchangeably in this application. Shading objects which also have electric vehicle charging capabilities may also be referred to as intelligent shading charging systems. These terms may be utilized interchangeably throughout the specification. The shading objects, intelligent umbrellas and shading charging systems described herein comprises many novel and non-obvious features, which are detailed in U.S. non-provisional patent application Ser. No. 15/212,173, filed Jul. 15, 2016, entitled "Intelligent Charging Shading Systems," U.S. patent application Ser. No. 14/810,380, entitled "Intelligent Shading Objects", inventor Armen Sevada Gharabegian, filed Jul. 27, 2015, and U.S. Provisional Patent Application Ser. No. 62/165,869, filed May 22, 2015, the disclosures of which are hereby incorporated by reference.

FIG. 1A illustrates an intelligent shading object according to embodiments. In embodiments, an intelligent shading object and/or umbrella may comprise a base assembly 105, a stem assembly 106, a central support assembly 107 (including a lower assembly, a hinge assembly and/or gearbox, and/or an upper assembly), arm support assemblies 108, arms/blades 109, and/or a shading fabric 715. In embodiments, a stem assembly 106 (and a coupled central support assembly, arm support assemblies, and/or blades) may rotate within a base assembly around a vertical axis. In embodiments, an upper assembly of a center support assembly 107 may rotate up to a right angle with respect to a lower assembly of the center support assembly 107 via a gearbox or hinging mechanism, and a second motor. In embodiments, arm support assemblies 109 may deploy and/or extend from a center support assembly 107 to open a shading object. In embodiments, detachable arms/blades 109 may be attached or coupled to arm support assemblies 108. In embodiments, a detachable shading fabric 715 may be attached or coupled to arms/blades 109.

Figure 1B:
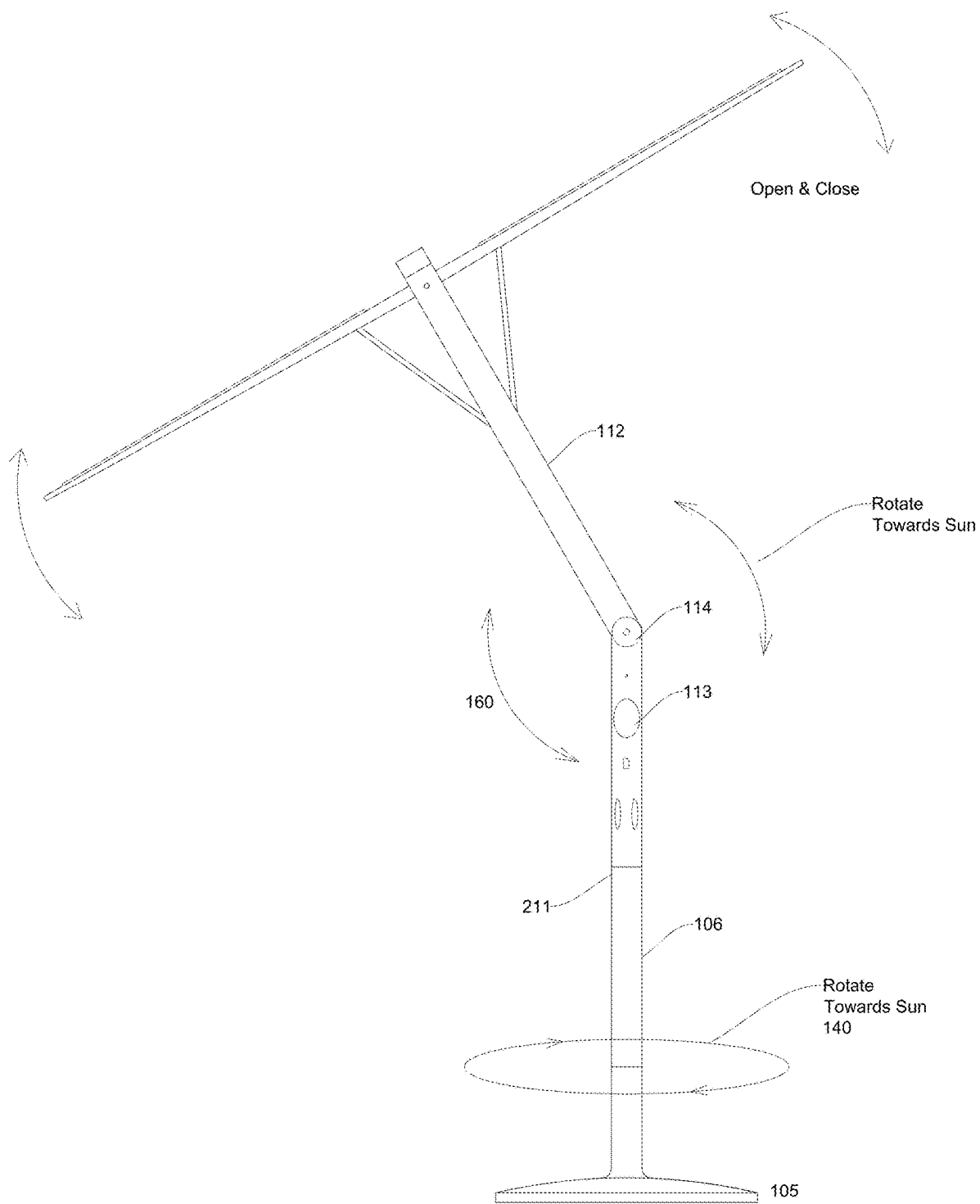

FIGS. 1A and 1B illustrates a shading object or shading object device according to embodiments. In embodiments, a shading object 100 may comprise a base assembly 105, a stem assembly 106, a center support assembly 107, one or more supporting arm assemblies 108, one or more arms/blades 109, solar panels and or a shading fabric (not shown). In embodiments, a stem assembly 106, a center support assembly 107, one or more supporting arm assemblies 108, and/or one or more arms/blades 109 may be referred to as an umbrella support assembly, a shading system body and/or shading subsystem. In embodiments, a central support assembly 107 may comprise an upper assembly 112, a lower assembly 113 and a hinging assembly and/or gearbox 114, where the hinging assembly and/or gearbox assembly 114 may connect and/or couple the upper assembly 112 to the lower assembly 113. In embodiments, a base assembly 105 may rest on a ground surface in an outdoor environment. A ground surface may be a floor, a patio, grass, sand, or other outdoor environments surfaces. In embodiments, a stem assembly 106 may be placed into a top portion of a base assembly 105.

Figure 3A:
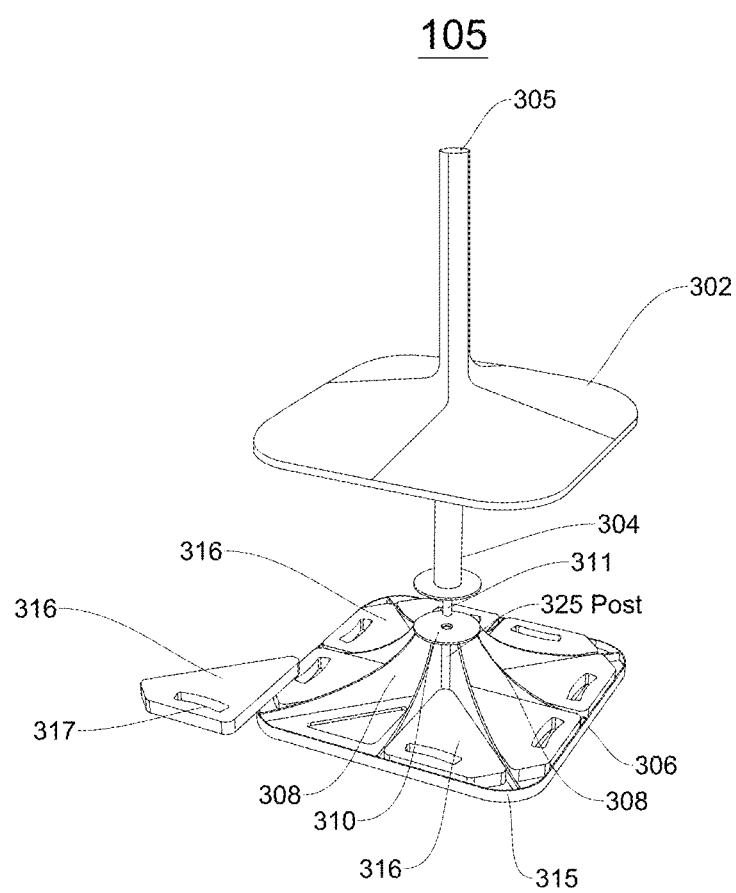
FIG. 3A illustrates a base assembly according to embodiments.

FIG. 3A illustrates a base assembly according to embodiments. A base assembly as illustrated in FIG. 3A and FIGS. 1A and 1B is described in detailed in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device," the disclosures of which are both hereby incorporated by reference.

In embodiments, a base assembly 105 may have an opening (e.g., a circular or oval opening) into which a stem assembly 106 may be placed. FIG. 2 illustrates a block diagram of a stem assembly according to embodiments. In embodiments, a stem assembly may be referred to as an automatic and/or motorized stem assembly. In embodiments, a stem assembly 106 may comprise a stem body 211 and a first motor assembly. In embodiments, a first motor assembly may comprise a first motor 212, a gear box assembly and/or hinging assembly 213, and/or a first motor controller 214. Although a gearbox assembly and/or hinging assembly is discussed, other connecting assemblies, gearing assemblies, actuators, etc., may be utilized. In embodiments, a first motor controller 214 may also be referred to as a motor driver and within this specification, terms "motor driver" and "motor controller" may be used interchangeably. In embodiments, a first motor controller 214 may receive commands, instructions and/or signals requesting movement of a shading system around an azimuth axis. In embodiments, a shading system body 211 may rotate (e.g., may rotate between 0 and 360 degrees about a vertical axis formed by a base assembly 105, a stem assembly 106, and/or a central support assembly 107). Reference number 140 (FIG. 1B) illustrates a rotation of a shading system body about a vertical axis according to embodiments. In embodiments, a shading object stem assembly 106 may rotate around a vertical axis, such as vertical axis 730 in FIG. 7. In embodiments, a shading object stem assembly may rotate 360 degrees about a vertical axis. In embodiments, a shading object stem assembly 106 may rotate up to 270 degrees and/or 180 degrees about a vertical axis. In embodiments, a shading object stem assembly 106 may be limited by detents, stops and/or limiters in an opening of a base assembly 105. In embodiments, a stem assembly encoder 218 may provide location and/or position feedback to a first motor controller 214. In other words, an encoder 218 may verify that a certain distance and/or position has been moved by a base assembly 105 from an original position. In embodiments, encoders may be utilized in motor systems in order to feedback position and/or distance information to motor controllers and/or motors to verify a correct position has been turned. In embodiments, encoders may have a number of positions and/or steps and may compare how much an output shaft and/or gearbox assembly has moved in order to feedback information to a motor controller. Encoders may be utilized with any motors and/or motor controllers in this application. This provides a benefit as compared to prior art umbrellas and shading objects because the intelligent shading umbrella, due to its rotation (e.g., 360 degree rotation), can orient itself with respect to any position in a surrounding area.

In embodiments, a first motor controller 214 may communicate commands and/or signals to a first motor 212 to cause movement of an umbrella support assembly or shading system body (e.g., a stem assembly 106, central support assembly 107, shading arm supports 108, and/or arms/blades 109) about an azimuth axis. In this illustrative embodiment, a base assembly 105 may remain stationary while the shading system boy rotates within the base assembly 105. In other words, a shading system body is placed in an opening of a base assembly 105 and rotates while the base assembly remains stationary. In embodiments, a first motor 212 may be coupled to a gearbox assembly 213. In embodiments, a gearbox assembly 213 may comprise a planetary gearbox assembly. A planetary gearbox assembly may be comprise a central sun gear, a planet carrier with one or more planet gears and an annulus (or outer ring). In embodiments, planet gears may mesh with a sun gear while outer rings teeth may mesh with planet gears. In embodiments, a planetary gearbox assembly may comprise a sun gear as an input, an annulus as an output and a planet carrier (one or more planet gears) remaining stationary. In embodiments, an input shaft may rotate a sun gear, planet gears may rotate on their own axes, and may simultaneously apply a torque to a rotating planet carrier that applies torque to an output shaft (which in this case is the annulus). In embodiments, a planetary gearbox assembly and a first motor 212 may be connected and/or adhered to a stem assembly 105. In embodiments, an output shaft from a gearbox assembly 213 may be connected to a base assembly 105 (e.g., an opening of a base assembly). In embodiments, because a base assembly 105 is stationary, torque on an output shaft of a gearbox assembly 213 may be initiated by a first motor 212 to cause a stem assembly 106 to rotate. In embodiments, other gearbox assemblies and/or hinging assemblies may also be utilized to utilize an output of a motor to cause a stem assembly 106 (and hence an umbrella support assembly) to rotate within a base assembly 105. In embodiments, a first motor 212 may comprise a pneumatic motor. In other embodiments, a first motor 212 may comprise a servo motor and/or a stepper motor.

In embodiments, a stem assembly 106 may be coupled and/or connected to a center support assembly 107. In embodiments, as mentioned above, a stem assembly 106 and a center support assembly 107 may both be part of an umbrella support assembly. In embodiments, a center support assembly 107 may comprise an upper assembly 112, a second gearbox assembly (or a linear actuator or hinging assembly) 114, a lower assembly 113, a second motor 121, and/or a second motor controller 122. In embodiments, a second motor assembly may comprise a second motor controller 122 and a second motor 121, and maybe a second gearbox assembly or linear actuator 114. In embodiments, a center support assembly 107 may also comprise a motor control PCB which may have a second motor controller 122 mounted and/or installed thereon. In embodiments, an upper assembly 112 may be coupled or connected to a lower assembly 113 of the center support assembly 107 via a second gearbox assembly 113. In embodiments, a second gearbox assembly 113 and a second motor 121 connected thereto, may be connected to a lower assembly 113. In embodiments, an output shaft of a second gearbox assembly 114 may be connected to an upper assembly 112. In embodiments, as a second motor 121 operates and/or rotates, a second gearbox assembly 114 rotates an output shaft which causes an upper assembly 112 to rotate (either upwards or downwards) at a right angle from, or with respect to, a lower assembly 113. In embodiments utilizing a linear actuator as a hinging assembly 114, a steel rod may be coupled to an upper assembly 112 and/or a lower assembly 113 which causes a free hinging between an upper assembly 112 and a lower assembly 113. In embodiments, a linear actuator 114 may be coupled, connected, and/or attached to an upper assembly 112 and/or a lower assembly 113. In embodiments, as a second motor 121 operates and/or rotates a steel rod, an upper assembly 112 moves in an upward or downward direction with respect to a hinged connection (or hinging assembly) 114. In embodiments, a direction of movement is illustrated by reference number 160 in FIG. 1B. In embodiments, a direction of movement may be limited to approximately a right angle (e.g., approximately 90 degrees). In embodiments, an upper assembly 112 may move from a position where it is an extension of a lower assembly 113 (e.g., forming a vertical center support assembly 107) to a position wherein an upper assembly 112 is at a right angle from a lower assembly 113 (and also approximately parallel to a ground surface). In embodiments, movement may be limited by a right angle gearbox or right angle gearbox assembly 114. In embodiments, an upper assembly 112 and a lower assembly 113 may be perpendicular to a ground surface in one position (as is shown in FIG. 1A), but may move (as is shown by reference number 160) to track the sun (depending on location and time of day) so that an upper assembly 112 moves from a perpendicular position with respect to a ground surface to an angular position with respect to a ground surface and an angular position with respect to a lower assembly 113. In embodiments, an upper assembly s tracking sun movement between a vertical location (top of sky) and a horizontal location (horizon) and also may depend on time and location. This provides a benefit, as compared to prior art umbrellas, of automatically orienting a shading object or umbrella to positions of a sun in the sky (e.g., directly overhead, on a horizon as during sunrise and/or sunset).

Figure 1C:
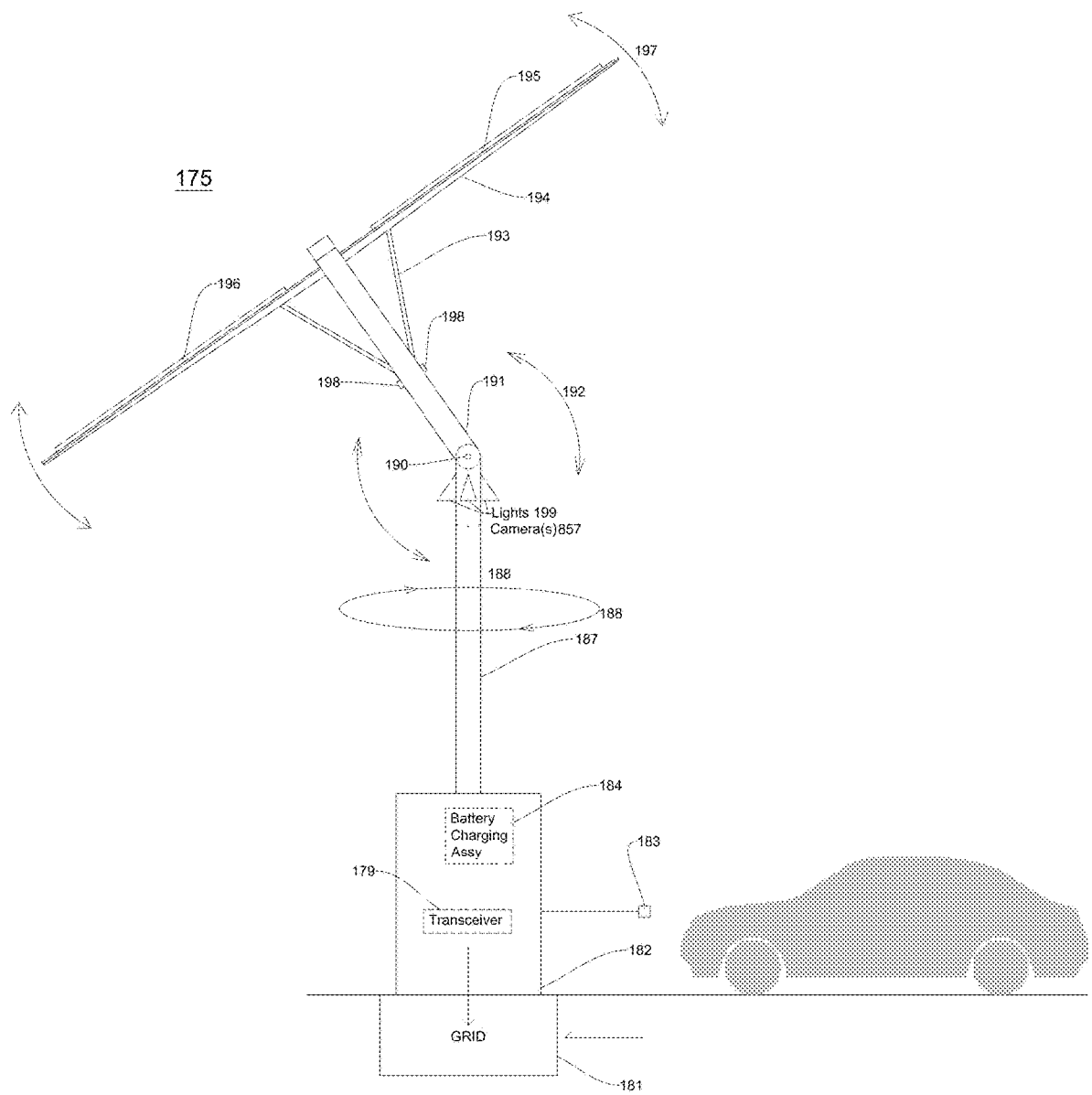
FIGS. 1C and 1D illustrate intelligent shading charging systems according to embodiments.

FIG. 1C illustrates an intelligent shading charging system according to embodiments. In embodiments, an intelligent shading charging system provides shade to a surrounding area, coverts solar energy to solar power, and charges a rechargeable battery in an electric vehicle. In embodiments, an intelligent shading charging system 175 comprises a rechargeable battery connection interface (not shown), a housing and/or enclosure 182 including a rechargeable battery 184 and/or a transceiver 179, a lower support assembly 187, cameras 857, which may be described in detail below, a hinging assembly or mechanism 190, and an upper support assembly 191. In embodiments, an intelligent shading charging system 175 further comprises a base assembly (not shown). In embodiments, an intelligent shading charging system 175 may comprise one or more arm support assemblies 193, one or more arms and/or blades 194 and a shading fabric 195. In embodiments, a shading fabric 195, arms 194, and/or arm support assemblies 193 may have one or more solar cells and/or arrays 196 attached thereto, integrated therein, and/or placed thereon. In embodiments, many movements of an intelligent shading charging system may be automated and/or occur automatically. In embodiments, an intelligent shading charging system 175 may be connected and/or coupled to a power delivery system (e.g., a power grid or a power mains) 181. Intelligent shading charging systems 175 are described in detail in U.S. non-provisional patent application Ser. No. 15/212,173, filed Jul. 15, 2016, entitled "Intelligent Charging Shading Systems," the disclosure of which is hereby incorporated by reference.

Figure 1D:
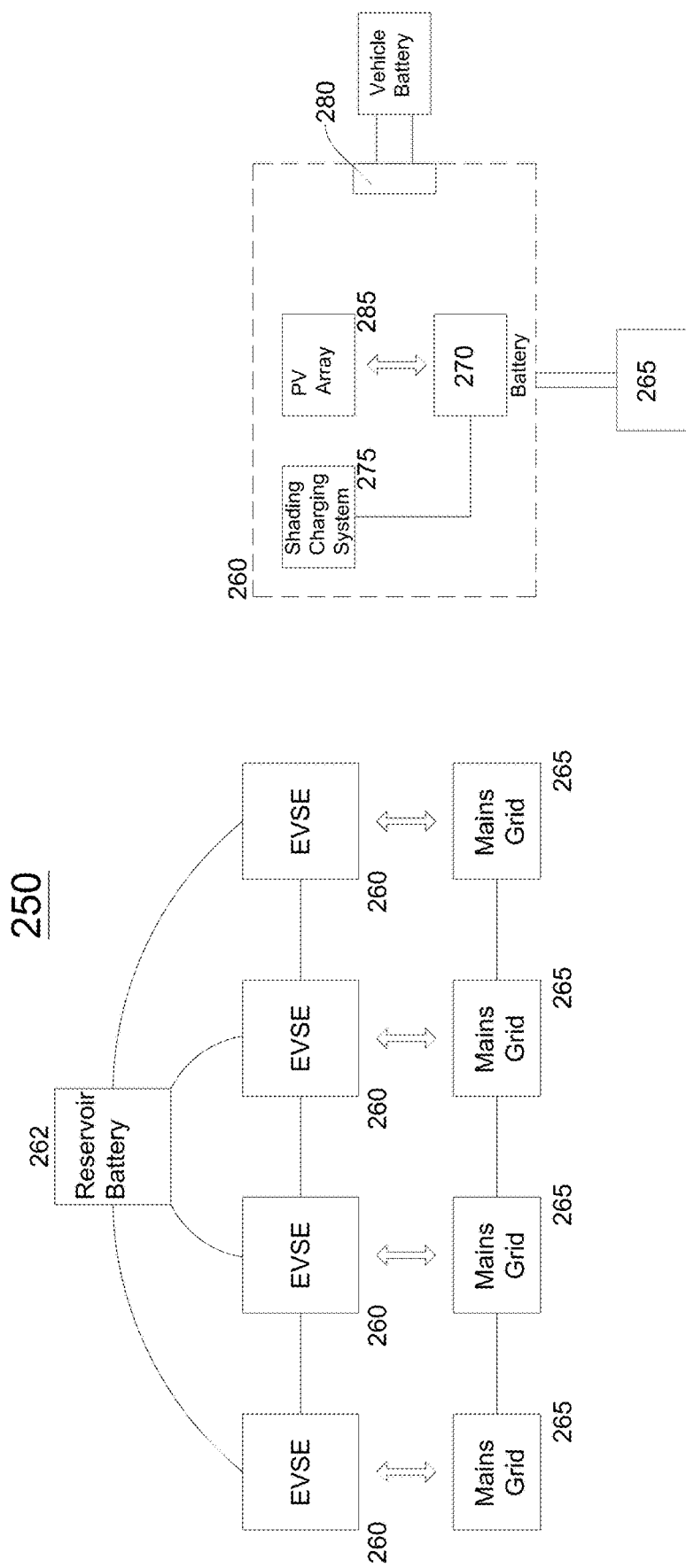

FIG. 1D illustrates a power charging station 250 comprising one or more automated intelligent shading charging systems installed in an outdoor or indoor environment according to embodiments. Power charging stations are described in detail U.S. non-provisional patent application Ser. No. 15/212,173, filed Jul. 15, 2016, entitled "Intelligent Charging Shading Systems," the disclosure of which is hereby incorporated by reference.

FIG. 1E illustrates a remote-controlled shading object or umbrella according to embodiments. FIG. 1F illustrates a remote-controlled shading object or umbrella after an upper support assembly has moved according to embodiments. In embodiments, a shading object or umbrella 151 comprises a base assembly 105, a stem assembly 106, a lower support assembly 113, an upper support assembly 112, a hinging assembly 114, one or more arm support assemblies 108, one or more arms 109, and/or one or more solar panels 110. In embodiments, shading object or umbrella 151 may comprise one or more infrared receivers 153, an infrared remote charging dock 152, a DC charger 155 and/or a universal serial bus (USB) charger 155.

In embodiments, one or more receivers 153 (e.g., infrared receivers) are positioned around, attached to and/or integrated into a stem assembly 106. In embodiments, one or more infrared receivers may be located and/or positioned elsewhere (e.g., a central support assembly, a base assembly 105, one or more arm support assemblies 108 and/or one or more arms/blades 109). In embodiments, a remote control 157 may transmit and/or communicate commands, messages, instructions and/or signals at infrared frequencies, which may need line of sight in order to be received. Accordingly, in embodiments, by having more than one receiver 153 and by positioning receivers 153 at various locations around a shading object and/or automated, intelligent umbrella, remote device commands may be received from different positions and/or angles around a shading object and/or intelligent umbrella. In embodiments, a remote control and one or more receivers (e.g., infrared receivers) 153 may communicate utilize infrared frequencies utilizing a variety of protocols, either standardized and/or proprietary. However, in other embodiments, a remote control may communicate with one or more receivers 153 utilizing other frequencies and/or spectrums (e.g., ultraviolet, visible, microwave and/or radio) and/or utilizing a variety of wireless communication protocols (e.g., Zigbee, Bluetooth, RC-5, SIRCS, RC-6, R-Step, NTC101, etc.).

In embodiments, a USB charger 155 may be utilized to charge USB interfaced devices such as wireless communication devices and/or portable music players. In embodiments, a cable may be inserted into a USB charger at one end and a wireless communication device and/or portable music player on another end. In embodiments, a DC power port 154 may provide an interface to a rechargeable battery to charge the rechargeable battery. In embodiments, an AC adapter may be plugged into an external power source and then power may be converted into a DC power signal.

In embodiments, a remote charging dock 152 may be utilized to hold a remote device (e.g., such as a remote control) utilizing fasteners, adhesion, magnetic coupling and/or other methods of attachment and/or coupling. In addition, a remote charging dock 152 may power and/or recharge batteries within an attached and/or coupled remote device (e.g., remote control). In embodiments, a remote charging dock 152 may be located or positioned on a stem assembly 106, but may also be located on a base assembly 105, a central support assembly, arm support assemblies 108, and/or arms/blades 109. In embodiments, a DC charger port 154 and/or a USB charger port 155 may be located on a central support assembly, but may also be located on a base assembly 105, stem assembly 106, arm support assemblies 108, and/or arms/blades 109.

FIG. 1G illustrates a block diagram of remote control operation of a shading object or intelligent umbrella according to embodiments. The shading object 151 comprises one or more receivers 290 (e.g., infrared receivers), a processor and/or controller 291, a first motor controller 292, a second motor controller 293 and a third motor controller 294. In embodiments, a remote device 157 (e.g., a remote control transmitting infrared wavelength signals) may communicate messages, instructions and/or commands to a shading object and/or intelligent umbrella. In embodiments, one or more infrared receivers/transceivers 153 receives the message, instructions, commands and/or signals from the remote device 157. For examples, these messages, instructions, commands and/or signals may result in rotation of a stem assembly 106 and/or central support assembly 107 within and/or about a base assembly 105; rotation of a upper support assembly 112 with respect to a lower support assembly 113 about a hinging assembly 114; and/or deployment of arm support assembles 108 from an upper support assembly 112 of the central support assembly.

In embodiments, the infrared receiver/transceiver 290 may translate and/or convert messages, instructions, commands and/or signals and communicate converted messages, instructions, commands and/or signals to a controller and/or processor 291. In embodiments, the controller and/or processor 291 may communicate signals and/or commands to a motor controller to case movement of a motor coupled thereto. In embodiments, while a processor/controller 291 and the motor controllers 292 293 and 294 are illustrated as separate components and/or devices, a single component, assembly and/or device may operate and/or function as a processor/controller and/or one or more motor controllers 292 293 294.

In embodiments, for example, a user may depress a button on a remote control to cause rotation of a stem assembly 106 and/or central support assembly with respect to a base assembly 105. In embodiments, for example, a remote device 157 (e.g., a remote control) communicates commands to a receiver (e.g., an infrared (IR) receiver), which may communicate commands, messages, instructions and/or signals to the controller/processor and then to the first motor controller. In embodiments, for example, a first motor controller 292 may transmit signals and/or commands to a motor which causes an assembly (e.g., hinging assembly, gearbox assembly and/or linear actuator) to rotate a stem assembly 106 and central support assembly about an azimuth axis with respect to a base assembly 105. In embodiments, for example, rotation of a stem assembly 106 and/or central support assembly about a base assembly 106 is illustrated by reference number 158 in FIG. 1F.

In embodiments, a user may depress a button on a remote control which is intended to change elevation of a shading object and/or intelligent umbrella. In embodiments, for example, a remote device (e.g., a remote control) which communicates commands, instructions, messages and/or signals to one or more receivers (e.g., an infrared receiver), which communicates commands, messages, instructions and/or signals to a controller/processor 291 and to a second motor controller 293. In embodiments, for example, a second motor controller 292 may transmit signals, instructions, messages and/or commands to a motor which causes a gearbox assembly, linear actuator, and/or hinging assembly 114 to cause and/or move an upper assembly 112 with respect to a lower assembly 113. In embodiments, for example, movement, elevation and/or rotation of an upper support assembly 112 with respect to a lower support assembly is illustrated by reference number 159 in FIG. 1F.

In embodiments, a user may depress a button on a remote control which causes one or more arm support assemblies 108 and/or one or more arms 109 to be deployed and/or retracted. In embodiments, for example, a remote device (e.g. remote control) may communicate commands, messages, instructions and/or signals to one or more receivers in a shading object and/or intelligent umbrella, which communicates commands, messages, instructions and/or signals to the controller/processor 291 and then to a third motor controller 294. In embodiments, for example, a third motor controller 294 may transmit signals, messages, instructions and/or commands to a third motor which causes a gearbox assembly, hinging assembly or linear actuator to move, extend and/or deploy (and/or retract) arm support assemblies 108 and/or arms/blades 109 from an upper support assembly 112. In embodiments, movement of arm support assemblies 108 and/or arms/blades 109 may cause a shading object or intelligent umbrella to move to an open and/or closed position (as illustrated by reference numbers 171 and 172 in FIG. 1E, respectively. In embodiments, movement, retraction and/or deployment of arm support assemblies and/or arm blades to open and/or closed positions are illustrated by reference number 162 in FIGS. 1E and 1F.

In embodiments, a user may depress a button (or a button may be selected) on a remote device 157 (e.g., remote control) which results in a shading object and/or intelligent umbrella 157 entering a shutdown mode. In embodiments, a shutdown mode results in a shading object and/or intelligent umbrella 151 stopping rotation (and/or returning to an original position), stopping elevation of an upper assembly 112 with respect to a lower assembly 113 (and/or potentially moving an upper assembly back to an original position of being in line (or vertically aligned) with a lower assembly, retracting one or more arm support assemblies 108 and/or arms 109 into a central support assembly, and/or issuing and/or communicating an alert and/or warning about an emergency and/or significant event and/or environmental condition. For example, if a shading object and/or intelligent umbrella 151 is in a closed position 172, if a shutdown command is received, a controller/processor 291 may communicate commands to keep a shading object and/or intelligent umbrella 151 from moving to an open position, elevating, and/or rotating. For example, if a shading object and/or intelligent umbrella 151 is in an open position 171, and if a shutdown or emergency command is received, a controller/processor 291 may communicate commands to prevent a shading object and/or intelligent umbrella 151 from moving to a closed position, performing elevation, and/or rotating.

In embodiments, for example, a remote device (e.g. remote control) may communicate emergency and/or shutdown commands to one or more receivers 153 in a shading object and/or intelligent umbrella 151, which communicates commands, instructions, messages and/or signals to the controller/processor 291. In embodiments, a controller/processor 291 may communicate commands, signals, messages and/or instructions to a first motor controller 292 (to cause stopping of rotation and/or returning to an original position), a second motor controller 293 (to cause stopping of elevation of an upper support assembly with respect to a lower support assembly and returning both assemblies to an original position), and/or a third motor controller 294 (to stop deployment of arm support assemblies 108 and/or arms 109 and/or returning arm support assemblies and/or arms to a closed and/or storage position). In embodiments, a controller/processor 291 may transmit commands, signals, instructions and/or messages to sound reproduction system 875 to emit an audible warning, a lighting assembly 870 to cause a lights to emit light in an emergency mode, and/or a computing device 860 to have an alert message displayed on a monitor or display device (e.g., 1425) of a shading object and/or intelligent umbrella 151 and/or have an alert message displayed on an external monitor or display device of an external computing device.

In embodiments, a receiver 153 and/or a processor/controller 291 (after receiving commands, signals or instructions) may communicate a message, command, signal and/or instruction to a proximity sensor 840 to determine whether or not an object is within an area (e.g., an area of danger) of a shading object and/or intelligent umbrella 151. If a proximity sensor 840 has detected that an object and/or user is within an area, then an emergency and/or shutdown mode may not be initiated until an object and/or user has exited an area surrounding and/or around an intelligent umbrella and/or shading object. In other words, rotation of a stem assembly 106 and/or central support assembly with respect to a base assembly 105, elevation of an upper support assembly 112 with respect to a lower support assembly 113, and/or deployment, movement, and/or retraction of arm support assemblies 109 may not be initiated and/or deployed until an object and/or user is outside an area where the object and/or user may be hit with assemblies and/or components of a shading object or intelligent umbrella.

Figure 1H:
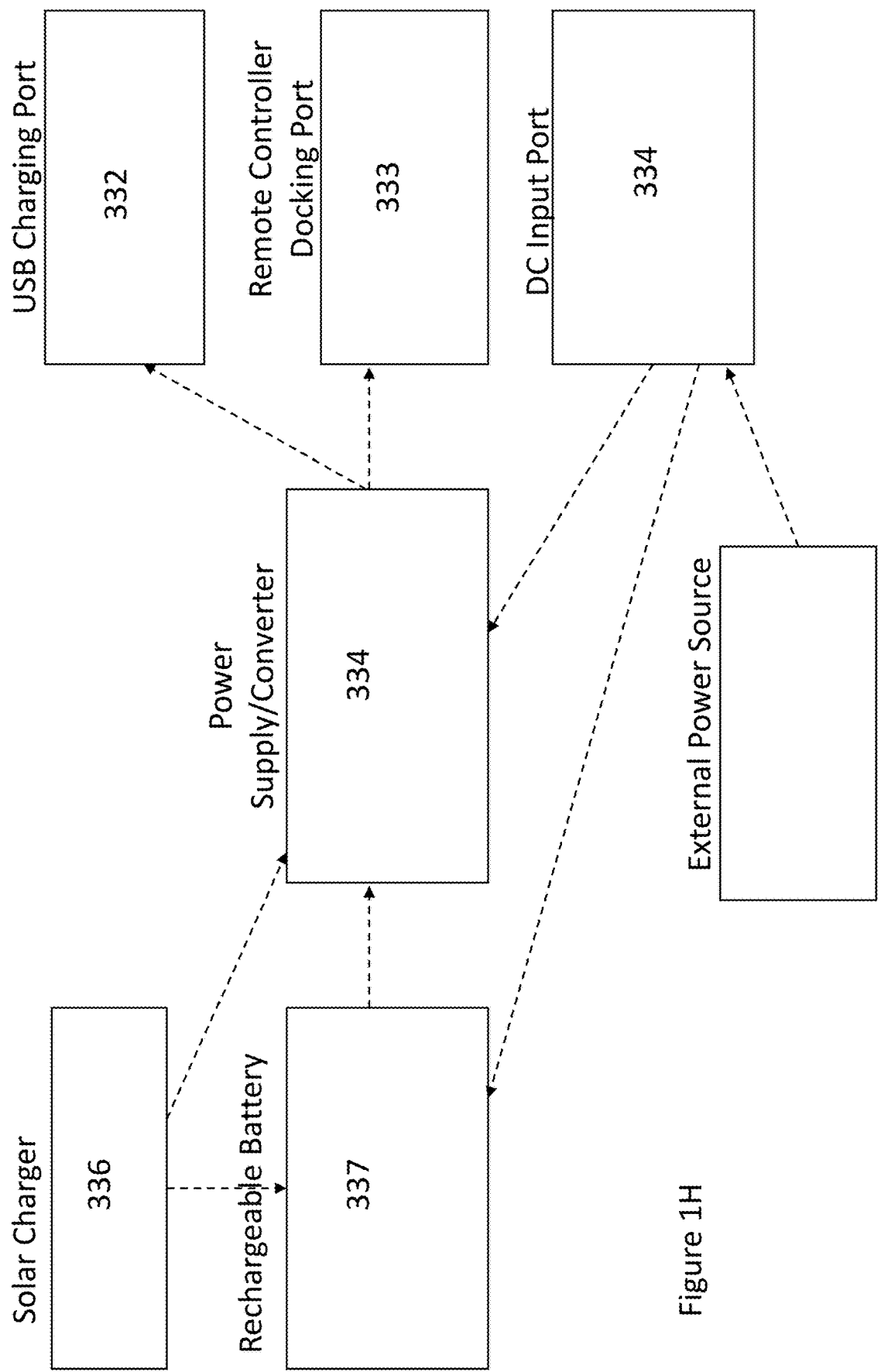
FIG. 1H illustrates a block diagram of power in a remote-controlled shading object according to embodiments.

In embodiments, a shading object and/or shading umbrella may comprise one or more charging ports and/or outlets. FIG. 1H illustrates an accessory power system for an intelligent umbrella and/or shading objects according to embodiments. In embodiments, for example, a shading object and/or shading umbrella may comprise a DC input port 331, a USB charging port 332 and/or a remote control docking port 333. In embodiments, a shading object and/or intelligent umbrella may comprise a power supply and/or converter 334 to supply power to a USB charging port 332 and/or a remote control docking port 333. For example, a solar power supply system 336 may support power to a power supply and/or converter 334. In embodiments, for example, a solar power supply 336 may comprise solar panels, a power converter, a solar power charger 336 and/or a rechargeable battery 337. In embodiments, a rechargeable battery 337 may supply and/or provide power to the power supply and/or converter 334. In embodiments, an external power source (e.g., an AC adapter, a power mains, a DC adapter) may also provide and/or supply power to the power supply and/or converter 334. In embodiments, the external power source may supply and/or provide power to a rechargeable battery and the rechargeable battery may provide power to the power supply and/or converter 334.

In embodiments, a remote device (e.g., remote control) may be a physically separate and unique device designed for operating shading objects and may include commands to operate features and functions of shading object and/or intelligent umbrella. In an embodiment, such a remote device (e.g., remote control) may have buttons or selectable items and/or icons for rotating a shading object and/or umbrella, elevating a shading object and/or umbrella, deploying and/or retracting arm support assemblies and arms, or placing an umbrella and/or shading object into an emergency shutdown mode. In embodiments, a remote device 157 (e.g., remote control) may also comprise buttons, selectable items and/or icons for operating an audio system of a shading object and/or intelligent umbrella 151. In embodiments, a remote device (e.g., remote control) may also comprise buttons, selectable items and/or icons for operating a computing device and/or one or more lighting systems (e.g., lighting assemblies and/or LED lights) of a shading object and/or intelligent umbrella 151. In embodiments, an existing remote device (e.g., remote control) may be programmed with codes and/or software to enable and/or allow control of a shading object and/or intelligent umbrella (such as the features and/or functions described above). For example, an existing satellite or cable television remote control, audio receiver remote control, wireless communication device, and/or portable computing device may be programmed with computer-readable instructions that are executed by a processor to create codes and/or signals that are communicated to a receiver/transceiver 153 in a shading object and/or intelligent umbrella 151 to perform specified features and/or functions. In embodiments, for example, a television remote control may be programmed to emit codes and/or signals to control and/or operating a shading object and/or intelligent umbrella. In embodiments, other computing devices (e.g., a cell phone, a wireless communication device, laptop computer, tablet computer, personal computer, desktop computer and/or other electronic devices (game consoles)) may have computer-readable instructions stored therein which are loaded into a memory of the computing device and executed by a processor to operate a shading object and/or intelligent umbrella. In embodiments, for example, a mobile application may be installed on mobile phone for remotely controlling a shading object and/or intelligent umbrella. In embodiments, for example, software may be installed on a laptop computer and/or desktop computer for remotely controlling a shading object and/or intelligent umbrella. In these embodiments, icons may be selected and/or voice commands may be processed by a software application to remotely control a shading object and/or intelligent umbrella 151.

Figure 3B:
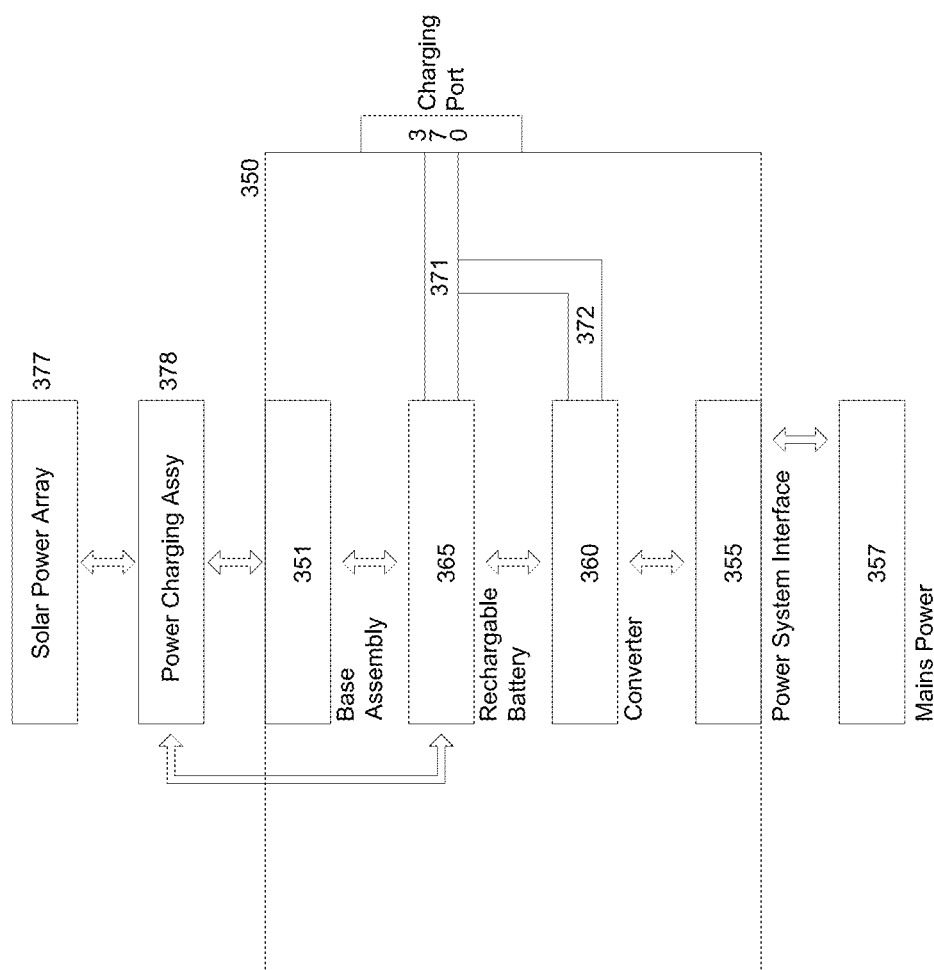
FIG. 3B illustrates a housing and/or enclosure according to embodiments.

FIG. 3B illustrates a housing and/or enclosure of an intelligent shading charging system according to embodiments. A housing and/or enclosure of an intelligent shading charging system is described in detail in non-provisional patent application Ser. No. 15/212,173, filed Jul. 15, 2016, entitled "Intelligent Charging Shading Systems," the disclosure of which is hereby incorporated by reference.

Figure 4A:
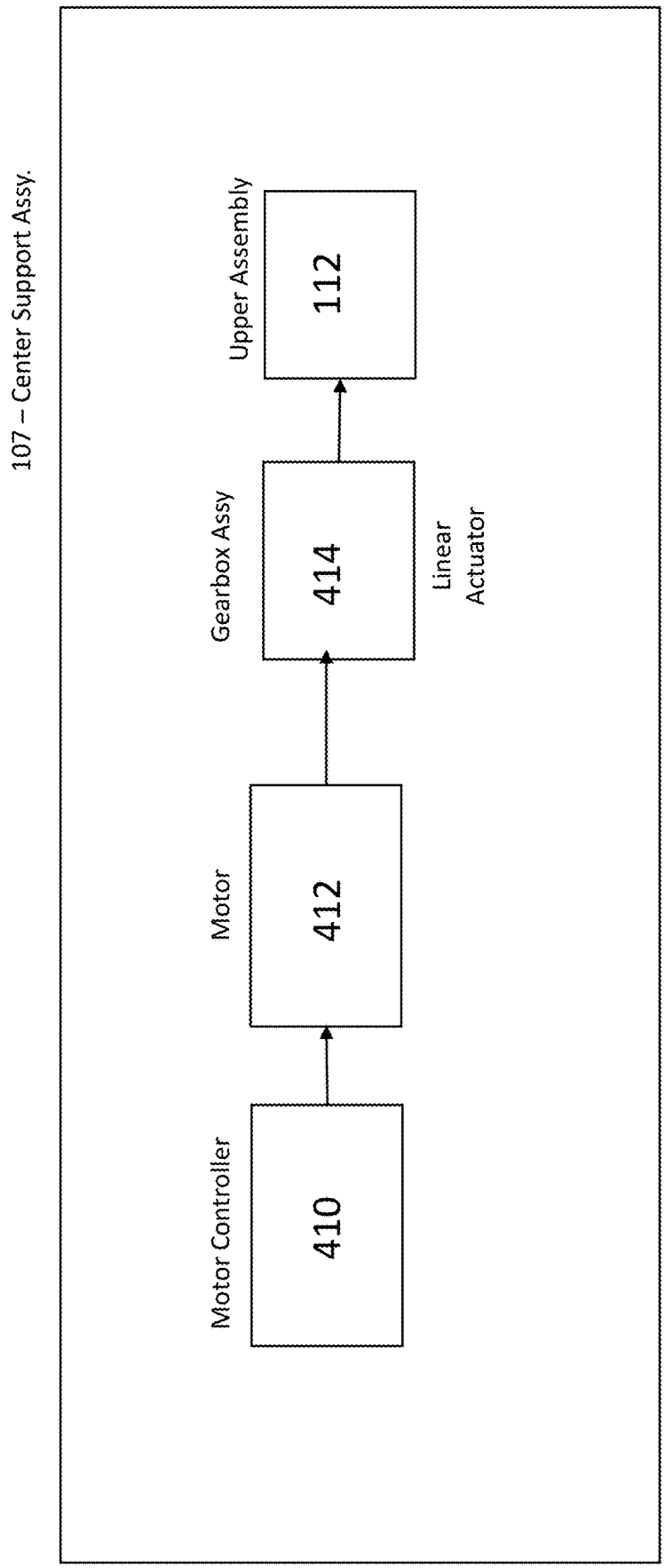
FIG. 4A illustrates a block diagram of a center support assembly motor control according to embodiments.

FIG. 4A illustrates a block diagram of a center support assembly motor control according to embodiments. A center support assembly 107 further comprises a second motor assembly, where a second motor assembly comprises a second motor controller 410 (which may or may not be installed on a shading object movement control PCB) and a second motor 412. In embodiments, a second controller 410 may receive commands, signals, and/or instructions from a shading object movement control PCB 895 (see FIG. 8), and/or a computing device, to control operation of a second motor 412. In embodiments, a second controller 410 may generate commands and/or signals causing a second motor 412 to drive its output shaft and engage a gearbox assembly 414 (or linear actuator), which in turn causes an upper assembly 112 of a center support assembly 107 to rotate and/or move with respect to a lower assembly 113. In embodiments, a second motor or actuator 412 may drive a hinging assembly 414 to move with respect to a stem assembly 106. In embodiments, an upper assembly 112 may move up to 90 degrees (or at a right angle) with respect to a lower assembly 113. In embodiments, a second motor or actuator 412 may comprise a pneumatic motor. In other embodiments, a second motor or actuator 412 may comprise a servo motor and/or a stepper motor. In embodiments, an encoder may be utilized for feedback of position information to a second motor controller or driver 410. In embodiments, an upper assembly 112 of a center support assembly 107 may further comprise and/or house an arm support assembly 108. In embodiments, arms and/or blades 109 may be connected, coupled and/or attached to a center support assembly 107.

Figure 4B:
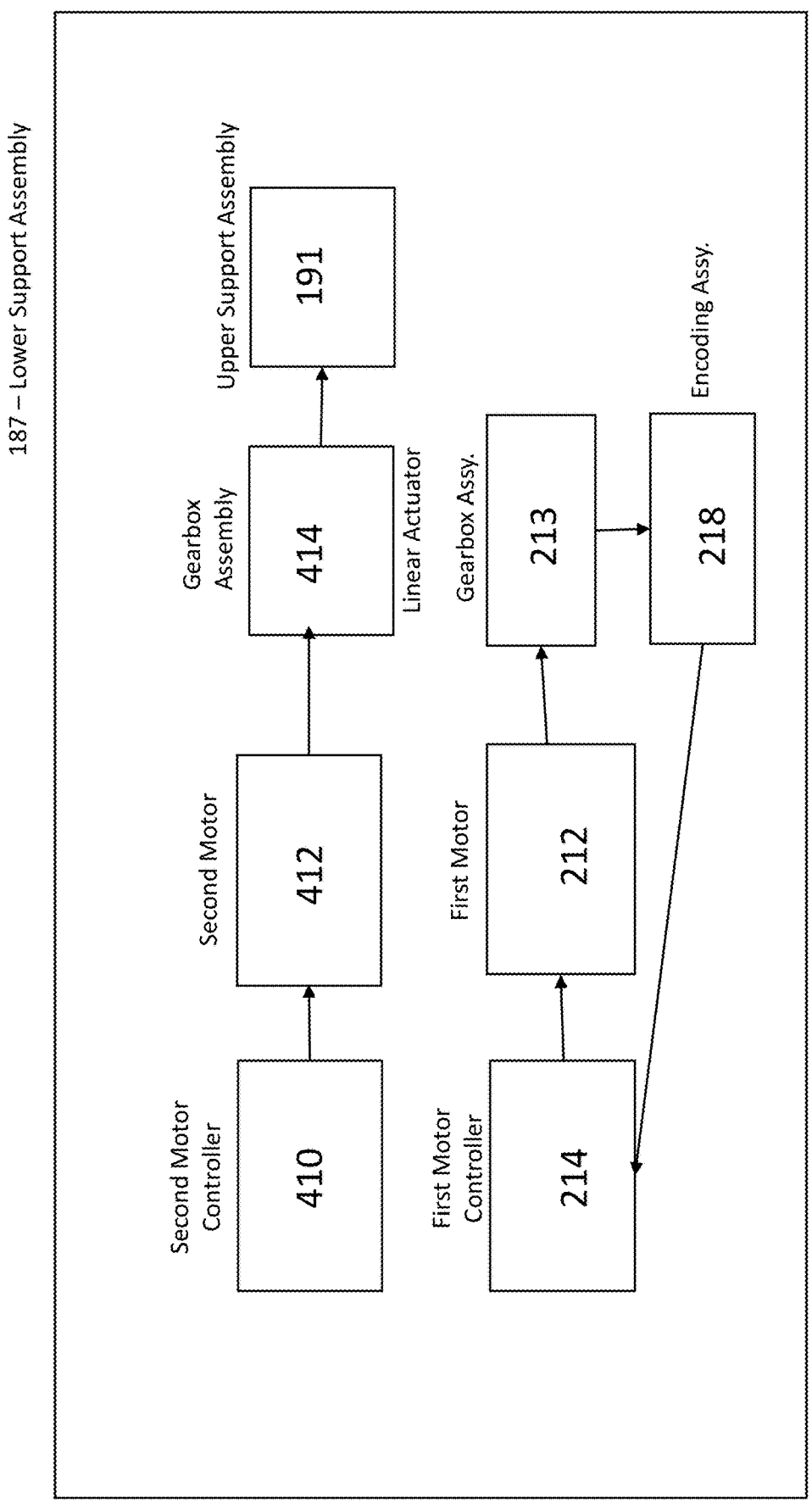
FIG. 4B illustrates a lower support motor assembly according to embodiments.

FIG. 4B illustrates a lower support motor assembly according to embodiments. In embodiments, such as illustrated in FIG. 1C, a lower 187 assembly may comprise a first motor assembly and/or a second motor assembly. In embodiments, a first motor assembly may comprise a first motor 212, a gear box assembly and/or hinging assembly 213, and/or a first motor controller 214. In embodiments, a second motor assembly may comprise a second motor 412, a second motor driver controller 410, an upper assembly 191, and a gearbox assembly 414. The first motor assembly and the second motor assembly for FIG. 1C and FIG. 4B is described in detail in non-provisional patent application Ser. No. 15/212,173, filed Jul. 15, 2016, entitled "Intelligent Charging Shading Systems," the disclosure of which is hereby incorporated by reference.

Figure 5A:
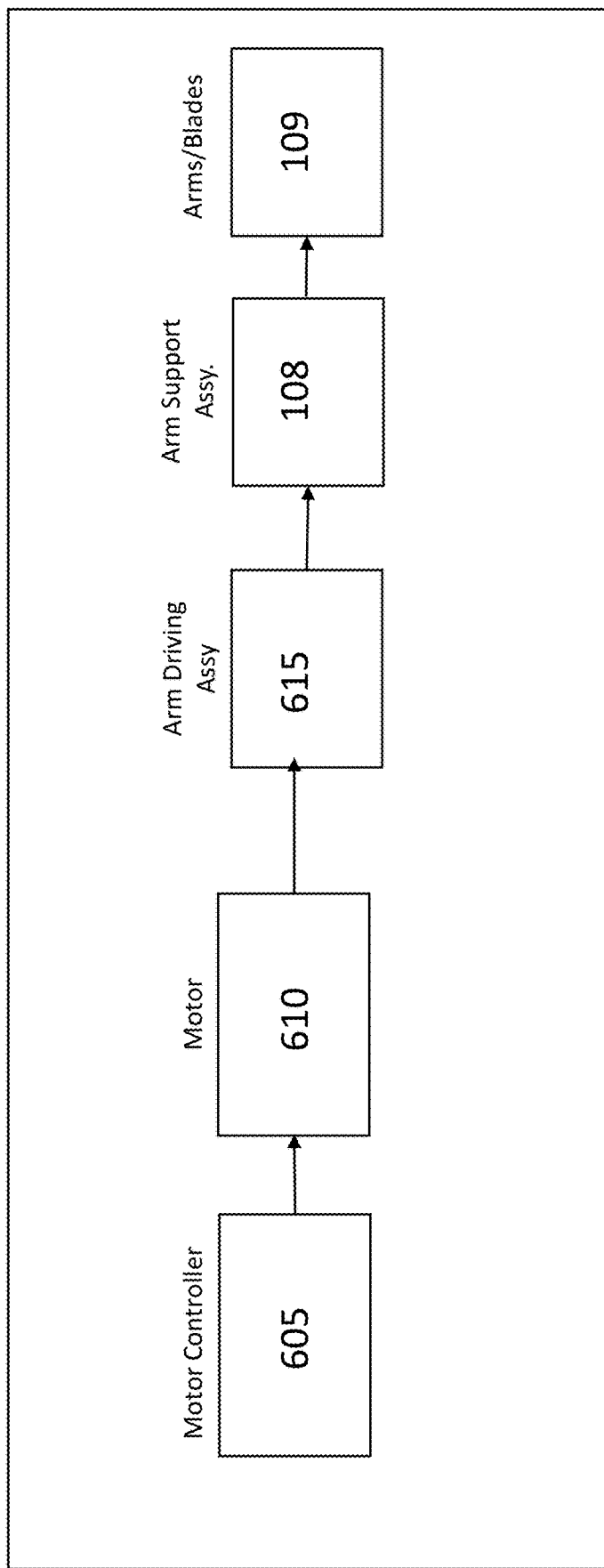
FIG. 5A illustrates a block diagram of an actuator or deployment motor in an intelligent umbrella or shading object according to embodiments.
Figure 6A:
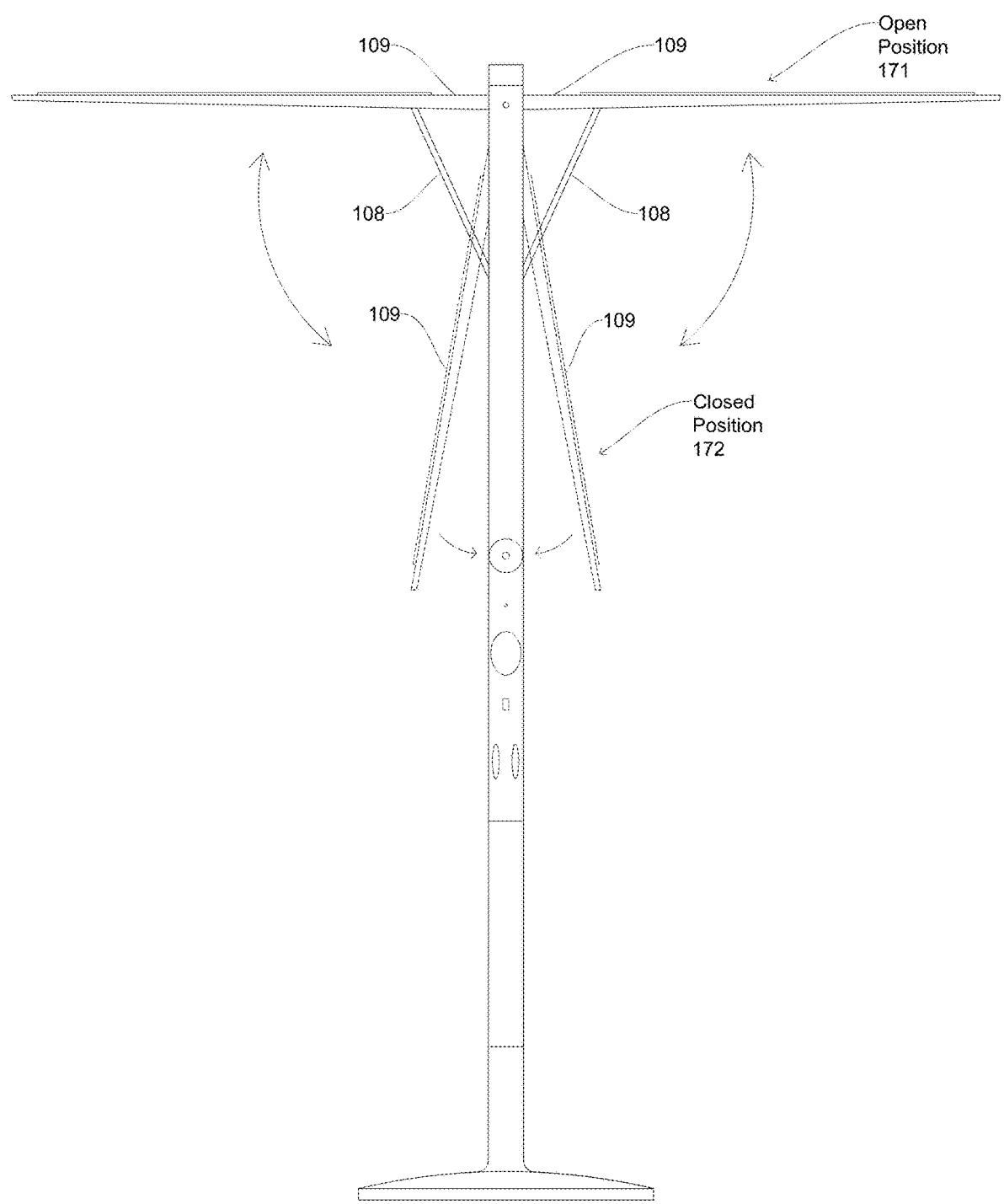
FIG. 6A illustrates a shading object or intelligent umbrella with arm support assemblies and arms/blades in an open position and a closed positions.
Figure 6B:
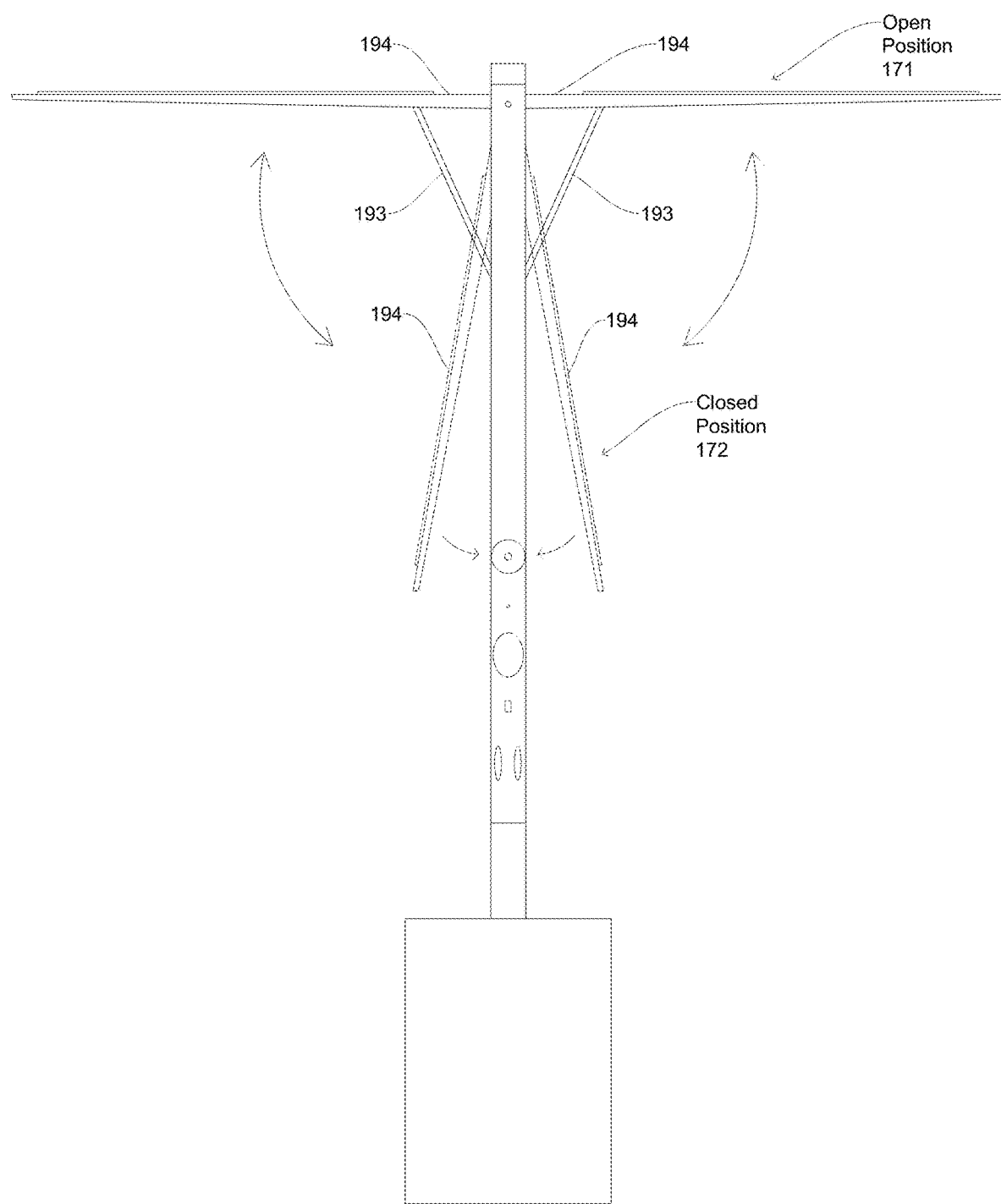
FIG. 6B illustrates an intelligent shading charging system with arm support assemblies and arms/blades in an open position and a closed position.

FIG. 5A illustrates a block diagram of shading object actuator or deployment assembly according to embodiments. In embodiments, an upper assembly 112 of a center support assembly 107 may further comprise a third motor assembly, an arm driving assembly, an arm support assembly 108 and/or arms/blades 109. In embodiments, a third motor assembly may comprise a third motor controller 605, a third motor 610, and an arm driving assembly 615. FIG. 6A illustrates a shading object with arm support assemblies 108 and arms/blades in an open position 171 and a closed position 172. FIG. 6B illustrates an intelligent shading charging system with arm support assemblies 193 and arms/blades 194 in an open position 171 and a closed position 172.

In embodiments, some of these assemblies may be housed in a lower assembly 113. In embodiments, a third motor controller 605, a third motor 610, an arm supporting assembly 108 and/or arm/blade 109 may be housed and/or positioned in an upper assembly 112, which may be positioned above a lower assembly 113 of a center support assembly 107. In embodiments, a third motor 610 may comprise a stator, rotor and shaft/spindle. In embodiments, a shaft/spindle may be coupled and/or connected to a rod (e.g., a threaded rod). In embodiments, an arm driving assembly 615 may comprise at least a threaded rod and a collar. In embodiments, a threaded rod may be coupled and/or connected to a collar, and a collar may have a number of slots to which linked arm supports (e.g., arm support assembly 108) are linked, coupled or connected. In embodiments, a linear actuator may be coupled in between a third motor controller 605 and arm supporting assembly 108. FIG. 7 illustrates assemblies to deploy arms and/or blades according to embodiments. In embodiments, arm supports and/or arm supporting assemblies 108 may be coupled to arms, blades or other similar devices. In embodiments, arms, blades, and/or other similar devices 109 may be detachably attached to an arm driving assembly. A shading fabric may be detachably attached to arms/blade 109 and/or arm supporting assembly 108. In an embodiment illustrated in FIG. 7, a shading object and/or umbrella may comprise an upper assembly 112 of a center support assembly 107, one or more arm support assemblies 108, one or more arms/blades 109, on or more solar panels (not shown), and a shading fabric cover 705. In embodiments, a shading fabric cover 705 may include fabric fused with flexible solar cells. In embodiments, arm support assemblies 108 (or articulating blades) may be in a rest position inside an upper assembly 112 of a center support assembly 108 (e.g., a recess or a recessed channel in an upper assembly 112). As is illustrated in FIG. 7, arm support assemblies 108 may be connected to a top end 710 (or upper section) of an upper assembly 112 of a center support assembly 107. In embodiments, arms/blades 109 may be attached, adhered, fastened, and/or connected to arm support assemblies 108 (e.g., articulation blades). As illustrated in FIG. 7, arm support assemblies 108 and/or arms/blades 109 may have holes or openings and a fastener or connector may be used to attach and/or fasten the arm support assemblies 108 to the arms/blades 109. In embodiments, arm support assemblies 108 and/or arms/blades 109 made be adhered together, fastened together, welded together, or may be snapped together to fit. In embodiments, a fabric cover 715 may be connected, adhered, and/or fastened to arms/blades 109. In embodiments, a fabric cover 715 may include integrated flexible solar panels. In embodiments, integrated flexible solar panels may be placed in a weather proof housing 735 in a fabric cover 715 and/or in a weather proof housing in arms/blades 109. In embodiments, when arm support assemblies are deployed to an open position, the arm support assemblies 108 may move in a direction as shown by reference number 720 and 725. In other words, arm support assemblies 108 (and thus the attached arms/blades 109) move at an angle with respect to a vertical axis coming out of a center support assembly 107. In embodiments, as illustrated in FIG. 7, a vertical axis is represented by reference number 730.

In embodiments, a third motor controller (or motor driver) 605 may receive commands, signals, and/or instructions from a shading object movement control PCB 895 (and/or a shading object computing device 860) to control operation of a third motor 610. In embodiments, a third motor controller 605 may generate commands and/or signals causing a third motor 610 to drive its outside shaft and engage a gearbox assembly 615 (or linear actuator or gearing assembly), which in turn causes movement of a linked arm support assemblies 108. In embodiments, a linear actuator may incorporate a motor. In embodiments, a potentiometer may act as a control device to limit how much arm support assemblies 108 deploy or move away from an upper assembly 112 of a center support assembly 107. In embodiments, for example, a potentiometer may feedback how far and/or much arm support assemblies 108 have been deployed and/or may stop deployment or movement when a predefined distance is reached (or when a full deployment distance is reached). In embodiments, a third motor 610 may comprise a pneumatic motor. In other embodiments, a third motor 610 may comprise a servo motor and/or a stepper motor.

In embodiments, a rotation of a shaft/spindle of a third motor 610 may be transmitted to a threaded rod. In embodiments, a rotation may be transmitted accordingly to a gearing ratio in order to reduce speed transferred to a threaded rod. In embodiments, a gearbox assembly (or linear actuator) may be located between an output shaft of a third motor 610 and may establish a gearing ratio in order to generate necessary torque. In embodiments, a threaded rod is rotated about its own axis and is coupled to a collar via a nut or other fastener. In embodiments, a threaded rod's rotation may cause a collar (or vertical movement assembly) to rotate and/or move in a vertical direction (e.g., in an up or down direction). A movement of a collar in a vertical direction may cause one or more linked arm support assemblies 108 to be moved outward from a shaft of a center support assembly 107 in order to deploy one or more linked arm support assemblies 108 in an open position (extend outwards and away from an upper assembly 112. Once one or more linked arm supports are extended and/or deployed, a shading fabric may be attached to arms/blades 109 and/or linked arm supports 108 of the shading system. In embodiments, a shading fabric 715 may be connected to arms/blades 109 and/or linked arm supports (support assemblies 108) before linked arm supports are deployed and/or extended. In this illustrative embodiment, deployment of one or more linked arm assemblies 108 results in stretching of a shading fabric 715 between one or more arms/blades 109 and/or linked arm support assemblies 108. In embodiments, a shading object may be ready for use to provide shade for a user in an outdoor environment.

Similarly, if a shading object is to be placed in a rest or closed position, in embodiments, a third motor 610 output shaft may be rotated in an opposite direction. In embodiments, a threaded rod may be rotated in an opposite direction (e.g., counterclockwise), and a collar (or vertical movement assembly), which may be coupled and/or connected to the threaded rod, may move in a downward direction. One or more linked arm support assemblies 108, which are linked, coupled, and/or connected to the collar on one end and blades/arms 109 on another end, will drop and/or move from an extended position to an at rest position. In embodiments, a shading object or umbrella may have a plurality of vertical movement assemblies (e.g., collars) linked separately to a plurality of arm support assembles. In embodiments, linked arms supports may not need to be extended and/or moved together. In embodiments, a separate motor may be connected to one or more linear actuators, which in turn may be linked to a corresponding arm support assembly, so that each of corresponding arm support assemblies may be moved independently.

In embodiments, the linked arm supports (or support assemblies) 108 may come to rest inside a center support assembly 107 of a shading object. In other words, the linked arm supports or linked arm support assemblies 108 may contract or come to rest into and/or inside channels of a center support assembly 107 of the shading object. In embodiments, one or more linked arm support assemblies 108 may rest or be housed in channels of an upper assembly 112 or a center support assembly 107, which provides for convenient storage of arm support assemblies. In embodiments, a shading object may comprise between one and 20 linked arm support assemblies 107 and/or arms/blades 108.

In embodiments, a shading object central support may comprise one or more shading object arm support assemblies 108 that are deployed outward from a shading object central support 107. In embodiments, shading object blades/arms 109 may be attached and/or connected, respectively, to a shading object central support arm assembly 107. In embodiments, shading object arms/blades 109 may be detachably connected to a shading object arm support assembly 108. In embodiments, a detachable coupling may occur after shading object arms support assemblies 108 have been opened and/or deployed. In embodiments, shading object arms or blades 109 may be coupled and/or connected to shading arm support assemblies 108 and rest inside a shading object central support assembly 107 until deployment. In embodiments, shading object arms/blades may comprise any shape (e.g., rectangular, triangular, circular). In embodiments, shading object arms/blades may have openings in a shape (e.g., rectangle and/or triangle) rather than being a solid price of material. In embodiments, shading arms/blades may form a frame onto which a shading object is attached. In embodiments, a shading object central support may comprise between 1-10 shading object arm supports and 1-20 shading object blades and/or arms). In embodiments, one or more shading object arms may comprise fasteners and/or connectors. In embodiments, a shading fabric may be connected and/or attached to shading arm connectors and/or fasteners. In embodiments, a shading fabric 715 may be connected and/or attached to shading arms after deployment of shading arm supports. In embodiments, a shading fabric 715 may be connected and/or attached to shading arms before shading arms are connected to the shading arm support assemblies.

Figure 5B:
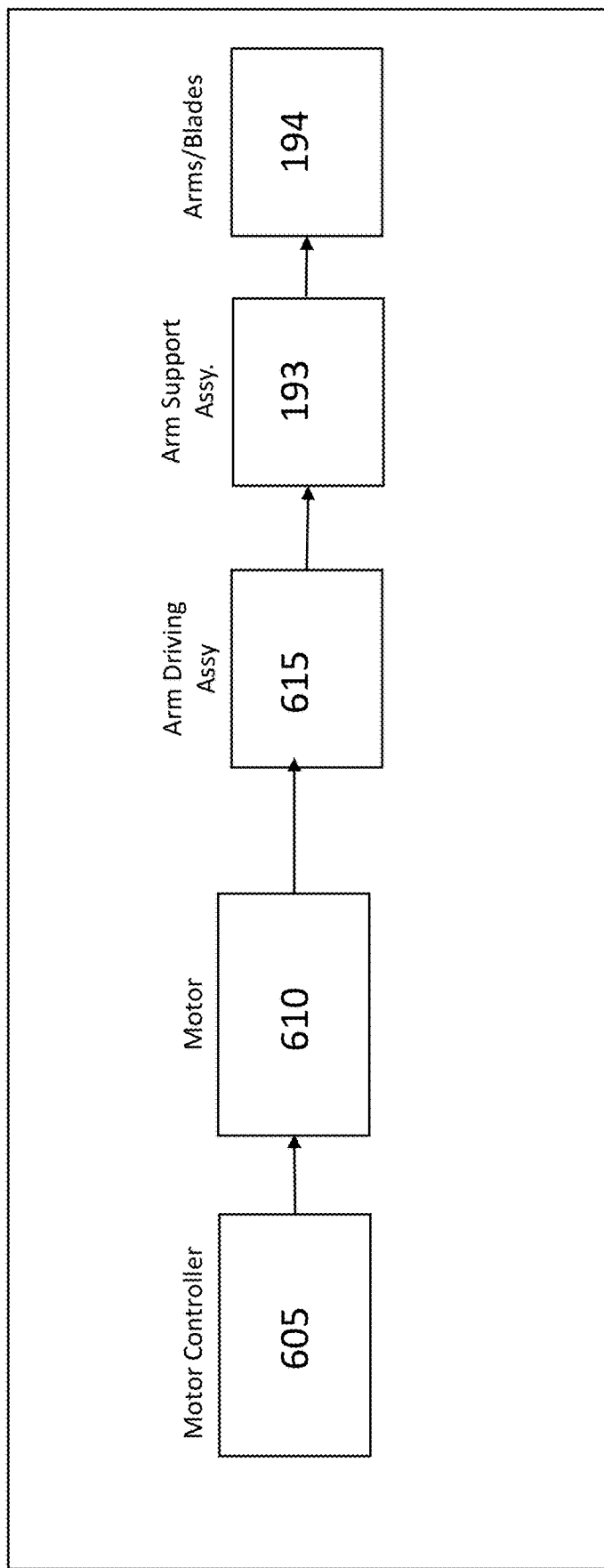
FIG. 5B illustrates a block diagram of an actuator or deployment motor in an intelligent shading charging system according to embodiments.

FIG. 5B illustrates a block diagram of shading object actuator or deployment assembly according to embodiments. In embodiments, such as illustrated in FIG. 1C, an upper support assembly 191 of an intelligent shading charging system may further comprise a third motor assembly, one or more arm support assemblies 193 and/or one or more arms/blades 194. In embodiments, a third motor assembly may comprise a third motor controller 605, a third motor 610, and an arm driving assembly 615. In embodiments, an intelligent shading charging system actuator or deployment assembly, and/or a third motor assembly is described in detail in non-provisional patent application Ser. No. 15/212,173, filed Jul. 15, 2016, entitled "Intelligent Charging Shading Systems," the disclosure of which is hereby incorporated by reference.

Discussions herein may describe intelligent shading objects and/or intelligent umbrellas with a base assembly 105, a stem assembly 106, a center support assembly including an upper support assembly and a lower support assembly). The discussions presented herein also are applicable to the intelligent shading charging systems illustrated and/or described in the FIGS. 1C and 1D. Detailed discussions of such subject matter is in non-provisional patent application Ser. No. 15/212,173, filed Jul. 15, 2016, entitled "Intelligent Charging Shading Systems," the disclosure of which is hereby incorporated by reference. FIGS. 8A and 8B illustrates a block diagram of hardware and/or combined hardware/software assemblies in a shading object according to embodiments. In embodiments, a shading object or umbrella may not have one, more than one, or all of listed shading object components and/or assemblies. In embodiments, as is illustrated in FIGS. 8A and 8B, a shading object, intelligent umbrella, and/or intelligent shading charging system may comprise a telemetry printed circuit board (PCB) comprising a processor 805, a weather variable PCB comprising a processor 810, a voice recognition PCB and/or engine 815, a rechargeable battery 820, and one or more solar panels and/or solar panel arrays 825. In embodiments, a shading object, umbrella and/or shading charging system may comprise a power tracking solar charger 830, a power input or power source (e.g., AC adapter assembly) 835, a lighting assembly 870, an audio system 875 and/or a computing device 860. In embodiments, a shading object, umbrella and/or shading charging system may include an obstacle detection module 855, a motion sensor 845, a proximity sensor 840, a tilt sensor 855, a personal area network communications module or transceiver 865, a first motor controller and motor (azimuth motor and controller) 880, a second motor controller and motor (elevation motor and controller) 885, and a third motor controller and motor (an actuator motor and controller) 890. In embodiments, a weather variable PCB 810 may be coupled and/or connected to one or more air quality sensors 811, UV radiation sensors 812, a digital barometer sensor 813, a temperature sensor 814, a humidity sensor 816, and/or a wind speed sensor 817. In embodiments, a wind sensor 817 may be a thermistor. In embodiments, a telemetry PCB 805 may be coupled and/or connected to a GPS/GNSS sensor 807 and/or a digital compass 808. Although at times a shading object, intelligent umbrella and/or shading charging system may singularly be mentioned, the disclosure herein may be implemented in any of the above-mentioned devices and/or apparatus.

In embodiments, a shading object, intelligent umbrella and/or shading charging system may comprise a telemetry printed circuit board (PCB) comprising a processor 805 and the telemetry PCB may provide potential location and orientation information. In embodiments, a weather variable PCB comprising a processor 810 may provide sensor weather variables surrounding a shading object and/or umbrella. In embodiments, a wind sensor 817 may detect a high wind conditions, generate signals, and an umbrella movement control PCB 895 may generate signals and/or commands causing arm support assemblies to close or move to a closed position. In embodiments, a voice recognition engine or module 815 may enable control of a shading object via voice commands and/or a microphone. In embodiments, a voice recognition engine or module 815 may generate voice responses and/or audible warnings. In embodiments, a rechargeable battery 820 may be charged or powered by an AC adapter, a DC adapter, and/or an array of solar cells 825, which provide power (e.g., current and/or voltage) to a power tracking solar charger 830 and other assemblies and/or components. In embodiments, a power tracking solar charger 830 may regulate and balance a charging process. In addition, a power tracking solar charger 830 may provide data and/or information regarding a charging state. In embodiments, an AC adapter 835 and/or a DC adapter may plug into a power source (e.g., a wall outlet and/or a generator).

In embodiments, a proximity sensor 840 may identify location of a person relative to moving components of a shading object, umbrella and/or shading charging system. In embodiments, a motion sensor 845 may detect and/or identify a presence of an individual in an area around a shading object or umbrella. In embodiments, an obstacle detector 850 may detect presence of a person and/or object in a shading object's path of travel. In embodiments, a tilt sensor 855 may detect movement and/or relocation of a shading object and/or umbrella with respect to a correct position. In embodiments, a personal area network (PAN) (e.g., Bluetooth) module 865 and/or transceiver may provide short distance communication for application based control, audio sound transmission and/or data processing and/or retrieval. In embodiments, a lighting assembly 870 may provide and/or project light for a shading object and/or an area around a shading object. In embodiments, an audio system 875 may provide or generate audio playback through a mobile application of WiFi stream or through a PAN (e.g., Bluetooth) transceiver 865.

In embodiments, a shading object, umbrella and/or shading charging system may comprise one or more printed circuit boards. Although a description may reference a specific printed circuit board, many of features or functions of a shading object, umbrella and/or shading charging system may be implemented utilizing components mounted on a single, two or three circuit boards. In addition, one or more components may be mounted on printed circuit boards, which results in a large number of circuit boards within a shading object, umbrella and/or shading charging system. In other words, a number of circuit boards may be utilized to provide features and/or functions of a shading object and/or umbrella although embodiments described herein may only describe a specific number. Although the term "circuit board" or "printed circuit board" is utilized, any electronic device allowing installation on and communicate with components may be utilized along with circuit board. As used in this specification, the terms "printed circuit board" and "PCB" are intended to refer generally to any structure used to mechanically support and electrically connect electronic components using conductive pathways, tracks, or signal traces etched from (e.g., copper) sheets laminated onto a non-conductive substrate. Synonyms for printed circuit boards include printed wiring boards and etched wiring boards.

In embodiments, a shading object, umbrella and/or shading charging system may comprise one or more printed circuit boards. In embodiments, a shading object or umbrella 800 may comprise a movement control PCB 895, a shading object computing device or computing device PCB 860, a first motor PCB (azimuth control) 880, a second motor PCB (elevation control) 885, a third motor PCB (actuation/deployment control) 890, a telemetry PCB (location and orientation data/information collection) 805, and/or a weather variable PCB (environmental sensor data/information collection) 810.

In embodiments, a telemetry PCB 805 comprises a processor, a memory, a GPS receiver and/or transceiver and/or a compass (e.g. a digital) compass). The GPS receiver and/or compass provides location and orientation information and/or measurements which may be transferred to a memory utilizing a processor. In embodiments, a telemetry PCB processes and conditions the communicated information and/or measurements. In embodiments, a telemetry PCB 805 communicates measurements and/or additional information (e.g., in some cases, measurements are conditioned and processed and in some cases, measurements are raw data) to a shading object movement control PCB 895 which analyzes the received location and/or orientation information and measurements.

In embodiments, a weather variable PCB 810 comprises a processor, a memory, an air quality sensor, a UV radiation sensor, a barometer, a temperature sensor, a humidity sensor, and/or a wind speed sensor. One or more of the listed sensors may generate environmental and/or weather measurements and/or information, which may be transferred to a memory utilizing a processor. In embodiments, a weather variable PCB 810 processes and conditions information and measurements from the one or more sensors. In embodiments, a weather variable PCB 810 communicates received environmental and/or weather sensor measurements (e.g., in some cases conditioned and processed and in some cases raw data) to a shading object movement control PCB 895 which analyzes the received location and/or orientation information and measurements.

In embodiments, a center support assembly 107 may comprise an umbrella movement control PCB 895, as well as an integrated computing device PCB 860. In embodiments, a movement control PCB 895 may also be located in a stem assembly 106 and/or a base assembly 105. In embodiments, other terms may be utilized in place of circuit board, such as printed circuit board, a flexible circuit board, and/or an integrated circuit. In embodiments, an umbrella movement control PCB 895 may consume a low amount of power and may be referred to as a low-power PCB. In embodiments, this may prove to be a benefit as compared to prior-art umbrellas which utilized a large amount of power and thus needed to have power from a power source and could not be powered by an array of solar cells providing power to a solar power charger 830. In embodiments, a solar array may provide enough provide power to power components on an umbrella movement control PCB 895. In this case, for example, components and associated activities controlled by an umbrella movement circuit PCB 895 may not consumer large amounts of power because these activities do not require continuous operation and may only receive information or measurements on a periodic basis. As an example, an intelligent shading object 800 may not be rotating and/or tilting frequently. Thus, in embodiments, therefore, sensors providing these measurements (e.g., a tilt sensor or sunlight sensor), and a movement control PCB communicating these measurements may not need to be in an active state at all times, which results in significant power usage savings for a shading object and/or controller. In embodiments, a motion control PCB 895 may comprise a processor 896, a non-volatile memory 897, a volatile memory, and many other components described above and below. In embodiments, for example, computer-readable instructions may be fetched from a non-volatile memory 897, loaded into a volatile memory 898, and executed by a processor 896 to perform actions assigned to, controlled and/or commanded a motion control PCB 895. In embodiments, non-volatile memory may be flash memory, ASIC, ROMs, PROMs, EEPROMs, solid state memory, CD, DVD, persistent optical storage or magnetic storage media.

In embodiments, as a further example, shading object motors, e.g., a first motor (azimuth movement motor), a second motor (elevation movement motor), and/or a third motor (articulation or actuator movement motor) may not be utilized frequently, so there does not need to be a large amount of power utilized by these motors within a shading object. In embodiments, when motors and/or motor assemblies are operating, the motors may require 2 to 3 amps. If system is idle and for example, the shading computer is not operating, an intelligent shading object may only require 180 milliamps. If an audio system is operating, e.g., music is playing and the amplifier and speakers are being utilized, only 400-500 milliamps, In addition, motor controllers may not be utilized frequently since the motor controllers may not be driving and/or sending commands, instructions, and/or signals to motors frequently. Thus, a low-power movement control PCB 895 may provide a shading object owner with power usage savings and efficiency.

In embodiments, readings and/or measurements from sensors may cause a movement control PCB 895 to transmit commands, instructions, and/or signals to either a first motor control PCB 880 (azimuth movement), a second motor control PCB 885 (elevation movement), and/or a third motor control PCB 890 (actuation movement), in order to cause specific movements of different assemblies of a shading object or umbrella. For example, in embodiments, a GPS transceiver 806 may receive GPS signals and provide GPS measurements (e.g., values representative of a longitude, latitude, and/or an altitude reading) to a movement control PCB 895. In embodiments, a movement control PCB 895 may analyze the GPS measurements and determine that a shading object, umbrella, and/or shading charging system should be moved to a specific elevation. In other words, in embodiments, a movement control PCB 895 may utilize GPS generated measurements to direct a second motor assembly to move to a proper elevation. In embodiments, GPS measurements (coordinates and time) identify a proper elevation of the sun based on a geographic location. In embodiments after center support assembly 107 is moved to a position identified by GPS measurements, arm support assemblies 108 may be extend and the arms and/or blades 109 may be fully deployed. In embodiments, a movement control PCB 896 may communicate commands, instructions, and/or signals to a second motor control PCB 885 to cause an upper assembly 112 of a center support assembly 107 to rotate or move approximately 45 degrees in a downward direction with respect to a lower assembly 113 of the center support assembly. In embodiments, a movement control PCB 895 may communicate commands, instructions, and/or signals to a third motor control PCB to fully extend arm support assemblies 108 (e.g. articulating blades/assemblies) and also arms/blades 109.

In embodiments, a digital compass 807 may generate a heading and/or orientation measurement and a telemetry PCB 805 may communicate a heading and/or orientation measurement to a movement control PCB 895. In embodiments, a movement control PCB 895 may analyze a heading measurement and generate and/or communicate commands, instructions, and/or signals to a first control PCB 880 to rotate a stem assembly 106 and a center support assembly 107 (e.g., an umbrella support assembly) to face or move the shading object towards a light source (e.g., a sun). In embodiments, digital compass measurements may be utilized as directional input for an azimuth (or first motor). In embodiments, a movement control PCB 895 may calculate counts and/or limits for motors to properly orient an intelligent shading object based on GPS measurements and/or digital compass measurements. Continuing with this embodiment, a movement control PCB 895 may generate and/or communicate commands, instructions, and/or signals to a third motor controller PCB 890 to cause arm support assemblies 108 to be extended or deployed along with arms/blades 109.

In embodiments, a wind speed sensor 817 may generate measurements and a variable weather PCB 810 may communicate measurements to a shading object movement control PCB 895. In embodiments, a movement control PCB 895 may analyze and/or compare communicated measurements to a threshold in order to determine if unsafe conditions are present. In embodiments, for example, if a wind speed threshold is reached or exceeded, identifying an unsafe condition, a movement control PCB 895 may communicate commands, instructions, and/or signals to move shading object assemblies to a rest position. Continuing with this illustrative example, a movement control PCB 895 may communicate commands or instructions or signals to a second movement control PCB to cause an upper assembly 112 to move to an original position (e.g., at rest position), which may be where an upper assembly 112 is a vertical extension of a lower assembly 113. In embodiments, a movement control PCB 895 may communicate instructions, commands and/or signals to a third motor control PCB 890 to move arm support assemblies 108 back into an upper assembly and/or retract arm support assemblies 108 into channels of an upper assembly 112. In embodiments, a movement control PCB 895 may communicate commands, instructions and/or signals to a sound reproduction system 875 and/or a display device to warn a user of unsafe wind conditions. Although the description above corresponds to the intelligent umbrella of FIGS. 1A and 1B, the description applies to similar components in the intelligent shading charging system of FIG. 1C.

In embodiments, a first motor control PCB 880, a second motor control PCB 885, a third motor control PCB 890 and a movement control PCB 895 may be connected to each other via wires and/or traces and instructions may, commands and/or signals may be communicated via wires and/or traces. In embodiments, the motor control PCBs 880, 885 and 890 may communicate with a movement control PCB 895 via a personal area network communications protocol, e.g., Bluetooth. In embodiments, a weather variable PCB 810 and/or a telemetry PCB 805 may communicate with a movement control PCB 895 via wires, traces, integrated circuits, and/or interfaces and communicate instructions, commands or signals. In embodiments, a weather variable PCB 810 and a telemetry PCB 805 may communicate with a movement control PCB 895 via personal area network protocols (utilizing a PAN transceiver—e.g., a Bluetooth transceiver). In embodiments, motor control PCBs 880 885 890 may communicate directly (either via wires or a wireless communication protocol) with a weather variable PCB 810 and/or a telemetry PCB 805 without utilizing a computing device 860 and/or a movement control PCB 895.

In embodiments, as described above, a shading object, intelligent umbrella and/or shading charging system may comprise a computing device PCB, which may comprise a computing device 860 in a shading object, intelligent umbrella and/or shading charging system. In embodiments, a shading object, intelligent umbrella and/or shading charging system may comprise a computing device 860 which is not installed and/or mounted on a computing device PCB. In embodiments, a computing device 860 and/or a computing device PCB may consume a larger amount of power (with respect to movement control PCB 895) due to activities it is responsible for executing being performed more frequently and/or with a higher data throughput. In embodiments, an integrated computing device 860 may be responsible for camera control, video and/or image processing, external Wi-Fi communication, e.g., such as operating as a hot spot, as well as running various software applications associated with the intelligent shading object, umbrella and/or intelligent shading charging system. The computing device 860, because of operating and being responsible for more data intensive features and/or functions, may require more processing power due to extended operation and continuous data throughput. In embodiments, a computing device may be integrated into a center support assembly 107. In embodiments, a computing device may be integrated into a base assembly and/or a stem assembly of FIGS. 1A and 1B. In embodiments, a computing device may be incorporated into a housing and/or enclosure 182, a lower support assembly 187 and/or an upper support assembly 191.

Figure 9:
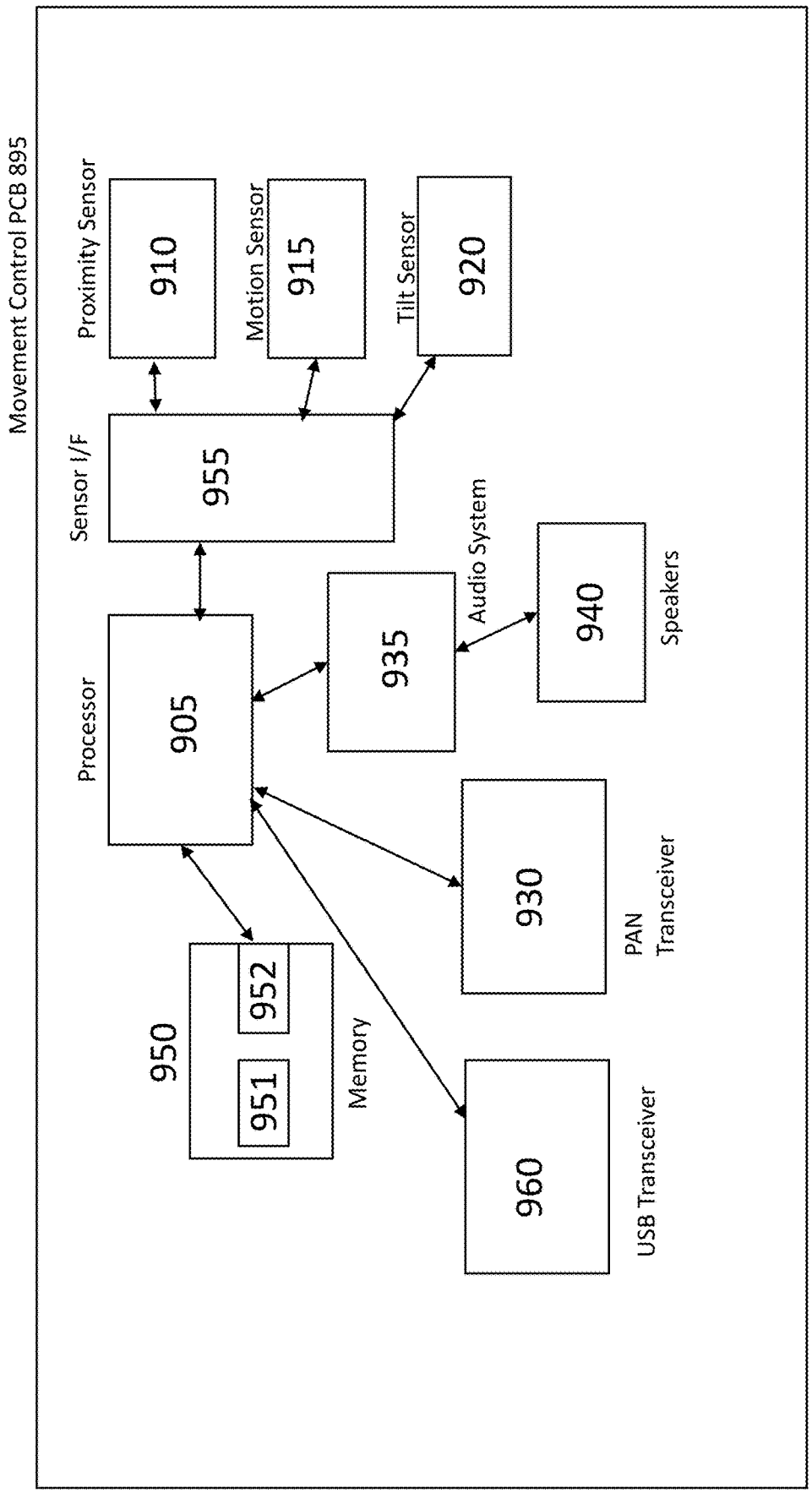
FIG. 9 illustrates a block diagram with data and command flow of a movement control PCB according to embodiments.

FIG. 9 illustrates a block diagram of a movement control PCB according to embodiments. Returning back to discussion of a movement control PCB, in embodiments, a movement control PCB 895 may comprise a processor/controller 905, a proximity sensor 910, a motion sensor 915, a tilt sensor 920, a personal area network transceiver 930, an audio receiver 935 (optional), one or more speakers 940, and/or a memory 950 having umbrella or shading object control software (e.g., executable instructions stored in a non-volatile memory 951 and executable by a processor 905). In embodiments, an umbrella movement control PCB 895 may comprise a USB transceiver 960. In embodiments, an umbrella movement control PCB 895 may comprise sensor interface subsystem 955 for communicating sensor measurements to an umbrella movement control PCB 895 and communicate commands and/or signals from and two to external sensors. In embodiments, a sensor interface subsystem 955 may be located, or may also be located on a telemetry PCB 805, a weather variable PCB 810, and/or first, second, or third motor control PCBs 880, 885, and 890. For example, in embodiments, an intelligent shading object, umbrella and/or shading charging system may also include a signal conditioning subsystem which may also be referred to as a sensor interface system and the terms may be utilized interchangeably throughout the specification. In embodiments, an intelligent shading object, umbrella and/or shading charging system (and the signal conditioning subsystem) may further comprise one or more reference signal modules, one or more signal conditioning modules, and one or more analog-to-digital converters. In an embodiment, one or more sensors (e.g., air quality sensor 811, UV radiation sensor 812, wind speed sensor 817, motion sensor 845, and/or tilt sensor 855) may receive communicated analog signals and may transmit analog signals to signal conditioning modules 955. In embodiments, a signal conditioning module 955 may process and/or condition communicated analog sensor signals. Although signals are described as being analog, the description herein equally applies to digital signals. In embodiments, one or more signal conditioning modules may communicate and/or transfer processed and/or conditioned signals to one or more A-to-D converters. In embodiments, one or more signal reference modules may be a non-volatile memory, or other storage device, that stores and/or retrieves signal values that the communicated signal values may be compared to in order to determine if threshold conditions may be met. In embodiments, a comparison of communicated signal values to reference signal values may allow the signal conditioning system to understand if normal conditions are being experienced by an intelligent shading object, umbrella, and/or shading charging system or if an intelligent shading object, umbrella, and/or shading charging system may be experiencing abnormal conditions, (e.g., high humidity, high movement, high wind, and/or bad air quality).

In embodiments, an umbrella movement control PCB 895 may comprise a proximity sensor 840. In embodiments, a proximity sensor 840 may be able to detect a presence of nearby objects, (e.g., people or other physical objects) without any physical contact between a sensor and an object. In embodiments, a proximity sensor 840 be located on and/or mounted on a movement control PCB 895. In embodiments, a proximity sensor 840 may be located on and/or mounted on other printed circuit boards or may be a standalone component in a shading object system. In embodiments, a proximity sensor 840 may be located within a center support assembly 107. In embodiments, a proximity sensor 840 may generate measurements and/or signals, which may be communicated to a processor/controller 905 in a movement control PCB 895. In embodiments, an umbrella movement control board 905 may store communicated measurements and/or signals, which has instructions stored thereon. In embodiments, proximity sensor software instructions, which are fetched from memory 950 and executed by a processor 905, may perform and/or execute a proximity process or method. In embodiments, for example, a proximity process may comprise receiving measurements and/or signals from a proximity sensor 840 indicating an object and/or person may be located in an area where a shading object is deployed, going to be deployed and/or extended, and/or towards where a component of a shading object may be moving. For example, if an individual is located in an area where arm support assemblies may be deployed and/or extended, a proximity sensor 840 may transmit a signal or measurement indicating an object may be an obstruction to, for example, a movement control PCB 895. In embodiments, a processor/controller 905 in a movement control PCB may receive and/or analyze a proximity measurement and determine an object may be an obstacle. In embodiments, a proximity signal and/or command may also identify a location of an object (e.g., obstacle) in relation to a proximity sensor 840 and/or some reference location. In embodiments, a processor of a movement control PCB may generate and/or communicate a driving signal, command, and/or instruction that instructs a shading object not to deploy and/or open. In embodiments, for example, a processor/controller 905 in a movement control PCB 895 may communicate a signal and/or commands to a third motor controller to cause the third motor to stop moving the arm support assembly 108 due to an obstacle detection. In embodiments, for example, a movement control PCB 895 may communicate a signal and/or commands to a second motor controller a second motor (articulating and/or elevation motor) to cause a second motor to stop moving an gearbox assembly and/or actuator and prevent an upper assembly 112 of a center support assembly from moving into an area where an obstacle is detected. In embodiments, this may also work in the opposite direction, where if a proximity sensor 840 does not determine that an object is within a shading object area, then a proximity sensor signal may not be communicated to the processor/controller 905 in a movement control PCB 895.

In embodiments, an umbrella movement control PCB 895 may comprise a motion sensor 845. In embodiments, a motion sensor 845 may generate a signal and/or measurement indicating that an individual, a living organism, or an object is within an area covered by a motion sensor 845. For example, a motion sensor 845 may generate a signal if an individual and/or object is approaching a shading object and/or umbrella, is within 5 or 10 feet of an umbrella, or is moving within a shading area. In embodiments, a motion sensor 845 may be located on and/or mounted on a movement control PCB 895. In embodiments, a motion sensor 845 may be located on and/or mounted on other printed circuit boards or may be a standalone component in a shading object system. In embodiments, a motion sensor 845 may be located within a center support assembly 107. In embodiments, a motion sensor 845 may generate measurements and/or signals, which may be communicated to a processor/controller 905 in a movement control PCB 895. In embodiments, an umbrella movement control board 905 may store communicated measurements and/or signals, in a memory 950. In embodiments, motion sensor software instructions, may be fetched from memory 950 and executed by a processor 905, and may cause a processor 905 to perform and/or execute a motion detection process or method. Although the description above corresponds to the intelligent umbrella of FIGS. 1A and 1B, the description applies to similar components in the intelligent shading charging system of FIG. 1C.

In embodiments, for example, a motion detection process may comprise receiving measurements and/or signals from a motion sensor 845 indicating an object and/or person may be moving in an area where a shading object and/or umbrella is deployed, near where a shading object is located, and/or where a component of a shading object may be moving. In embodiments, if an individual's or object's movement is detected by a motion sensor, a controller/processor 905 may generate a signal instructing or commanding certain shading object components to be activated, deployed, and/or retracted. For example, if an individual's movement is detected during a night or darkness period, a processor may generate signals, instructions, or commands, to shading object components in reaction to the movement (e.g., commands, instructions, and/or signals) may be transmitted to a lighting system or assembly 870 to turn on lights of a shading object lighting system; commands may be transmitted to an audio system 875 to activate and/or turn on an audio receiver and/or audio system and transmit a warning that an individual is near a shading object; and/or commands may be transmitted to a third motor controller 890 to cause a motor to open one or more of the arm support assembles 109 and open a shading object to startle an intruder. Further, in embodiments, one or more commands may be communicated to one or more cameras 857 to activate one or more cameras to capture images of an area around a shading object. In embodiments, if a motion sensor 845 detects movement away from a shading object, a motion sensor 845 may communicate commands, signals, and/or instructions to a controller/processor 905 in a movement control PCB 895, which in turn may turn off components and/or retract assemblies of a shading object.

In embodiments, an umbrella movement control PCB 895 may comprise one or more tilt sensors 855. In embodiments, a tilt sensor 855 can measure a tilting in one or more axes of a reference plane. In embodiments, for example, a tilt sensor 855 may comprise an accelerometer to measure tilt angle with reference to an earth's ground plane. In embodiments, a tilt sensor 855 may be placed on a center support assembly 107 of a shading object (either an upper assembly 112 and/or a lower assembly 113), may be placed on a fabric shading 715, or may be placed on arms/blades 109. In embodiments, a tilt sensor 855 may measure an angle of incident from a reference axis. In embodiments, a reference axis may be an axis of a shading object at rest, a deployment angle (e.g., if a shading object is deployed at a 45 degree angle and thus the shading cover/object is deployed at approximately 45 degrees also, a tilt sensor 855 may be configured to determine it a title sensor 855 moves past a specific angle). In embodiments, a tilt sensor 855 may generate measurements indicating an angle with reference to a ground plane. In embodiments, a tilt sensor 855 may communicate measurements to a processor/controller 905 in a movement control PCB 895. In embodiments, an umbrella movement control board 895 may store communicated measurements and/or signals, in a memory 950. In embodiments, tilt sensor software instructions, may be fetched from memory 950 and executed by a processor 905, and may cause a processor 905 to perform and/or execute a tilt detection process or method. In embodiments, for example, a tilt detection process may comprise receiving tilt sensor measurements and compare the communicated tilt sensor measurements to reference measurements. If received tilt sensor measurements are greater than a reference measurement threshold, then a controller/processor 905 may generate a signal, command or instruction and communicate the signal, command or instruction to an assembly and/or component to adjust an orientation and/or deployment of shading object. For example, if a tilt sensor 855 indicates that a shading fabric is deployed at a 50 degree angle from a reference axis, but that a maximum shading fabric deployment is 45 degrees from a reference axis, then a controller/processor 905 may generate an adjustment signal, command and/or instruction to cause an elevation and/or second motor or a actuator and/or third motor to move a shading object to a correct position.

In embodiments, an umbrella movement control PCB 895 may comprise an audio/video transceiver 865, a stereo amplifier 875, and/or one or more sound reproducers (e.g., speakers) 875. In embodiments, an audio/video transceiver 865 may be a Bluetooth Audio MP3 transceiver. In embodiments, an audio/video transceiver 875 may receive wirelessly transmitted audio and/or video signals from an audio source such as a portable electronic device, a cellular phone, an iPod, an audio player, and/or a personal computer. In embodiments, a wireless transmission protocol may be a Bluetooth protocol for transmitting audio/video, although other protocols may be utilized. In embodiments, a portable electronic device may establish a communications channel by pairing with an audio/video transceiver, e.g., utilizing a Bluetooth protocol, in a shading object. In embodiments, an audio/video transceiver 865 may be located in a central support assembly 107. In embodiments, an audio/video transceiver 865 may be placed on or mounted on a motion control PCB 895 although it may be placed anywhere within a shading object and/or as a separate unit. In embodiments, a shading object computing device 860 may comprise an audio/video transceiver 865. In embodiments, an audio/video transceiver 865 may be located on a shading object computing device 860 because this activity and/or feature requires more energy and/or use than other components located on a movement control PCB. In embodiments, where users may be streaming audio/video for a long period of time, locating an audio/video transceiver on a computing device 860 may be more efficient. In embodiments, an audio/video transceiver 865 may communicate a received audio signal to one or more speakers 875 for reproduction of sound. In embodiments, an audio/video transceiver 865 may communicate a received audio signal to a stereo amplifier 875 and an amplified audio signal may be transmitted to one or more speakers 875 for reproduction of sound. Although the description above corresponds to a shading object or intelligent umbrella of FIGS. 1A and 1B, the description applies to similar components in the intelligent shading charging system of FIG. 1C.

Figure 11:
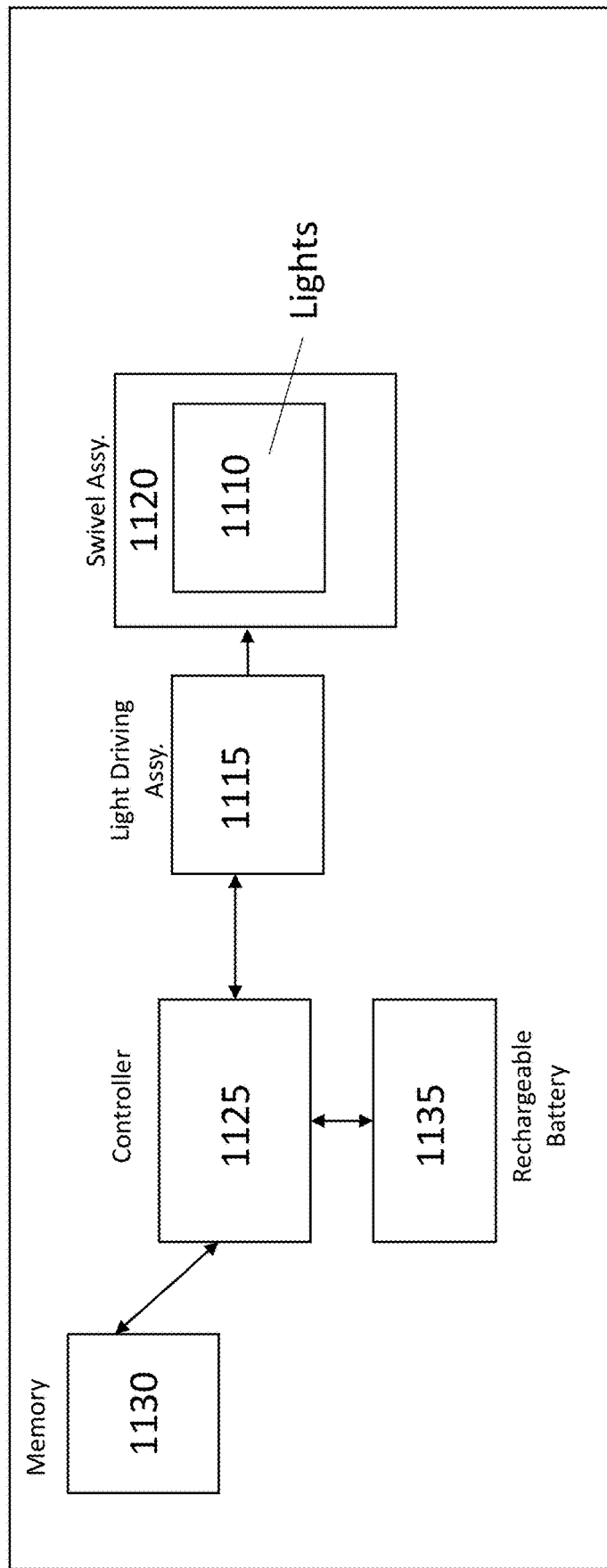
FIG. 11 illustrates a lighting subsystem according to embodiments.

FIG. 11 illustrates a lighting subsystem according to embodiments. In embodiments, a shading object may comprising a lighting subsystem 870. A lighting subsystem is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device," both of which are hereby incorporated by reference.

FIG. 11 also illustrates one or more first lighting assemblies 199 and/or a second lighting subsystem 198 according to embodiments. In embodiments, one or more first lighting assemblies 199 and/or a second lighting subsystem 198 may comprise a processor or microcontroller 1125, a lighting driver 1115, a memory 1130, and/or one or more LED lights 1110 (or other lighting elements) FIG. 11B illustrates a wireless charging assembly according to embodiments. A first lighting assembly and a second lighting subsystem are described in detail in non-provisional patent application Ser. No. 15/212,173, filed Jul. 15, 2016, entitled "Intelligent Charging Shading Systems," which is hereby incorporated by reference.

In embodiments, an umbrella movement control PCB 895 may comprise a USB transceiver 877. A USB transceiver is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and also in U.S. non-provisional patent application Ser. No. 15/160,822, filed May 20, 2016, entitled "Intelligent Shading Objects with Integrated Computing Device," the disclosure of both of which are hereby incorporated by reference.

In embodiments, a shading object may comprise a shading fabric 715 and solar cells 110. In embodiments, one or more strips or arrays of solar cells 110 may be placed on a top surface of a shading fabric 715. In embodiments, one or more strips of solar cells may be integrated into (or woven into or be a part of) a shading fabric 715. In embodiments, solar cells 110 may be comprised of a flexible material. In embodiments, a shading fabric 715 may be coupled, connected and/or attached to a frame or support assembly (e.g., arm support assemblies 108) and one or more strips of solar cells 110 may be placed on and/or attached to a top surface of an arm support assembly 108. In embodiments, arm support assemblies 108 may comprise a recess or a channel where solar cells 110 may be placed and/or inserted. In embodiments, a shading fabric 715 may have one or more strips of solar cells 110 integrated therein or woven into. In embodiments, one or more strips of solar cells 110 may form a pattern on a top surface of a shading object. Continuing with this illustrative embodiment, by forming solar cells in specific patterns, one or more strips of solar cells 110 may be capture sunlight and/or other ultraviolet light from a number of directions and/or thus, intensities. Although the description above corresponds to the intelligent umbrella of FIGS. 1A and 1B, the description applies to similar components in the intelligent shading charging system of FIG. 1C.

Figure 12:
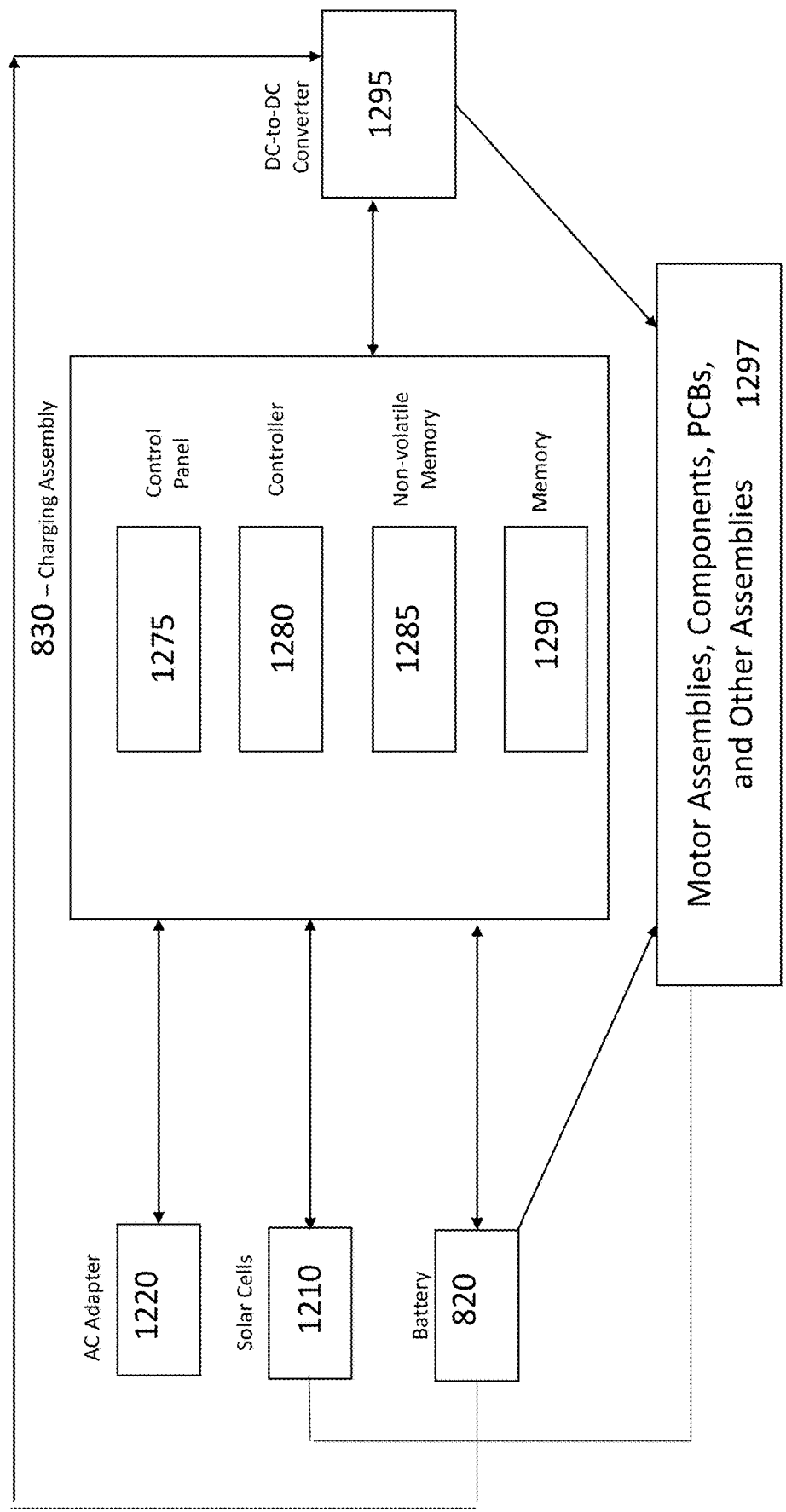
FIG. 12 illustrates a power subsystem according to embodiments.

FIG. 12 illustrates a power subsystem according to embodiments. In embodiments, a shading object may comprise a power tracking solar charger 830. In embodiments, a center support assembly 107 of a shading object may comprise and/or house a power tracking solar charger 830. Continuing with this illustrative embodiment, a power tracking solar charger 830 may be located in and/or on an upper assembly 112 of a center support assembly 107, or alternatively in or on a bottom assembly 114 of a center support assembly 107. In embodiments, a power tracking solar charger 830 may be connected to one or more solar cells 1210, a rechargeable battery 820, and/or an AC adapter 835 or 1220. In embodiments, a photovoltaic (PV) cell, or "solar cell" may be a smallest semiconductor element that converts sunlight into electricity. In embodiments, a semiconductor silicon may be treated so that silicon generates a flow of electricity when a light shines on it. In embodiments, a PV array or cells may be an interconnected system of PV cells that may function as a single electricity-producing unit. In embodiments, a PV array 1210 or 110 may comprise one of more of the strips of solar cells. In embodiments, a PV array 1210 or 110 may comprise one solar cell strip. In embodiments, one or more solar cells 1210 (e.g., a PV array 1210) may provide power directly to a power tracking solar charger 830 and/or a rechargeable battery 820. In embodiments, one or more solar cells 1210 (or solar arrays) may provide power to motor assemblies, components, printed circuit boards, and/or other assemblies 1297 in an intelligent shading object. Although the description above corresponds to the intelligent umbrella of FIGS. 1A and 1B, the description applies to similar components in the intelligent shading charging system of FIG. 1C.

In embodiments, a power tracking solar charger 830 may be coupled and/or connected to a rechargeable battery 820. In embodiments, a power tracking solar charger 830 may be coupled and/or connected to an AC adapter 835 (or DC power adapter), which is coupled and/or connected to a power source. In embodiments, a charging assembly 830 may be coupled to one or more solar cells 1210 or solar arrays. In embodiments, a power tracking solar charger 830 may include a control panel 1275, a controller 1280, a non-volatile memory 1285 and a volatile memory 1290, the non-volatile memory 1285 comprising computer-readable and computer-executable instructions, which are fetched and loaded into volatile memory 1290 for execution by a controller or processor 1280 to perform a power monitoring, tracking and distribution process. In embodiments, a power monitoring, tracking and/or distribution process may monitor power levels and/or power conditions of different components of a shading object (e.g., a motion control PCB 895, arrays of solar cells 110 1210), a rechargeable battery 820). In embodiments, a power tracking and monitoring process may communicate information regarding power levels and/or power conditions of a solar charger 830 (and other shading object components) to a control panel 1275 and/or to a portable electronic device to display to a user and/or owner.

In embodiments, a power tracking solar charger 830 may transfer incoming power (e.g., voltage and/or current) generated by the solar cells to one or more converters (e.g., a DC-to-DC converters) 1295. In embodiments, a rechargeable battery 820 may provide power (e.g., voltage and/or current) to a DC-to-DC converter 1295. In embodiments, one or more DC-to-DC converters 1295 may transfer voltage and/or current to one or more PCBs, components, motor assemblies, and/or other assemblies of a shading object. In embodiments, a DC-to-DC converter 1295 may be utilized to provide lower operating voltages, e.g., 3.3 VDC or 5.0 VDC or other voltages, to components, boards and/or assemblies 1297 operating on a lower DC voltage. In embodiments, rechargeable battery 820 may transfer incoming power (e.g., voltage and/or current) to one or more converters 1295, and a power charger 830 may monitor power distribution and power levels. In embodiments, a rechargeable battery 820 may provide power to shading object or umbrella motor assemblies, PCBs, components, and/or assemblies 1297. If high power requirements are existing due to operating conditions (e.g., motors running), a rechargeable battery 820 and solar cells or solar cell arrays may both provide power to one or more PCBs, components, motor assemblies, and/or other assemblies of a shading object.

In embodiments, a shading object may comprise a voice recognition engine 815. In embodiments, a shading object motion control PCB 895 may have a voice recognition engine 815 mounted and/or located thereon. A voice recognition engine is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device, the disclosure of both applications being hereby incorporated by reference.

In embodiments, a shading object central support assembly 107 may also comprise one or more microphones. In embodiments, one or more microphones may also be attached to and/or integrated into a stem assembly 106, a base assembly 105, shading fabric 715, arms/blades 109, and/or arm support assemblies 108. In embodiments, for example, a voice recognition process and/or method may be initiated when a user in a physical vicinity of a shading object may speak. In embodiments, a microphone, located on or within the shading object, may capture a user's voice and generate an analog voice signal. In embodiments, an analog-to-digital converter (ADC) may convert a voice to a digital voice signal and may transfer and/or communicate a voice digital signal to a voice recognition engine 815. In embodiments, a voice recognition engine 815 may analyze the received digital voice, extract commands and/or information, and communicate the extracted commands and/or information to a motion control PCB 895 and shading object computing device to cause actions requested verbally by a user or individual to be implemented and/or completed. In embodiments, the voice recognition engine 815 generated commands, instructions, or signals instructions may be communicated to other PCBs, subsystems, assemblies and/or components of the shading object in order to comply with and/or react to voice instructions. For example, a voice recognition engine 815 may extract from a received voice signal, a command to obtain sensor measurements, (e.g., sunlight intensity, ozone, and/or wind measurements or reading) from a sensor module 750. The voice recognition engine 815 may communicate the extracted command to a motion control PCB 895 (or alternatively a shading object computing device 860) to communicate with a weather variable PCB and/or a sensor module 750 (e.g., through wireless transceivers, wires, and/or circuit traces). In embodiments, a movement control PCB 895 may communicate to a weather variables PCB to obtain sensor measurements from sensors in a sensor module 750 coupled to and/or connected to a weather variables PCB. In embodiments, sensors (e.g., sensors 811-814, 816, 817) may obtain measurements and may communicate these measurements to a weather variables PCB 810, a shading object movement control PCB 895, and/or to a shading object computing device 860. In embodiments, obtained measurements may be stored (for later use and/or analyzation), may be communicated via a sound system to a user, or may be displayed on a monitor, and/or utilized in a mobile software application. Although the description above corresponds to the intelligent umbrella of FIGS. 1A and 1B, the description applies to similar components in the intelligent shading charging system of FIG. 1C.

In embodiments, a movement control PCB 895 or other PCB or circuit may comprise a personal area network transceiver 865. In embodiments, a PAN transceiver 865 may be located on a separate PCB or on other PCBs within a shading object, intelligent umbrella and/or intelligent shading charging system. In embodiments, a PAN transceiver 865 located on a movement control PCB 895 may be a master transceiver. In embodiments, which are illustrative, but not limiting, PAN transceivers, may be an INSTEON transceiver, an IrDA transceiver, a Wireless USB transceiver, a Bluetooth transceiver, a Z-Wave transceiver, a ZigBee transceiver, and/or a body area network transceiver. In embodiments, additional PCBs and/or components may also comprise PAN transceivers. In embodiments, a transceiver 865 on a movement control PCB 895 may communicate instructions, commands, and/or signals to one or more PAN transceivers located in other areas of the intelligent shading object (e.g., PAN transceivers in a first PCB (e.g., a PCB controlling azimuth movement), a computing device (e.g., a Linux computer), a second PCB (e.g., a PCB controlling elevation movement), a third PCB (e.g., a PCB controlling extension or linear actuation movement), a telemetry PCB, and/or a weather variable PCB). By utilizing PAN transceivers and PAN communication protocols in an intelligent shading object, use of wires, flexible circuit boards, and/or other interfaces may be minimized and more physical space may be present in an intelligent shading object. This is a benefit in that a shading object, intelligent umbrella, and/or intelligent shading charging system may be able to house and/or incorporate more features and/or components. In addition, potential hindrances to movements of a shading object (e.g., rotation about a vertical axis of a central support assembly and/or deployment of a shading object support arms and/or blades), intelligent umbrella and/or shading charging system may be minimized allowing free movement of these assemblies. In embodiments, PAN transceivers may be utilized in all communications between PCBs and/or between PCBs and/or components of a shading object, intelligent umbrella and/or intelligent shading charging system. In embodiments, PAN transceivers may be utilized for communications of shorter durations and/or lower data throughput. In embodiments, for example, communications from a movement control PCB 895 to a first motor controller 880 may utilize a PAN communication protocol (e.g., PAN transceivers in each device) due to short duration and/or a low data throughput. In embodiments, for example, communications from a movement control PCB 895 to a weather variable PCB 810 may utilize a PAN communication protocol.

In embodiments, wearable computing devices (e.g., watches, glasses, other clothing articles) may also incorporate PAN technology to communicate with nearby computing devices and exchange digital data and information using an electrical conductivity of a human body as a data network. Wearable computing devices are described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device, the disclosure of both which are hereby incorporated by reference.

In embodiments, an intelligent shading object or umbrella may further comprise a sensor module 750. In embodiments, a sensor module 750 may be connected to a top end of a center support assembly 107. As illustrated in FIG. 7, a sensor module 750 may connect, couple or fasten to a post or other structure on top of an upper assembly 112 of a center support assembly 107. In embodiments, a sensor module 750 may be located on other portions of a shading object, e.g., integrated into a shading fabric 715, attached to or integrated into arms and/or blades, connected, coupled or attached to a center support assembly 107, a stem assembly 106, and/or a base assembly 106. In embodiments, a sensor module 750 may screw into a recess on a top of a center support assembly, or alternatively may snap onto a top of a center support assembly 107. Although the description above corresponds to the intelligent umbrella of FIGS. 1A and 1B, the description applies to similar components in the intelligent shading charging system of FIG. 1C.

In embodiments, a sensor module 750 may comprise a telemetry PCB 705 and a weather-related PCB. A telemetry PCB 705 may also be referred to as a GPS solar tracking module. In embodiments, a telemetry PCB may comprise a GPS/GNSS sensor 706 and/or a digital compass 707. In embodiments, a telemetry PCB 705 may be powered by a rechargeable battery 820 and/or DC-to-DC converters, or by a battery located on a telemetry PCB. In embodiments, a GPS receiver 706 may communicate with GPS/GNSS satellites and receive positioning signals from satellites and calculates a latitude and/or longitude of a shading object. In embodiments, a GPS receive may receive latitude, longitude and/or altitude readings from GPS/GNSS satellites. In embodiments, a GPS receiver 706 may also determine an altitude of a shading object from signals communicated from GPS/GNSS satellites. In embodiments, GPS receiver measurements and/or calculations may be utilized by a shading object to determine movements necessary by different electromechanical assemblies of a shading object. For example, a movement control PCB 895 may receive GPS receiver measurements (e.g., longitude, latitude, and/or altitude measurements), analyze and/or process these measurements, and determine necessary movements by a stem assembly 106, a center support assembly 107, and/or arm support assembly 108. In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108. Although the description above corresponds to the intelligent umbrella of FIGS. 1A and 1B, the description applies to similar components and/or assemblies in the intelligent shading charging system of FIG. 1C.

In embodiments, a sensor module 805 may comprise a digital compass 707 may measure magnetic fields surrounding a shading object and may generate a directional reading and/or an angle a direction heading (e.g., a degree heading from true north). In embodiments, these directional and/or angular readings may be communicated to a motion control PCB 895. For example, a movement control PCB may receive digital compass 807 measurements or values, analyze and/or process these measurements or values, and determine necessary movements in response to heading or directional information by a stem assembly 106, a center support assembly 107, and/or arm support assembly 108. In embodiments, a movement control PCB may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108. In embodiments, a telemetry PCB may be utilized infrequently because a shading object may not be moved from one geographical location to another. Thus, GPS information (latitude, longitude, and/or altitude) and/or heading information (from a digital compass) may not change frequently. Thus, a telemetry circuit PCB 805 may comprise a low power processor. In embodiments, a telemetry PCB 805 (and a GPS receiver 806 and/or digital compass 807) may only utilized during configuration and/or calibration of a shading object. During configuration and/or calibration of a shading object (or after a shading object or umbrella has been moved), GPS and digital compass measurements may be requested and after communication of these measurements, a movement control PCB 895 may analyze measurements, calculate elevation and azimuth movements for an intelligent shading object, and communicate instructions, commands and/or signals to respective motor assemblies. In embodiments, a digital compass 807 may be utilized more frequently than a GPS receiver 806.

In embodiments, a sensor module 750 may comprise a weather variable PCB 810. In embodiments, a weather variable PCB may be located in another assembly of a shading object or umbrella (e.g., stem assembly 106, a center support assembly 107, and/or arm support assembly 108 of FIGS. 1A and 1B) or intelligent shading charging system (lower support assembly 187 or upper support assembly 191 of FIG. 1C). In embodiments, a weather variable PCB 810 may also be referred to as a micro climate data module. In embodiments, a weather variable PCB 810 may comprise a processor/controller, a memory, one or more air quality sensors 811, one or more UV radiation sensors 812, one or more digital and/or analog barometers 813, one or more temperature sensors 814, one or more humidity sensors 816, and/or one more wind speed sensors 817. In embodiments, a solar power charging assembly 830 may provide power (e.g., voltage and/or current to a weather variable PCB 805 and/or components located thereon. In embodiments, a battery (e.g., rechargeable battery) 820 may provide power to a weather variable PCB and components located thereon.

In embodiments, sensor readings, measurements, and values communicated by sensors to a weather variable PCB in a sensor module 750 may be communicated directly or indirectly to a movement control PCB 895 and then directly or indirectly to an integrated computing device 860. In embodiments, sensor readings, measurements, and values communicated by a sensor module 750 may be communicated directly or indirectly to an integrated computing device 860. In embodiments, sensor readings, measurements and/or values may be stored in a memory of a shading object computing device and/or a memory coupled thereto. In embodiments, a memory storing sensor reading measurements may be non-volatile and/or volatile. In embodiments, a shading object computing device 860 may communicate sensor readings to external computing devices via wireless communication protocols (e.g., WiFi) in order to minimize usage of storage on a shading object computing device. In embodiments, external devices storing sensor information may include application servers and/or databases, cloud servers and/or databases, and other offsite storage devices. In embodiments, storing of sensor readings on either a shading object computing device and/or external computing devices allows a shading object sensor reading history to be created and/or maintained.

In embodiments, a sensor module 750 may comprise an air quality sensor 811. In embodiments, an air quality sensor 811 may provide ozone measurements, particulate matter measurements, carbon monoxide measurements, sulfur dioxide measurements and/or nitrous oxide measurements. In embodiments, an air quality sensor 811 may provide allergen measurements. Ozone leads to intelligent readings to tell an individual to go inside. In embodiments, a weather variable PCB 810 may receive measurements and/or readings from an air quality sensor 811 and may communicate these measurements to a movement control PCB 895. In embodiments, a movement control PCB 895 may receive air quality sensor measurements, analyze the measurements, and cause shading object assemblies and/or components to react to air quality measurements. In embodiments, for example, if an air quality is too low, e.g., as compared to an existing threshold, a movement control PCB 895 may communicate commands, instructions and/or signals to an audio system to alert a user of unsafe conditions. In embodiments, for example, ozone measurements received by a movement control PCB 895 from an air quality sensor may be utilized to determine an amount of time an individual should be outside, and this amount of time may be communicated to an individual via a sound system (communicated audibly), via a display and/or monitor, and/or wirelessly to an external computing device.

In embodiments, a sensor module 750 may comprise an ultraviolet (UV) radiation sensor 812. In embodiments, a UV radiation sensor may provide discrete radiation band measurements, including, but not limited to UVB, radiation, UVA radiation, Infrared lighting, or a combination of any and all of these radiation measurements. In embodiments, a weather variable PCB 810 may receive measurements and/ or readings from a UV sensor 812 and may communicate these measurements to a movement control PCB 895. In embodiments, for example, UV radiation measurements received by a movement control PCB 895 from a UV sensor 812 may be utilized to determine and/or calculate an amount of time an individual should be outside, and this amount of time may be communicated to an individual via a sound system (communicated audibly), via a display and/or monitor, and/or wirelessly to an external computing device.

In embodiments, a sensor module 750 may comprise a digital barometer 813. In embodiments, a digital barometer may provide, measure, and/or display complex atmospheric data more accurately and quickly than prior barometers. Many digital barometers display both current barometric readings and previous 1-, 3-, 6-, and 12-hour readings in a bar chart format, much like a barograph. They also account for other atmospheric readings such as wind and humidity to make accurate weather forecasts. In embodiments, a weather variable PCB 810 may receive measurements and/or readings from a digital barometer 813 and may communicate these measurements to a movement control PCB 895. In embodiments, for example, a movement control PCB 895 may receive digital barometer measurements (e.g., altitude measurements), analyze and/or process these measurements, and determine necessary movements by a stem assembly 106, a center support assembly 107, and/or arm support assembly 108 (of FIGS. 1A and 1B) or a lower support assembly 187 and/or upper support assembly 191 of FIG. 1C. In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108 of FIGS. 1A and 1B or a lower support assembly 187 and/or upper support assembly 191 of FIG. 1C. In embodiments, for example, a movement control PCB 895 and/or an integrated computing device 860 may receive digital barometer measurements and generate a weather forecast for an area being served by a shading object and/or umbrella.

In embodiments, a sensor module 750 may comprise a temperature sensor 814. In embodiments, a temperature sensor 814 may generate and provide a temperature reading for a shading object environment. In embodiments, a weather variable PCB 810 may receive measurements and/ or readings from a temperature sensor 814 and may communicate these measurements to a movement control PCB 895. In embodiments, for example, temperature measurements received by a movement control PCB 895 from a temperature sensor 814 may be utilized to determine and/or calculate an amount of time an individual should be outside, and this amount of time may be communicated to an individual via a sound system (communicated audibly), via a display and/or monitor, and/or wirelessly to an external computing device.

In embodiments, a sensor module 750 may comprise a humidity sensor 816. In embodiments, a humidity sensor 816 may provide humidity measurements in an environment where a shading object is located. In embodiments, a weather variable PCB 810 may receive measurements and/ or readings from a humidity sensor 816 and may communicate these measurements to a movement control PCB 895. In embodiments, for example, humidity measurements received by a movement control PCB 895 from a humidity sensor 816 may be utilized to determine and/or calculate an amount of time an individual should be outside, and this amount of time may be communicated to an individual via a sound system (communicated audibly), via a display and/or monitor, and/or wirelessly to an external computing device. In embodiments, a movement control PCB 895 may receive humidity sensor readings and/or temperature sensor readings and determine that a misting system and/or cooling system should be activated. In embodiments, a movement control PCB 895 may generate commands, instructions and/or signals and communicate the same to a misting system 1420 and/or a misting system controller to activate a misting and/or cooling system to deal with high humidity and/or high temperature environments and/or situations.

In embodiments, a sensor module 750 may comprise a wind sensor 817. In embodiments, a wind speed sensor 817 may provide wind speed and/or wind direction information at a top of a shading object or umbrella, and/or at a middle of a shading object and/or umbrella. In embodiments, a weather variable PCB 810 may receive measurements and/or readings from a wind sensor 817 and may communicate these measurements to a movement control PCB 895. In embodiments, for example, a movement control PCB 895 may receive wind speed measurements analyze and/or process these measurements, and determine necessary movements by a stem assembly 106, a center support assembly 107, and/or arm support assembly 108 of FIGS. 1A and 1B or a lower support assembly 187 and/or upper support assembly 191 of FIG. 1C. In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108. In embodiments, if a wind speed is higher than a predetermined threshold, a movement control PCB 895 may communicate commands, instructions, and/or signals to motor controllers to cause a shading object to be retracted and moved to a rest position. In embodiments, a wind sensor 817 may also be mounted on or integrated into a center support assembly 107 and utilized in a same fashion as described above. Although the description above corresponds to the intelligent umbrella of FIGS. 1A and 1B, the description applies to similar components and/or assemblies in the intelligent shading charging system of FIG. 1C.

In embodiments, a shading object, intelligent umbrella and/or intelligent shading charging system may comprise one or more digital cameras 857 and/or other analog-based cameras. In embodiments, one or more cameras 857 may comprise an optical system and/or an image generation system. In embodiments, digital cameras 857 may display images on a screen immediately after being captured. In embodiments, one or more digital cameras 857 may store and/or delete images from a memory associated with a digital camera. In embodiments, one or more digital cameras 857 may capture, record and/or moving videos with or without sound. In embodiments, digital cameras 857 may also incorporate computer-readable and computer-executable instructions which, which when retrieved from a non-volatile memory, loaded into a memory, and executed by a processor, may crop and/or stitch pictures, and/or potentially perform other image editing on captured images. For example, image stitching or photo stitching is the process of combining multiple photographic images with overlapping fields of view to produce a segmented panorama and/or high-resolution image. In embodiments, image stitching may be performed through the use of computer software embodied within a digital camera. In embodiments, a digital camera may also internally perform video stitching. In embodiments, other devices, components and/or assemblies may perform image stitching, video stitching, cropping and/or other photo editing. In embodiments, computer-readable instructions loaded into a memory of a movement control PCB 895 and/or integrated computing device 860, may be executable by a processor to perform image stitching, video stitching, cropping and/or other photo editing. In embodiments, computer-readable instructions may be loaded into a memory located within a shading object, intelligent umbrella and/or intelligent shading charging system and executable by a processor to perform the above-identified photo editing.

In embodiments, cameras may capture images of an area around, surrounding, and/or adjacent to shading objects, intelligent umbrellas, and/or intelligent shading charging systems. In embodiments, a stem assembly 106 and/or a central support assembly 107 may comprise a camera 857. In embodiments, a stem assembly 106 and/or center support assembly 107 may rotate (e.g., up to 360 degrees) about a vertical axis with respect to a base assembly 105—FIGS. 1A and 1B) (or a lower support assembly 187 and/or an upper support assembly 191 may rotate about and/or around a housing and/or enclosure 182—FIG. 1C) and this may allow a camera to capture images, videos and/or sound corresponding to 360 degrees of an area surrounding, around and/or adjacent to a shading object, intelligent umbrella and/or intelligent shading charging system. In embodiments, a camera 857 and/or other components or assemblies (as discussed above) may stich or combine images and/or videos to provide a panoramic image of the area. The ability of a shading object to rotate allows a benefit of panoramic image capture and not just an area where a camera is initially oriented. In embodiments, a camera 857 may have one or more images resolutions (e.g., 1 Megapixel (MP), 3 MP, 4 MP, 8 MP, 13 MP and/or 38 MP) that are selectable and/or adjustable.

Figure 17A:
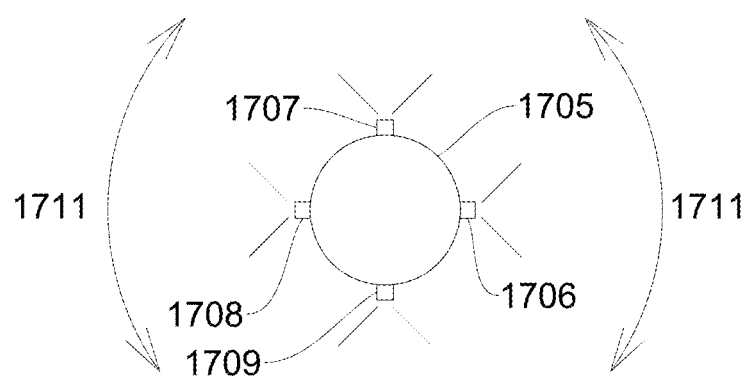
FIG. 17A illustrates an intelligent umbrella comprising four cameras according to embodiments.
Figure 17B:
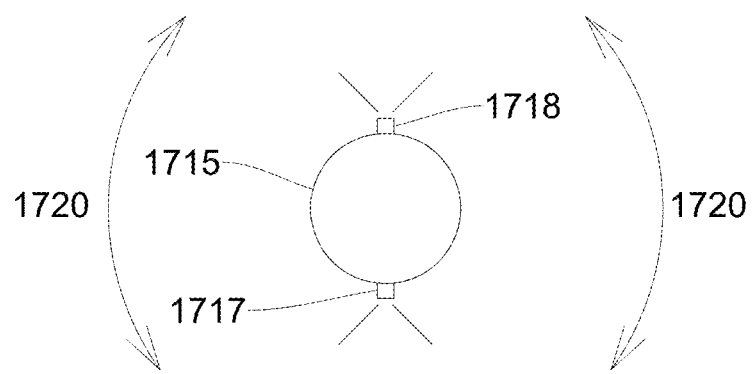
FIG. 17B illustrates an intelligent umbrella comprising two cameras according to embodiments.
Figure 17C:
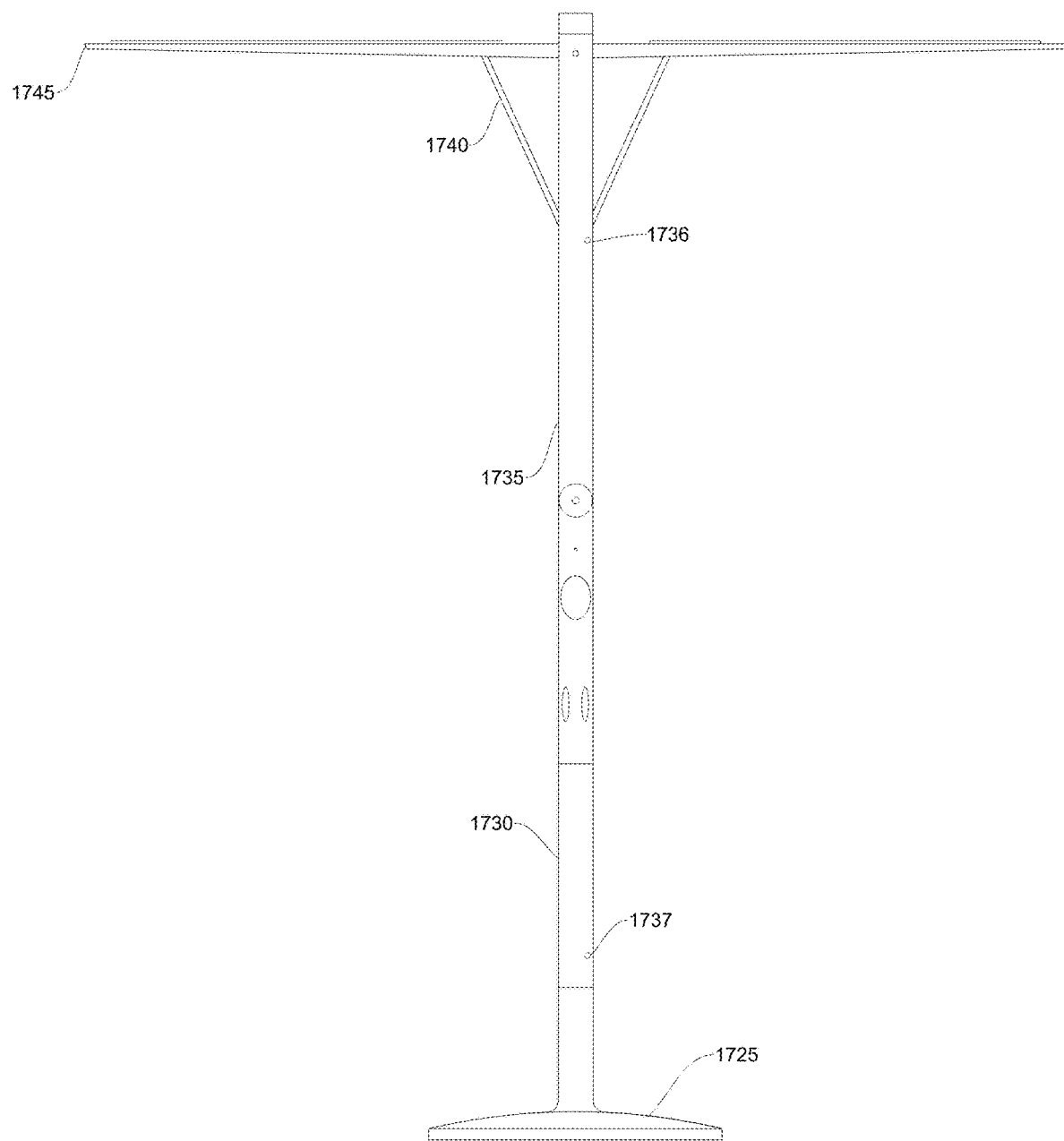
FIG. 17C illustrates an intelligent umbrella comprising a camera at a first elevation and a camera at a second elevation.

In embodiments, a shading object, intelligent umbrella and/or intelligent shading charging system may comprise one or more cameras (e.g., digital cameras). In embodiments, this may allow better image coverage of an area surrounding a shading object, intelligent umbrella and/or intelligent shading charging system without requiring movement of a stem assembly 106 and/or center support assembly 107 (FIGS. 1A and 1B) and/or lower support assembly 187 and/or upper support assembly 191 (FIG. 1C). FIGS. 17A, 17B and 17C illustrate placement of multiple cameras within shading objects, intelligent umbrellas and/or intelligent shading charging systems according to embodiments. In embodiments, for example, in FIGS. 1A and 1B, a central support assembly 107 may comprise one or more cameras 857. In embodiments, a center support assembly 107 may comprise four cameras, with each camera installed approximately right angles from the other cameras. FIG. 17A illustrates potential placement of four cameras 1706 1707 1708 and 1709 in a shading object, intelligent umbrella and/or intelligent shading charging system. In FIG. 17A, the cameras 1706 1707 1708 and 1709 may be integrated into or placed into a stem assembly, a central support assembly (FIGS. 1A and 1B), a lower support assembly and/or an upper support assembly (FIG. 1C), all which are represented by reference number 1705 in FIG. 17A. In utilizing four cameras, a shading object, intelligent umbrella and/or intelligent shading charging system may not need to move and/or rotate in order to capture images, video and/or sound of more of an area surrounding the object, umbrella and shading charging system. This may be effective in situations where cameras may be activated without individuals and/or owners knowing that the cameras have been activated, e.g., in emergency situations and/or other life threatening situations. Cameras may be activated and capture up to a 360 degree view of an area or environment without movement of support assemblies of shading object, intelligent umbrellas and/or intelligent charging systems. In embodiments, in addition, the stem assembly, a central support assembly (FIGS. 1A and 1B), a lower support assembly and/or an upper support assembly (FIG. 1C) may rotate with respect to a base assembly (FIGS. 1A and 1B) and/or a housing and/or enclosure (FIG. 1C). The rotating of the stem assembly, a central support assembly (FIGS. 1A and 1B), a lower support assembly and/or an upper support assembly (FIG. 1C) is illustrated and/or represented by reference number 111 in FIG. 17A. In FIGS. 17A, 17B and/or 17C, lines radiating from cameras may represent a start of an image capture area for a digital camera.

In FIG. 17B, two cameras are illustrated as being part of or integrated into an intelligent shading object, intelligent umbrella and/or intelligent shading charging system. In FIG. 17B, a stem assembly, a central support assembly (FIGS. 1A and 1B), a lower support assembly, and/or an upper support assembly (FIG. 1C), all which are represented by reference number 1715 in FIG. 17B may house and/or have integrated two cameras 1716 1717. In embodiments, cameras 1716 1717 may be placed directly opposite each other across a radius of a stem assembly, central support assembly, lower support assembly and/or upper support assembly 1715. In embodiments, cameras 1716 and 1717 may be placed approximately between 30 to 180 degrees apart from each other in order to increase an area of which images may be captured of an area surrounding, around and/or adjacent to the shading object, intelligent umbrella and/or intelligent shading object. In FIG. 17B, cameras 1716 1717 are placed approximately 180 degrees from each other around a circumference of support assemblies of the shading object, intelligent umbrella and/or intelligent shading charging system. In embodiments, a stem assembly, central support assembly, lower support assembly and/or upper support assembly 1715 may be rotated with respect to a base assembly (FIGS. 1A and 1B) and an enclosure and/or housing (FIG. 1C) to capture a larger area around, surrounding and/or adjacent to the shading object, umbrella and/or shading charging system. This rotation is illustrated and represented by reference number 1720

FIG. 17C illustrates a shading object, intelligent umbrella, and/or intelligent shading charging object with cameras located at two different elevations according to embodiments. Although FIG. 17C illustrates a shading object or an intelligent umbrella, an intelligent shading charging object may also comprise two cameras installed at different elevations. In FIG. 17C, a shading object and/or intelligent umbrella may comprise a base assembly 1725, a stem assembly 1730, a central support assembly 1735, one or more arm support assemblies 1740, one more arm/blades and/or a shading fabric 1745. In addition, a shading object may comprise a low elevation camera 1737 and a higher elevation camera 1736. In embodiments, having a low elevation camera 1737 and/or a high elevation camera 1736 allows a shading object and/or an intelligent umbrella to capture images from more than one perspective and/or orientation. For example, in embodiments, a low elevation camera 1737 may capture images, sounds, and/or videos from a waist high and/or chest high level of an individual and a high elevation camera 1736 may capture images, sounds, and/or videos from a high level (e.g., above an individual's head). This may be beneficial to see objects from a top perspective.

In embodiments, digital cameras 857 may be adjustable as to orientation and/or perspective. In embodiments, a shading object, intelligent umbrella and/or intelligent shading charging may comprise canisters, hinging assemblies in which cameras may be located. In embodiments, canisters and/or hinging assemblies may be adjustable to change an orientation of a camera with respect to the shading object, intelligent umbrella and/or intelligent shading charging system. In embodiments, canisters and/or hinging assemblies may be adjustable to allow cameras 857 to be moved between 0 to 180 degrees from an original position and/or orientation. In embodiments, each of the one or more cameras 857 (e.g., cameras 1706 1707 1708 1709 in FIG. 17A) may be independently adjustable. For example, in FIG. 17C, low elevation camera 1737 may be rotated in an upwards direction 15 degrees and upper elevation camera 1736 may be rotated in an upwards or downwards direction 30 degrees. The movements and/or orientations of the digital cameras 857 may be independently adjustable.

In embodiments, one or more cameras 857 may also be located on a top portion of a shading object (e.g., located on and/or within a sensor module positioned 750 on top of a center support assembly 107, located on top of an arm/blade 108, and/or located on a shading fabric 715). Although the description above corresponds to the intelligent umbrella of FIGS. 1A and 1B, the description applies to similar components and/or assemblies in the intelligent shading charging system of FIG. 1C. In embodiments, if a camera 857 is located on a top portion of a shading object, intelligent umbrella and/or intelligent shading charging system, images, sounds and/or videos may be captured above a level of a shading fabric. In addition, a camera 857 located on a top portion of a shading object, intelligent umbrella and/or intelligent shading charging system may capture images, sounds, and/or videos of objects in a sky or just of a horizon or sky. For example, in embodiments, a camera 857 located on a top portion may capture images of mountains and/or buildings that are in a skyline. This may be beneficial in situations where there is a fire in the mountain or an issue with a building or someone wants to monitor certain aspects of a building (e.g., if certain lights are on). Further, one or more cameras 857 located on a top portion of a shading object, intelligent umbrella and/or intelligent shading charging system may capture images, sounds, and/or videos of a night time sky (e.g., stars). In addition, one or more cameras 857 located on a top portion of a shading object, intelligent umbrella and/or intelligent shading charging system may capture images, sounds, and/or videos of objects moving and/or flying in the sky and/or horizon.

In embodiments, cameras 857 may be activated by messages, signals, instructions and commands. In embodiments, components and/or assemblies on a movement control PCB may communicate messages, signals, instructions and/or commands to the camera to activate, turn on, change modes, turn off, change focus and/or change capture image resolution. In addition, messages, signals, instructions, and/or commands may activate a camera and software stored therein to perform image stitching, video stitching, image editing and/or cropping. In embodiments, a processor, controller, and/or wireless transceiver in a shading object, intelligent umbrella and/or intelligent shading charging system may communicate messages, signals, instructions and/or commands to activate a camera in order to perform functions and/or features described above. In embodiments, a computing device 860, separate from a controller and/or processor in a motion control PCB 895, and/or other locations in a shading object, may communicate messages, signals, instructions and/or commands to activate a camera in order to perform functions and/or features described above. In embodiments, a wireless transceiver and/or a processor controller in a computing device 860 may communicate messages, signals, instructions and/or commands to activate a camera.

In embodiments, a camera 857 may communicate captured images, sounds and/or videos to a memory of a motion control PCB 895. In embodiments, a camera may communicate captured images, sounds and/or videos to a memory of a computing device separate from a processor and/or controller in a motion control PCB 895. In embodiments, a camera may communicate captured images, sounds and/or videos to an external computing device (directly for storage and/or streaming). In embodiments, a camera may communicate captured images, sounds, and/or videos utilizing wired (e.g., utilizing Ethernet, USB, or similar protocols and transceivers) and/or wireless communication protocols (e.g., utilizing 802.11 wireless communication protocols and transceivers).

In embodiments, one or more of the digital cameras 857 may comprise an infrared detector. In embodiments, a shading object, intelligent umbrella and/or intelligent shading charging system may further comprise an infrared detector. In embodiments, an infrared detector may comprise one or infrared light sources and an infrared sensor. In embodiments, an infrared detector may generate a signal indicating that an object is located within an area being monitored or viewed by an infrared detector. In embodiments, if an infrared detector generates a signal indicating that an object (and/or individual) is present, a camera 857 may be activated and begin to capture images and/or video, with or without sound, and transmit captured images and/or video, with or without sound, to a computing device 860. In embodiments, if an infrared detector generates a signal indicating that an object (and/or individual) is present, a lighting assembly (e.g., LED lights) 870 may also be activated and lights may be directed in an area surrounding a shading object, umbrella and/or shading charging system and/or directly to an area where an object is detected. In embodiments, one or more cameras 857 and/or one or more lighting assemblies 870 may be activated, which results in better images and/or video of an area surrounding a shading object, umbrella and/or shading charging system being captured and/or communicated to a computing device. This is yet another example of how a shading object, umbrella and/or shading charging system provides additional benefits of not only capturing images of its surrounding area but also being utilized as a security device for an environment in which an intelligent shading object is located.

In embodiments, one or more cameras 857 may be thermal imaging cameras which include a special lens, an infrared light, and an array of infrared-detector elements. In embodiments, a shading object, intelligent umbrella and intelligent shading charging system may comprise an infrared light, a lens and a phased-array of infrared-detector elements. In embodiments, a thermal imaging camera comprises a special lens may focus on infrared light emitted by all objects within an area surrounding and/or adjacent to a shading object, intelligent umbrella, and/or shading charging system. In embodiments, a focused light may be scanned by a phased array of infrared-detector elements. In embodiments, one or more detector elements may generate a very detailed temperature pattern, which may be referred to as a thermogram. In embodiments, a detector array may take a short amount of time (e.g., about one-thirtieth of a second) to obtain temperature information to make a thermogram. In embodiments, information may be obtained from a plurality of points in a field of view of a detector array. In embodiments, detector elements from a thermogram may be converted and/or translated into electric impulses and electrical impulses may be sent to a signal-processing unit. In embodiments, a signal-processing unit may be a PCB with a dedicated chip that translates received information (electrical impulses) into thermal images and/or thermal video. In embodiments, a signal-processing unit may communicate thermal images and/or thermal video either to a display (e.g., a shading object display and/or a display on a computing device communicating with an intelligent shading object). In embodiments, a signal-processing unit of a thermal imaging camera 857 may communicate thermal images and/or thermal video to a shading object computing device 860 for analysis, storage and/or retransmission to an external computing devices. In embodiments, a thermal image may appear as various colors depending on and/or corresponding to an intensity of an infrared image. In embodiments, a thermal imaging camera allows additional benefits of not having to activate a lighting assembly in order to capture images and/or videos of an area surrounding an intelligent shading umbrella or object. In addition, by not activating a lighting assembly 870, an intruder or moving object may not be aware that a digital camera 857 may be capturing an image or video of an area where an intruder or object is located. In embodiments, an infrared detector may activate a thermal imaging camera 857 upon detection of movement. In embodiments, a thermal imaging camera may activate on its own due to movement of an intruder and/or object, or may be periodically or continuing capturing images and/or video.

Figure 10:
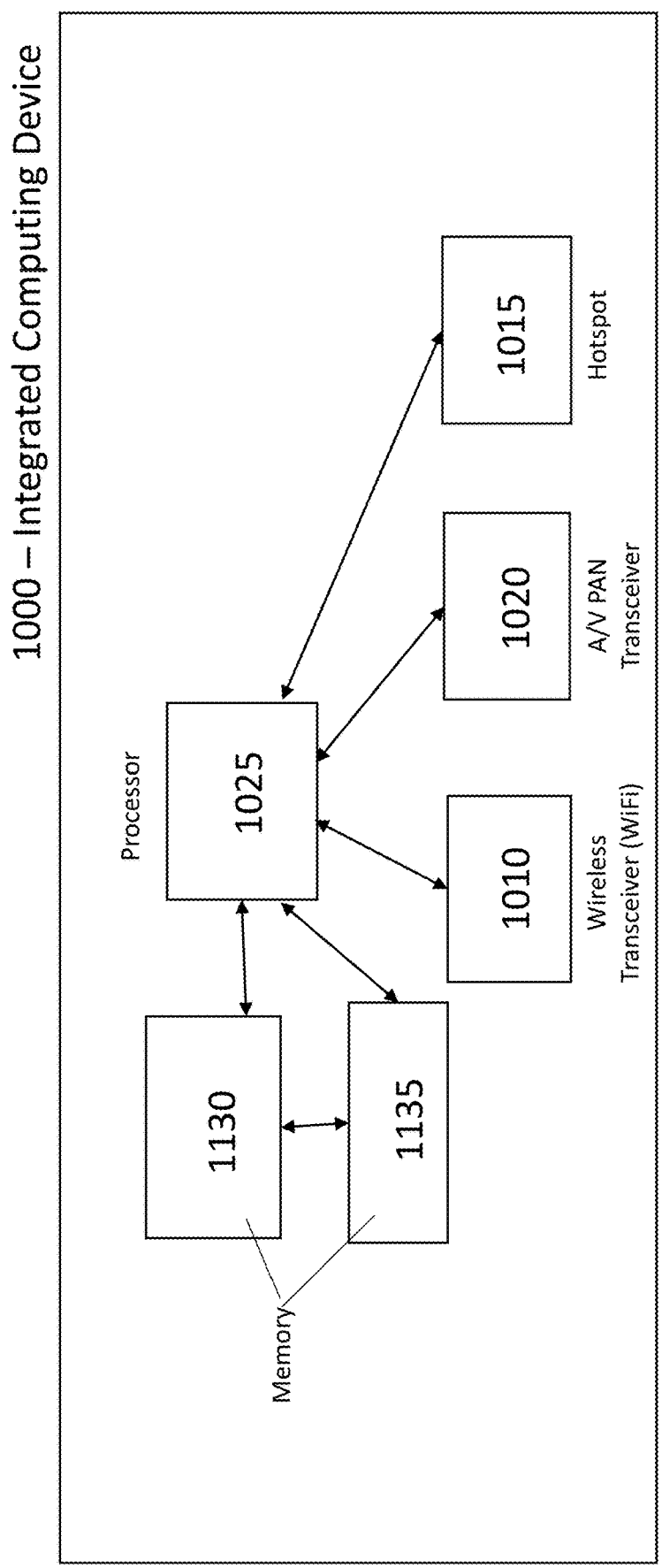
FIG. 10 illustrates a shading object or umbrella computing device according to embodiments.

FIG. 10 illustrates a shading object or umbrella integrated computing device according to embodiments. In embodiments, an integrated computing device PCB 1000 may comprise a wireless WiFi or LAN wireless transceiver 1010 (which may or may not operate as a wireless hotspot and/or router), a separate wireless hotspot device 1015, one or more audio/video transceivers 1020 (e.g., PAN transceivers), one or more processors 1025, one or more non-volatile memories 1030 and one or more memory components 1035. In embodiments, many of the components may reside on a computing device PCB. In embodiments, a separate PCB may house or have some of the above-listed components (e.g., WiFi transceiver 1010, wireless hotspot device 1015) mounted thereon and a shading object computing device may comprise non-volatile memory 1030 (e.g., a flash drive, a hard drive, a removable disk drive), and a volatile memory 1035 such as RAM, and on or more processors 1025.

In embodiments, computer-readable and/or computer-executable instructions may be stored in non-volatile memory, fetched by one or more processors 1025, loaded into RAM 1035, and executed by one or more processors 1025 to perform data intensive functions, execute processes such as a healthcare process (e.g., selecting a healthcare option from a dashboard of a mobile application), a security process (e.g., selecting a security option from a dashboard of a mobile application), an energy process or application (e.g., selecting an energy option from a dashboard of a mobile application), a weather application or processor (e.g., selecting a weather option from a dashboard of a mobile application), and/or communicating with external devices (e.g., wireless access points, portable electronic devices, servers, networks). In embodiments, an integrated computing device 860 and/or a computing device PCB may consume more power due to higher data throughput and higher utilization time. Having a computing device integrated into an intelligent shading object or umbrella, provides a benefit, as to prior art shading objects or umbrellas, of allowing an intelligent shading object to run software applications, communicate with data intensive devices, such as cameras and/or audio system, utilize WiFi or other wireless communication transmissions, operate as a WiFi hotspot (or other wireless communication hub) and communicate with external computing devices to transfer data obtained by the intelligent shading object.

In embodiments, an integrated computing device 1000 may communicate with application servers, mobile applications servers, proxy servers, and/or other computing devices on a global communications network (e.g., the Internet). In embodiments, a shading object computing device may handle data and/or command communications between external devices and a shading object. In embodiment, an integrated computing device 860 may handle intra-shading object communications requiring more extensive processing power and/or higher data transfer rates. In embodiments, a shading object center support assembly 107 may house an integrated computing device. In embodiments, a center support assembly 107 may also house a computing device PCB to which a computing device 860 may be attached to and/or connected. Although the description above corresponds to the intelligent umbrella of FIGS. 1A and 1B, the description applies to similar components and/or assemblies in the intelligent shading charging system of FIG. 1C.

In embodiments, an integrated computing device 860 may be a Linux-based computing device (e.g., Raspberry PI) although other operating systems and/or other processor types may be utilized. In embodiments, a shading object may comprise one or more transceivers to communicate with wireless access points utilizing a wireless communication protocol. In embodiments, one or more wireless transceivers may communicate voice and/or data communications to an access point, which in turn may communicate received voice and/or data communications to a packet-switched network (e.g., a global communications network such as the Internet, an intranet, or a private network) or a circuit-switched network (such as existing telecommunications system).

In embodiments, an integrated computing device may comprise a WiFi (or wireless LAN) transceiver 1010 which may also operate as a hotspot and/or personal wireless access point. In embodiments, an integrated computing device 860 may comprise a separate and/or additional wireless hotspot 1015. In embodiments, a wireless hotspot may be operate as an wireless access point providing network and/or Internet access to portable electronic devices (e.g., smartphones, music players) or other electronic devices (personal computers and/or laptops) in public locations, where other wireless access points are not located (or being utilized for different purposes). If a computing device 860 comprises a wireless hotspot 1015 (or a wireless transceiver 1010 is operating as a hotspot), wireless communication devices (e.g., laptops, tablets, smartphones) may utilize a shading object as a communications hub. This may be beneficial in remote locations where no wireless access points are located, or in locations where wireless data or voice communications have been interrupted. In addition, if a shading object computing device and thus a shading object includes a wireless hotspot, image or video streaming, face-timing, application downloads, or other data intensive functions and/or applications may execute and be completed in a shorter amount of time then when using a PAN transceiver 865.

In embodiments, an integrated computing device 860 may store and/or execute shading object or umbrella application software, which may be referred to as SMARTSHADE and/or SHADECRAFT application software. In embodiments, shading object or umbrella application software may be run and/or executed on a variety of computing devices including a computing device integrated within a shading object or umbrella. In embodiments, for example, shading object or umbrella application software may include computer-readable instructions being stored in non-volatile memories of a shading object computing device, a portable electronic device (e.g., a smart phone and/or a tablet), an application server, and/or a web application server, all which interact and communicate with each other. In embodiments, computer-readable instructions may be retrieved from memories (e.g., non-volatile memories) of these above-identified computing devices, loaded into volatile memories and executed by processors in the shading object computing device, portable electronic device, application server, and/or mobile application server. In embodiments, a user interface (and/or graphical user interface) for a shading object software application may be presented on a portable electronic device, although other computing devices could also execute instructions and present a graphical user interface (e.g., dashboard) to an individual. In embodiments, shading object application software may generate and/or display a dashboard with different application (e.g., process) selections (e.g., weather, health, storage, energy, security processes and/or application processes). In embodiments, shading object application software may control operation of a shading object, communicate with and receive communications from shading object assemblies and/or components, analyze information obtained by assemblies and/or components of a shading object or umbrella, integrate with existing home and/or commercial software systems, and/or store personal data generated by the shading object, and communicate with external devices.

In embodiments, a portable electronic device may also comprise a mobile application stored in a non-volatile memory. In embodiments, a mobile application may be referred to as a SHADECRAFT or a SMARTSHADE mobile application. In embodiments, a mobile application (mobile app) may comprise instructions stored in a non-volatile memory of a portable electronic device, which can be executed by a processor of a portable electronic device to perform specific functionality. In embodiments, this functionality may be controlling of, interacting with, and/or communicating with a shading object. In embodiments, mobile apps may provide users with similar services to those accessed and may be individual software units with limited or specific function. In embodiments, applications may be available for download from mobile application stores, such as Apple's App Store. In embodiments, mobile apps may be known as an app, a Web app, an online app, an iPhone app or a smartphone app.

In embodiments, a mobile app may communicate with a mobile application server and/or also an application server. In embodiments, an application server may be a backend server. In embodiments, application servers may consist of components, such as web server connectors, computer programming languages, runtime libraries, database connectors, and administration software code which may be utilized to deploy, configure, manage, and connect these components on a web host. In embodiments, an application server may run and/or execute behind a web Server (e.g. an Apache or Microsoft IIS webs server) and may run and/or execute) in front of an SQL database (e.g. a PostgreSQL database, a MySQL database, or an Oracle database). In embodiments, web software applications may be executable computer instructions which run and/or execute on top of application servers, and are written in computer programming language(s) an application server may supports. In embodiments, web software applications may call runtime libraries and/or components an application server may offer. In embodiments, an application server may be referred to as a SMARTSHADE application server and/or a SHADECRAFT application server.

In embodiments, a mobile app server may be utilized in between a mobile app and an application server. In embodiments, a mobile application may be mobile middleware software that interfaces with back-end systems (e.g., applications servers) to allow the mobile applications to communicate and interface with the application servers. In embodiments, a mobile app server may bridges a gap from existing infrastructure (e.g., application servers and/or networks and/or databases) to portable electronics devices (e.g., mobile devices). In embodiments, mobile application servers may take care of security, data management and other off-line requirements in order to minimize a load on application servers. In embodiments, a mobile application server may be referred to as a SHADECRAFT and/or SMARTSHADE mobile application server.

In embodiments, a SMARTSHADE and/or SHADECRAFT application software may comprise one or more application components and/or modules which may provide a user and/or individual with different features and/or functionality. For example, in embodiments, a SMARTSHADE and/or SHADECRAFT application software or system may comprise a personal care component and/or module, a shading object operation component and/or module, a shading object accessory commerce component, an e-commerce component and/or module, and a security/monitoring component and/or module (e.g., like a connection to an Internet of Things). In embodiments, a SMARTSHADE and/or SHADECRAFT application system or system may also provide storage or access to storage for individual's personal information, preferences, digital products (e.g., movies, pictures, and/or music), and/or security information. In embodiments, SMARTSHADE and/or SHADECRAFT application software may refer to software (e.g., computer-readable instructions) executing on a portable electronic device (e.g., a mobile device such as a smart phone), an integrated computing device (in an intelligent shading object), an application server, a cloud server, and/or a mobile application server). In embodiments, different portions, components, modules of the SHADECRAFT application software may be located and executing on different devices and a user may be interacting with one or more of the devices.

Figure 15A:
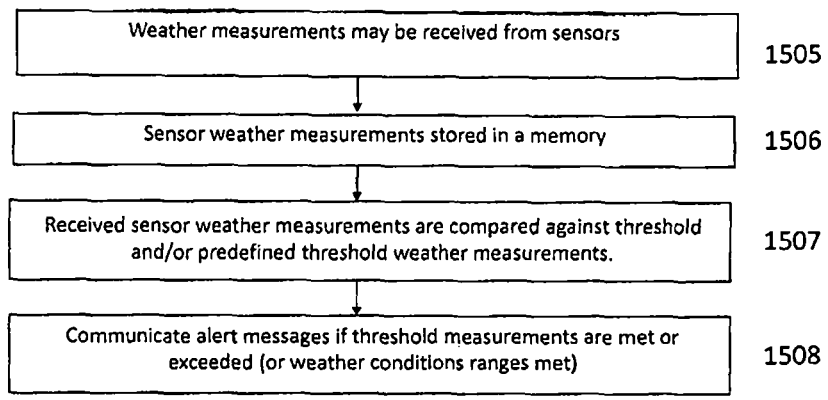
FIG. 15A illustrates an automated weather process according to embodiments.

FIG. 15A illustrates an automated weather process according to embodiments. In embodiments, when implementing a weather process (e.g., executing a weather process from a dashboard on a mobile application), an integrated computing device 860 may leverage shading object, intelligent umbrella and/or intelligent shading charging sensors and data from other nearby similar devices and can communicate and/or transfer weather measurements for a microclimate with unprecedented accuracy and improve an individual's understanding of microclimate weather conditions. In embodiments, weather measurements and/or information may be obtained and/or received 1505 from sensors in a sensor module 750 via a weather variables PCB 810 and/or a shading object moving control PCB 895. In embodiments, sensor measurements stored may be air quality measurements, UV measurements, temperature measurements, humidity measurements, wind measurements, and/or barometer measurements. In embodiments, sensor measurements may be stored 1506 in a memory 1030 and/or 1035 of an integrated computing device 1000. Individuals may be presented with localized and microenvironment weather conditions with unprecedented accuracy due to localization of these microclimate measurements. This is an improvement on existing systems where sensor readings were normally obtained in public places.

In embodiments, weather thresholds and/or preferred weather conditions may be established and/or set for intelligent shading objects, intelligent umbrellas, and/or intelligent shading charging systems. In embodiments, an intelligent umbrella system may compare 1507 received sensor weather measurements against threshold and/or predefined threshold weather measurements. If the computing device executing the weather process (or software application) determines that these threshold weather measurements and/or weather conditions have occurred, the weather process may communicate 1508 an alert message identifying thresholds have been met and/or exceeded. In embodiments, an intelligent umbrella software system may communicate an alert or communication in a message, command, instruction and/or signal to a display device for display device to a user and/or to a sound reproduction device (e.g., audio subsystem) for playback to a user. In embodiments, for example, users may also set desired weather and/or environment condition parameters that a user may wish to enjoy and/or wish to avoid. In embodiments, a computing device may store the set and/or established environmental condition parameters in a memory and/or database of a computing device of the intelligent umbrella and/intelligent charging shading system. For example, in embodiments, a user may establish that he and/or she may be wish to be alerted if a temperature is over 70 degrees (so that a user may enjoy the umbrella or shading charging system) and/or also if a temperature exceeds 95 degrees (in order for a misting system to be activated to cool down an environment). In addition, for example, parameters may be set so that he or she may wish to be alerted in a wind speed over 15 miles per hour and/or if a relative humidity is over 60%. Further, for example, a user may wish to be alerted if an air quality reading has a particulate reading or other measurement determined to be unsafe. Likewise, settings may be established which identify conditions under which the user may wish to start utilizing an intelligent umbrella system. For example, a user may wish to start enjoying an outdoor environment and utilize an intelligent shading umbrella if it is after 9:00 am but before 6:00 pm, a temperature is over 65 degrees Fahrenheit, a humidity reading is under 75%, an air quality measurement indicates air with minimal contaminants, and/or a wind reading is less than 10 miles per hour. For example, in embodiments, if one or more of these parameters are met, as determined by received sensor measurements, an intelligent umbrella and/or shading charging system may generate an alert message, command, instruction, and/or signal to alert of dangerous and/or desired conditions.

Figure 15B:
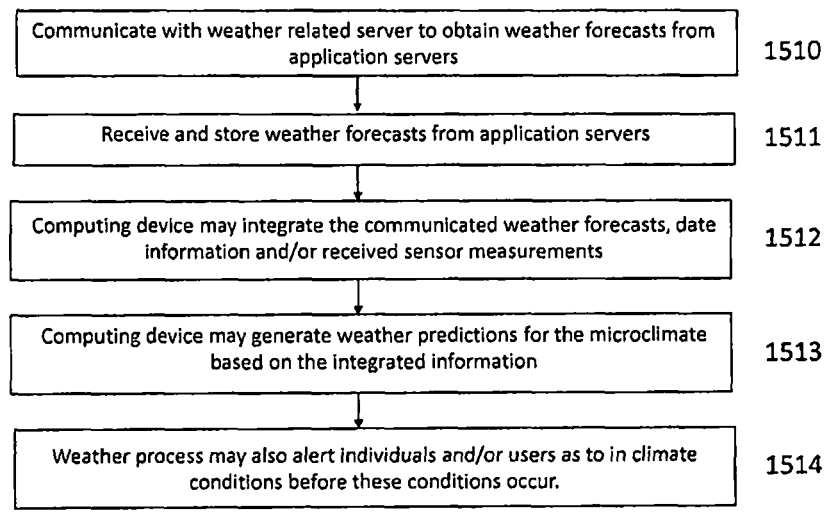
FIG. 15B illustrates predicting weather conditions in a weather process according to embodiments.

In embodiments, a weather process executing on a computing device of an intelligent umbrella or an intelligent shading charging system may also predict weather conditions for an upcoming period of time. FIG. 15B illustrates predicting weather conditions in a weather process according to embodiments. Predicting weather conditions in a weather process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 15C:
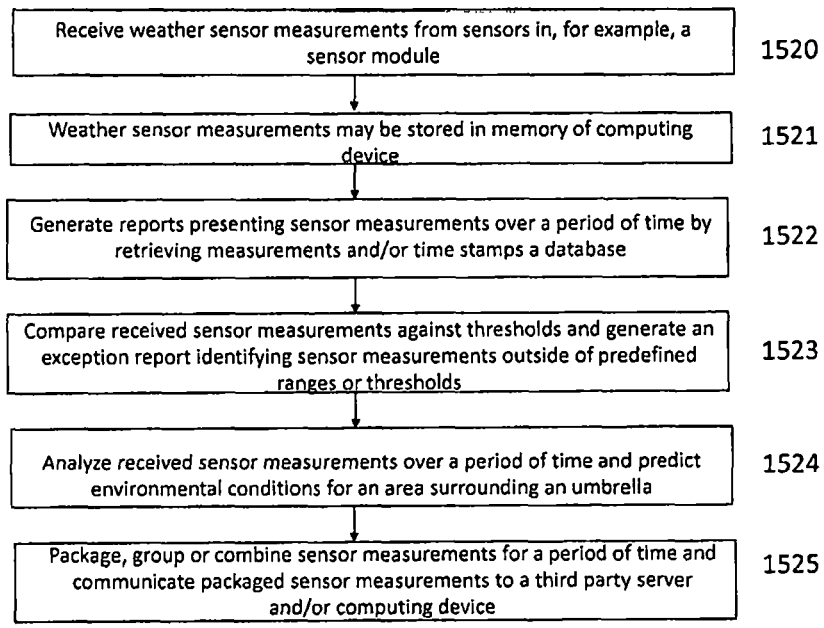
FIG. 15C illustrates a weather data gathering process on a periodic basis according to embodiments.

FIG. 15C illustrates a weather data gathering process on a periodic basis according to embodiments. A weather data gathering process in a weather process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

In embodiments, an intelligent umbrella and/or shading charging system may receive communicated sensor measurements and/or solar panel measurements. In embodiments, an intelligent umbrella and/or shading charging system may store communicated sensor measurements and/or solar panel measurements. In embodiments, an intelligent umbrella and/or shading charging system may integrate received sensor measurements and/or solar panel measurements with other software application software executing on one or more processors of the computing device of an intelligent umbrella system. For example, the other software application software may utilize received sensor measurements and/or solar panel measurements, in execution of its application software. For example, a computing device in intelligent umbrella and/or shading charging system may fetch computer readable instructions from a memory and execute the computer-readable instructions to execute a calendar process. In embodiments, a calendar process may utilize the received sensor measurements and/or solar panel measurements and integrate sensor measurements and/or solar panel measurements into a calendar process (e.g., solar panel output and/or temperature/humidity readings may be displayed on days in a calendar software application). In embodiments, a user may establish thresholds and/or guideposts, and if received sensor measurements and/or solar panel measurements exceed established thresholds and/or guideposts, a calendar process may generate an alert which may also be displayed within a calendar process/application. In embodiments, a sun exposure process may fetch computer-readable instructions and execute the computer-readable instructions on one or more processors of the intelligent umbrella and/or shading charging system computing device. In embodiments, a sun exposure process may utilize sensor readings and/or solar panel readings and calculate a sun exposure reading for an individual utilizing the intelligent umbrella and/or shading charging system. In embodiments, a sun exposure process may calculate a sun exposure immediately after receiving solar panel measurements and/or sensor measurements. An advantage of this sun exposure index may be that the sun exposure index may be based on actual measurements for the individual at a specific location and not an estimate based on an estimated geographic location and an estimated location. In embodiments, a social media application (or process), e.g., Snapchat, may integrate sensor panel measurements and/or solar panel measurements into its process. For example, a user may setup alerts and/or thresholds to initiate communication by a social media process to a user. In embodiments, a social media process may receive sensor panel measurements and/or sensor measurements and integrate these measurements into messages or videos communicated to a social media process user and/or connections/friends of a social media process user. In embodiments, although descriptions above describe computer-readable instructions executable on a computing device of an intelligent umbrella and/or shading charging system, in other embodiments, the computer-readable instructions may be resident on a wireless electronic device, a third-party computing device, a portable electronic device, and/or an application server, and may be executable by processors on such devices. Continuing with this example embodiment, sensor readings and/or solar panel readings may be communicated to one or more of a wireless electronic device, a third-party computing device, a portable electronic device, and/or an application server, and be integrated with processes executing on those devices.

In embodiments, computer-readable and computer-executable instructions may be fetched from a non-volatile memory in an integrated computing device, loaded into a volatile memory, and may be executed by a processor in a computing device to recognize an individuals' voice and/or to perform a voice recognition process. This may occur in response to a user selecting a voice recognition button or icon on a dashboard of a shading object application software. A voice recognition process is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device," the disclosure of both of which are hereby incorporated by reference.

In embodiments, a shading object may comprise a control panel (not shown). In embodiments, a control panel may comprise an input screen and/or a controller. In embodiments, an input screen may be a touch screen and/or a screen receptive to receiving electronic input via a pen. In embodiments, a control panel may present a graphical user interface with menu items to allow a user to control and/or operate many components of a shading object. In embodiments, a shading object may also comprise an organic light-emitting diode (OLED) display 1425 (see FIG. 14). In embodiments, an OLED display may be a control panel. In embodiments, an OLED display 1425 may be a diagnostics monitor. In embodiments, an OLED display may display messages from a motion control PCB, a computing device, external computing devices, and/or a portable electronic device.

Figure 15D:
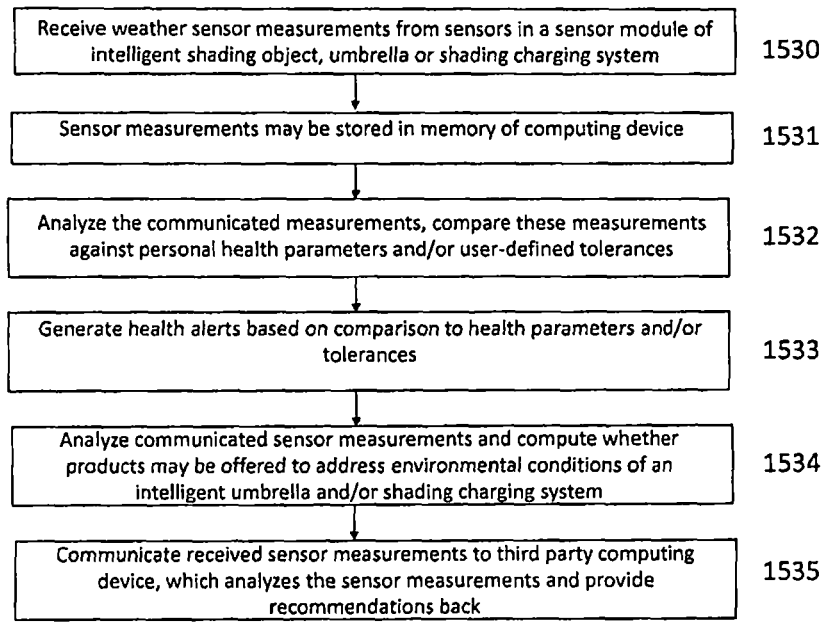
FIG. 15D illustrates execution of a health process by a computing device in an intelligent umbrella or shading charging system according to embodiments.

In embodiments, computer-readable and computer-executable instructions may be fetched from a non-volatile memory, loaded into a volatile memory, and may be executed by a processor in an integrated computing device to perform a personal health process. In embodiments, the computing device may be in a shading object, intelligent umbrella, and/or intelligent shading charging system. FIG. 15D illustrates execution of a health process by a computing device in an intelligent umbrella or shading charging system according to embodiments. A health process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 15E:
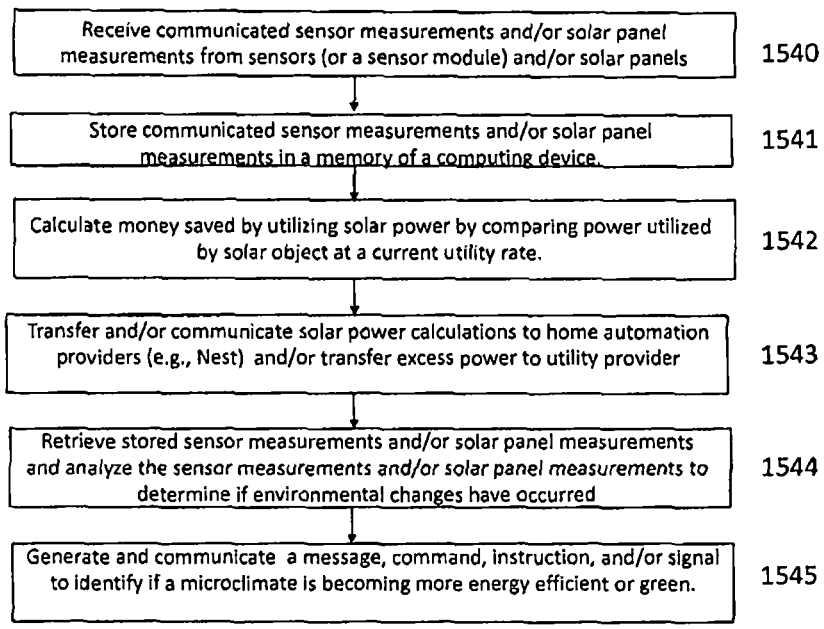
FIG. 15E illustrates an energy process in a shading object, intelligent umbrella, and/or intelligent shading charging system implementing an energy process according to embodiments.

FIG. 15E illustrates an energy process in a shading object, intelligent umbrella, and/or intelligent shading charging system implementing an energy process according to embodiments. An energy process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

In embodiments, an energy tracking process may retrieve stored sensor measurements and/or solar panel measurements for a specified period of time and analyze the sensor measurements and/or solar panel measurements to determine 1544 if environmental changes have occurred. An energy tracking process is described in detail in U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 15F:
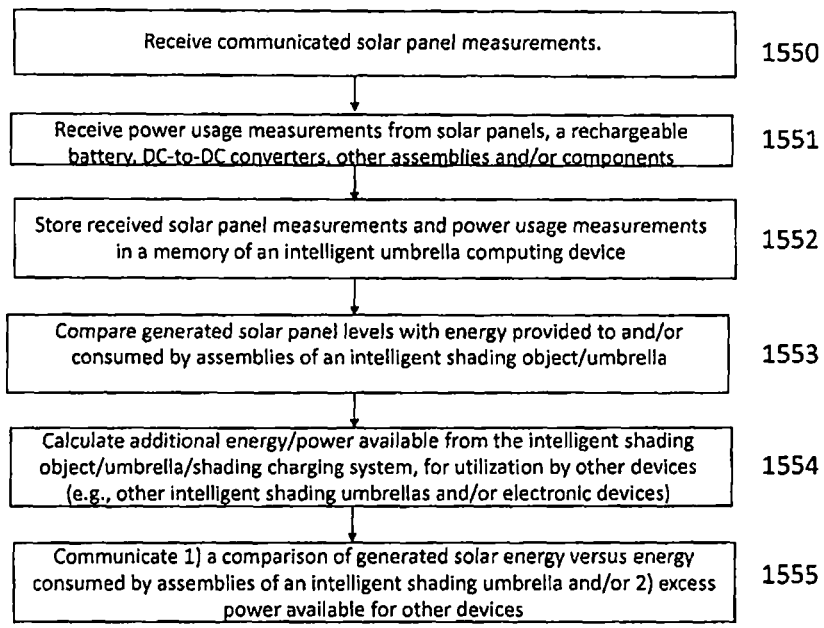
FIG. 15F illustrates energy generation and energy consumption process of an energy process in an intelligent umbrella and/or intelligent shading charging assembly according to embodiments.

FIG. 15F illustrates energy generation and energy consumption in an energy process in an intelligent umbrella and/or intelligent shading charging assembly according to embodiments. Energy generation and/or energy consumption in an energy process is described in detail in U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is incorporated by reference.

Figure 15G:
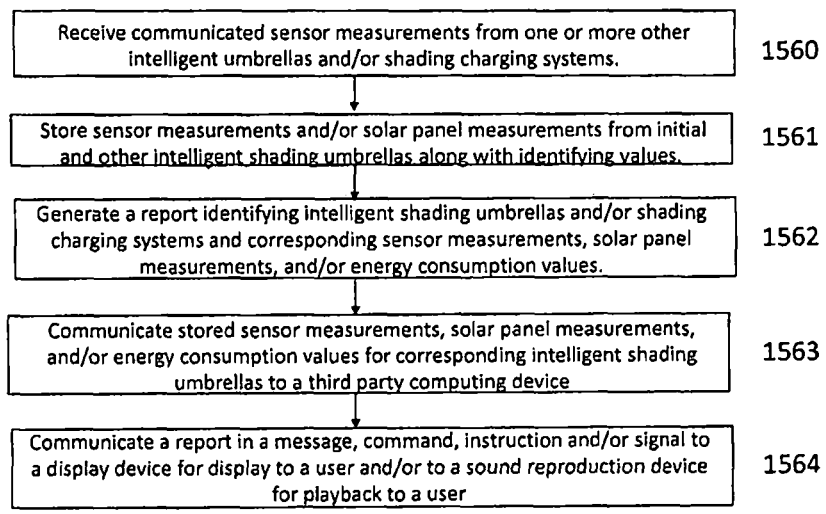
FIG. 15G illustrates energy gathering for a plurality of devices according to embodiments.

In embodiments, an energy tracking process may retrieve computer-readable instructions from a memory of an intelligent umbrella computing device and execute the computer-readable instructions on one or more processors of the intelligent umbrella or intelligent shading charging system's computing device. FIG. 15G illustrates an energy tracking process for one or more shading objects, intelligent umbrellas and/or shading charging system according to embodiments. An energy tracking process for multiple shading objects, intelligent umbrellas and/or intelligent shading charging systems is described in detail in U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 15H:
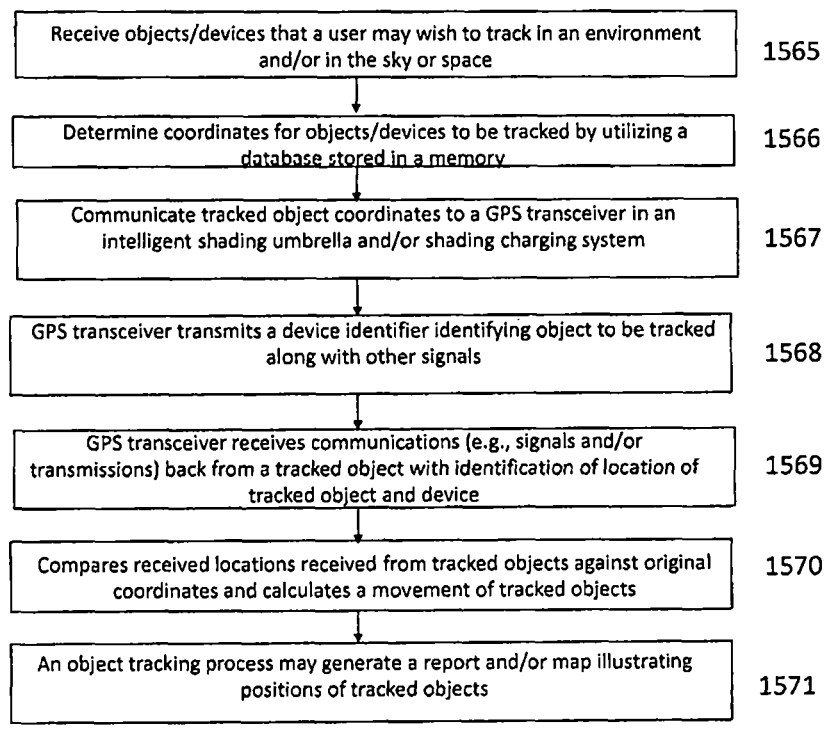
FIG. 15H illustrates object tracking in an energy process according to embodiments.

FIG. 15H illustrates object tracking in an energy process according to embodiments. Object tracking in an energy process is described in detail in U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

In embodiments, one or more digital cameras 857 may be utilized as a security cameras for the environment. In embodiments, for example as discussed above, one or more digital cameras 857 may capture images, sounds and/or video in an environment in which a shading object, umbrella and/or shading charging system is installed and/or located. For example, if a shading object, umbrella, and/or shading charging system is rotating around a vertical axis (e.g., the shading system (stem assembly 106 and center support assembly 107) are rotating about a base assembly 105— FIGS. 1A and 1B and a lower support assembly 187 and an upper support assembly 191 are rotating about a housing and/or enclosure 182—FIG. 1C), a camera 857 may capture images, sounds and/or real-time video. In embodiment, one or more digital cameras may capture images, sounds and/or real-time video and may communicate images, sounds and/or video to a memory located on a computing device 860 within a center support assembly 107, lower support assembly 187 or upper support assembly 191. In embodiments, one or more digital cameras 857 may capture images, sounds and/or real-time video of an environment here a shading object, umbrella, and/or shading charging system is located (up to a 360 degree picture) and may communicate images, sounds and/or video to a memory located on a motion control PCB 895. In embodiments, images, sounds or real-time video may be communicated and/or streamed to a wireless transceiver in an integrated computing device 860 and/or associated computing device PCB. In embodiments, continuing with this example, images, sounds and/or real-time video communicated to a computing device may be stored in a memory (e.g., volatile and/or non-volatile memory) of a computing device 860. In embodiments, continuing with this illustrative embodiments, images, sounds and/or real-time video may be communicated via a wireless transceiver and/or wireless hotspot to external computing devices (e.g., application servers, databases, network servers) or other devices on a global communications network (e.g., such as the World Wide Web and/or the Internet). In embodiments, a computing device 860 and/or its transceiver may not be utilized to communicate images, sounds, and/or video. Instead, a transceiver (e.g., a Bluetooth transceiver) may receive images, sounds, and/or video communicated from a camera and communicate the received images, sounds and/or video to external computing devices (e.g., application servers, databases, network servers) or other devices on a global communications network (e.g., such as the World Wide Web and/or the Internet).

In embodiments, computer-readable and computer-executable instructions may be fetched from a non-volatile memory, loaded into a volatile memory, and may be executed by a processor in a computing device to executed and/or to perform a security process. This may occur in response to a user selecting a security button or icon on a dashboard of a shading object, umbrella and/or shading charging system mobile and/or software application. Operation and/or execution of a security process (or security portion of a software application) may be controlled by a computing device in a shading object, umbrella and/or shading charging system. In embodiments, a security process (e.g., initiated by selection in a mobile application or another software application) may receive communicated images, sounds and/or video feeds and/or quality of image readings (e.g., a desired resolution of received images). In embodiments, the video, sound and/or image feeds may be stored in a memory 1030 or 1035 of a computing device in a shading object (umbrella or shading charging system), a memory of a cloud server, a memory of an application server, a memory of a mobile device, and/or databases. In embodiments, an integrated computing device 860 may analyze video, sound and/or images and issue safety alerts based on analyzation of video, sound, and/or images, motion detector activity, and/or over threshold sensor readings (e.g., air quality readings from an air quality sensor). In embodiments, an integrated computing device 860 may communicate video, sound and/or images to an external device, such as an existing home security application server, such as ADT Security, which could enhance ADTs security capabilities, and/or also provide a platform for cross-promotion of security system software. In embodiments, an integrated computing device 860 may execute a home and/or building security process and may communicate video and/or images, with or without sound, to emergency responders (e.g., police, fire, security responders, FEMA) to aid in dealing with emergency situations.

Figure 15I:
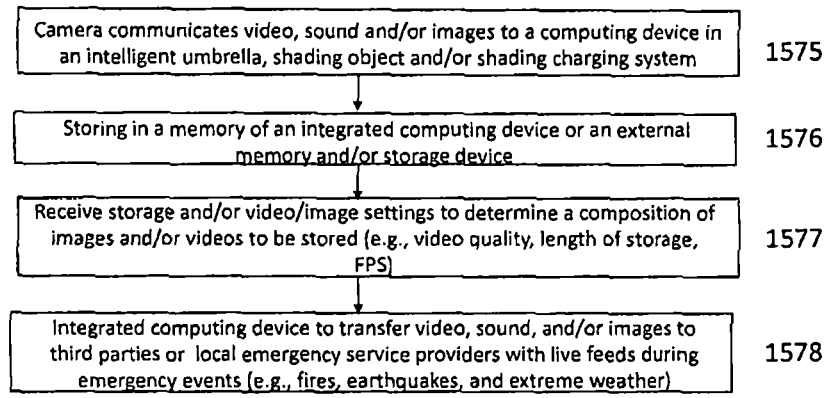
FIG. 15I illustrates a backup process for a shading object, an intelligent umbrella and/or shading charging system according to embodiments.

FIG. 15I illustrates a backup process for a shading object, an intelligent umbrella and/or shading charging system according to embodiments. In embodiments, customers, individuals and/or owners of shading objects, intelligent umbrellas and/or intelligent shading charging systems may charge individuals for storage of video, sounds and images in a computing device, cloud storage, databases and/or external devices. In embodiments, customers and/or individuals may be charged more for additional Gigabyte storage (larger amounts of video, sounds and images) and/or higher quality of images and video. In embodiments, SMARTSHADE and/or SHADECRAFT application software executing on an integrated computing device may also provide storage or access to storage for individual's personal information, preferences, and/or digital products. In embodiments, an individual may need additional storage for personal information and/or data such as photos, emails, messages, videos, etc. In embodiments, a shading object may have settings customized for one or more embodiments and these settings may also be stored.

In embodiments, computer-readable and computer-executable instructions may be fetched from a non-volatile memory, loaded into a volatile memory, and may be executed by a processor in a computing device to perform storage and/or backup process for an intelligent umbrella and/or shading charging system. In embodiments, a storage and/or backup button or icon on a dashboard of a shading object and/or shading charging mobile and/or software application may be selected. For example, operation of a storage process may comprise an individual selecting a storage and/or backup icon and/or menu item (or providing a voice for a voice recognition command). In embodiments, for example, cameras may generate and/or capture videos, sounds, and/or images, and communicate 1575 the video, sound and/or images to a computing device in an intelligent umbrella, shading object and/or intelligent shading charging system. Although the discussion below is made with respect to images from cameras, the description applies also to receiving, analyzing and/or storing sensor measurements, solar panel measurements, energy produced measurements and energy consumed measurements along with personalized settings of assemblies, components and/or computing devices of an intelligent umbrella and/or shading charging system. In embodiments, the communicated video, sound and/or images may be stored 1576 in a memory of an integrated computing device or an external memory and/or storage device (e.g., databases, memories of application servers and/or cloud servers). In embodiments, an integrated computing device may receive 1577 storage and/or video/image/sound settings to determine a composition of images and/or videos to be stored (e.g., video quality, length of storage, FPS). In embodiments, onboard sensor readings from shading object, intelligent umbrellas, and intelligent shading charging system sensors may also be stored. In embodiments, users may also opt-in and allow an integrated computing device to transfer 1578 video, sound, and/or images to local emergency service providers with live feeds during emergency events (e.g., fires, earthquakes, and extreme weather).

In embodiments, an individual may select a backup menu item on a shading object mobile software application and settings may be backed up into a memory of an application server. In embodiments, if a shading object is replaced, settings can be restored by selecting a restore option and retrieving settings form an application server memory. In embodiments, an individual can also backup information stored on a portable electronic device to application server memory. For example, this information may be photos, emails, messages, videos, etc. In embodiments, home security video or video captured by shading object cameras may be stored in memory components 1030 and 1035 of an integrated computing device. In embodiments, videos may be erased after a certain period of time and/or may be communicated and stored in an off-site storage (e.g., application server and/or database). In embodiments, weather or environmental information along with shade usage, shade component usage statistics, and/or shade component maintenance information may also be communicated from a wireless transceiver to an access point (e.g., a shading object computing device hotspot or an external access point) to an application server and/or database for storage and/or later retrieval. For example, an integrated computing device 860 may keep track of how many times and/or for how long a motor is operated or efficiency of charging of a battery.

Figure 16A:
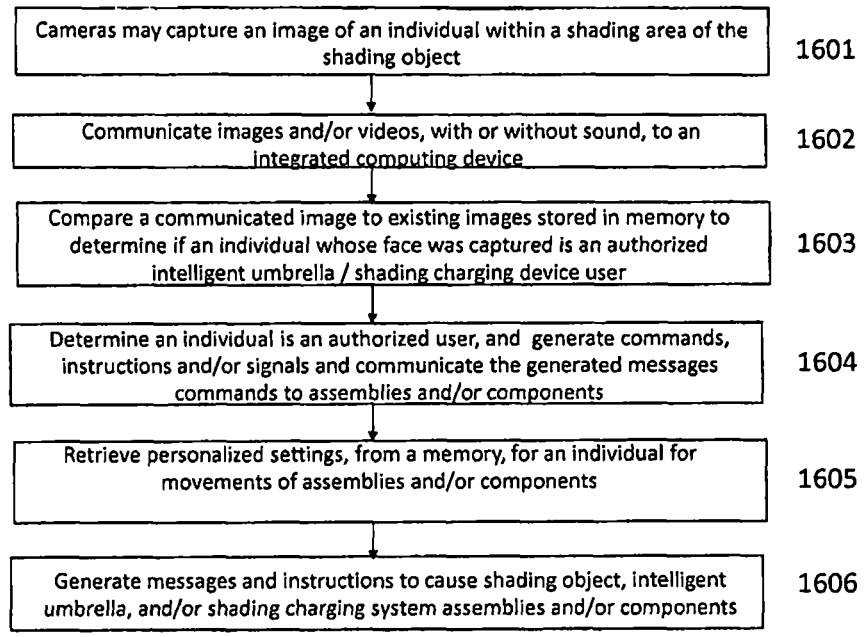
FIG. 16A is a flowchart of a facial recognition process according to an embodiment.

FIG. 16A is a flowchart of a facial recognition process according to an embodiment. A facial recognition process is described in detail in U.S. non-provisional patent application Ser. No. 15/219,292, filed Jul. 26, 2016, entitled "Shading Object, Intelligent Umbrella and Intelligent Shading Charging System Integrated Camera and Method of Operation," the disclosure of which is hereby incorporated by reference.

Figure 16B:
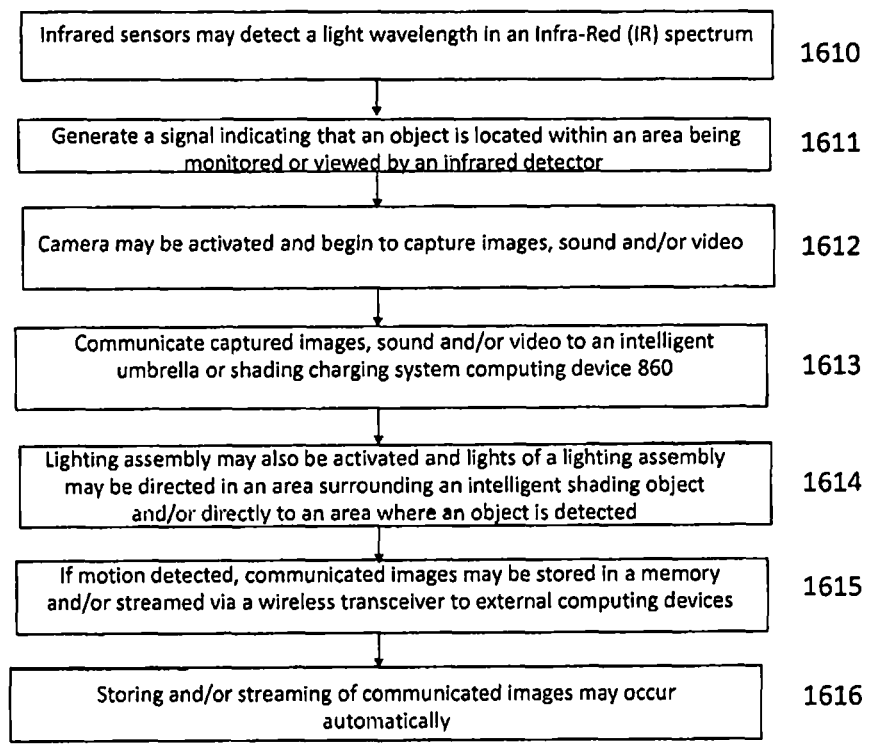
FIG. 16B illustrates an infrared detection process according to embodiments.

FIG. 16B illustrates an infrared detection process according to embodiments. An infrared detection process is described in detail in U.S. non-provisional patent application Ser. No. 15/219,292, filed Jul. 26, 2016, entitled "Shading Object, Intelligent Umbrella and Intelligent Shading Charging System Integrated Camera and Method of Operation," the disclosure of which is hereby incorporated by reference.

Figure 16C:
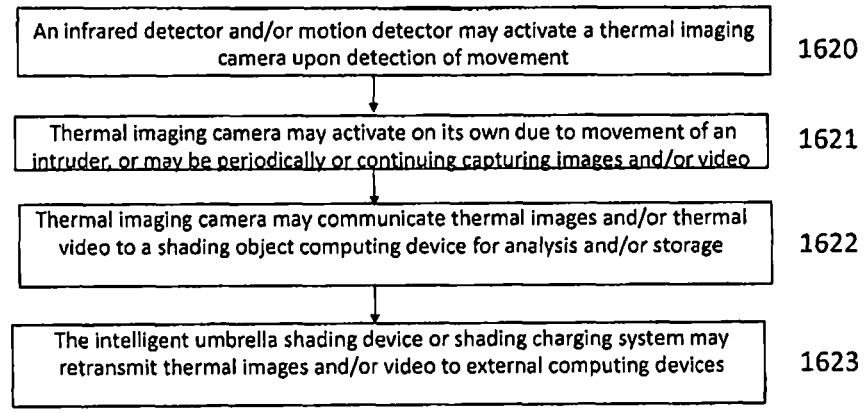
FIG. 16C illustrates a thermal detection process according to embodiments.

FIG. 16C illustrates a thermal detection process according to embodiments. A thermal detection process is described in detail in U.S. non-provisional patent application Ser. No. 15/219,292, filed Jul. 26, 2016, entitled "Shading Object, Intelligent Umbrella and Intelligent Shading Charging System Integrated Camera and Method of Operation," the disclosure of which is hereby incorporated by reference.

Figure 16D:
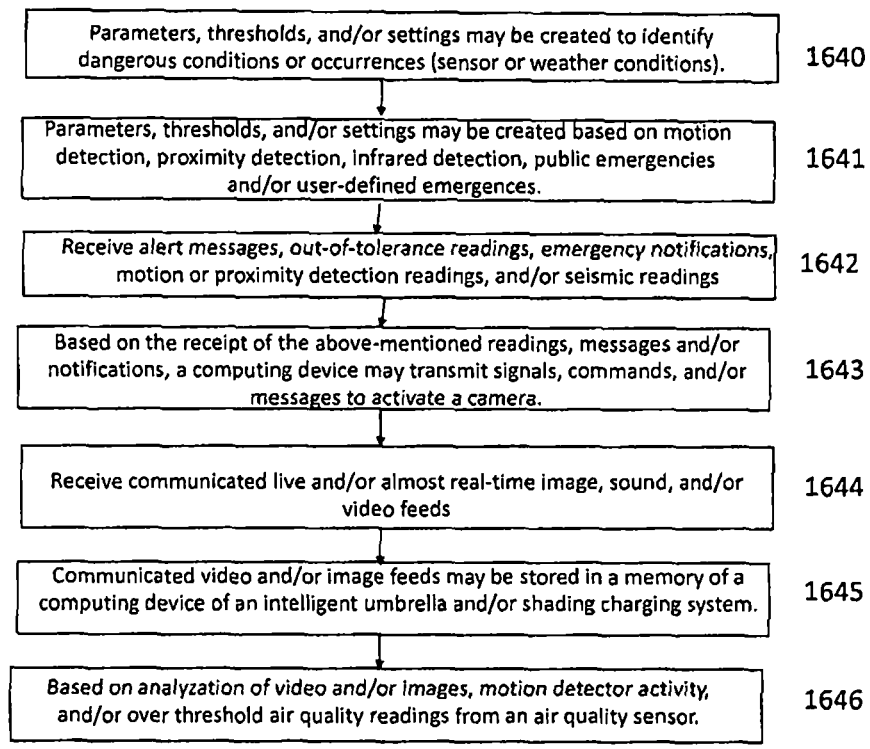
FIG. 16D illustrates a security process for an intelligent umbrella and/or intelligent shading charging systems according to embodiments.

FIG. 16D illustrates a security process for an intelligent umbrella and/or intelligent shading charging systems according to embodiments. A security process is described in detail in U.S. non-provisional patent application Ser. No. 15/219,292, filed Jul. 26, 2016, entitled "Shading Object, Intelligent Umbrella and Intelligent Shading Charging System Integrated Camera and Method of Operation," the disclosure of which is hereby incorporated by reference.

Sun and other environmental and/or weather conditions may damage an individual's skin or impact an individuals' health. In embodiments, SMARTSHADE application software may provide a user with medical monitoring features and/or functionality. In embodiments, for example, a shading object system may detect a user is within a shading area. In embodiments, a shading object system may activate a camera to capture an image of the individual. In embodiments, a captured image may be compared to images stored in a memory of a shading object system to identify if an individual is known by a shading object system. In embodiments, facial recognition may be performed on the image to assist in identifying an individual. Continuing with this illustrative example, if an individual is not known and/or recognized, characteristics of an individual's image may be stored in a memory of a shading object system for future reference. In embodiments, characteristics may include hair color, hair length and/or scalp coverage, skin color and/or skin tone, number of freckles, presences of moles and/or lesions. In embodiments, characteristics may comprise medical history such as respiratory illnesses (e.g., asthma), skin cancer, heart conditions, etc. In embodiments where an individual is recognized, a shading object computing device 860 may retrieve a user's characteristics and/or measurements. In embodiments, a shading object computing device may retrieve and/or capture environmental conditions. For example, a shading object computing device may retrieve an air quality measurement, an ozone measurement, a sunlight intensity measurement, a humidity measurement, and/or a temperature measurement. In embodiments, a shading object computing device may analyze the retrieved individual characteristics and/or the received environmental conditions and provide recommendations to an individual as potential actions. For example, if an air quality measurement is low or poor and an individual has asthma, a shading object computing device 860 may provide recommendations for an individual to make sure they have their asthma medication and/or limit their time in the environment. As another illustrative example, if an individual's characteristics indicate that an individual and/or an individual's family has a history of skin cancer, a local time is between 10:00 am and 3:00 pm (highest portion of sunlight, and there is no cloud cover, a shading object computing device may generate recommendations such as requesting that a user stay within a shading area and/or apply sunscreen. In addition, a shading object computing device may analyze the individual's image, identify that a user is sunburned, and may recommend that an individual apply aloe or skin conditioner to a sunburn and/or stay within a shading area.

In embodiments, a shading object computing device 860 may also capture images of an individual and transfer these images (either still images and/or video images) to a third party provider. In embodiments, a third party provider may be a medical professional (e.g., like a dermatologist, a surgeon, or a general practitioner). In embodiments, a medical professional may analyze an image and/or videos and provide an individual with feedback related to an image. For example, a shading object system camera 857 may capture an image of a mole on an individual's chest and/or back. A medical professional may provide a preliminary evaluation of an individual and provide a recommendation to a user for future actions. In embodiments, a shading object system camera 857 may provide a video of an individual's movement after, for example, a surgery. In embodiments, images and/or videos may be provided in real-time, e.g., such as in a Snapchat and/or Facetime. In embodiments, images may be communicated from a shading object camera 857 through a wireless transceiver 1010 or 865 to an access point and onto a global communications network such as the Internet. In embodiments, images and/or videos may be communicated through a mobile application server (middleware) to an application server (e.g., a SMARTSHADE and/or SHADECRAFT application server). In embodiments, images and/or videos may be communicated through the Internet to a medical professional's web server, for example.

In embodiments, user behavior characteristics may be desired by many organizations. In embodiments, a shading object and its multiple components may generate data which may be desirable to third parties. For example, obtained weather information, air quality readings, UV readings, wind readings, and user selections in a software application and/or other shading object or umbrella features. In embodiments, this raw information may be licensed to third parties as real-time or near real-time user information. In embodiments, access to different types and/or scope of data may be a basis for different subscription models. In embodiments, data on in-app purchases (via e-commerce features) may provide insight into decisions that shading object individual owners make (e.g., drivers behind consumer spending patterns). In embodiments, third parties may be able to purchase ad-space on Shadecraft devices and/or assemblies. In embodiments, utilizing obtained sensor data obtained from a shading object, a third party could deliver targeted ads based on region, climate, user behavior, as well as other metrics. In embodiments, in-app purchasing ability may give advertisers data on conversion rates & revenue, making ad space more valuable because ad success may be tracked and/or refined. In embodiments, revenue sharing models may also increase ad revenue and incentivize commercial customers to utilize shading objects and/or shading object application software.

Sun and other environmental and/or weather conditions may damage an individual's skin or impact an individuals' health. In embodiments, SMARTSHADE application software may provide a user with medical monitoring features and/or functionality. In embodiments, for example, a shading object system may detect a user is within a shading area. In embodiments, a shading object system may activate a camera to capture an image of the individual. In embodiments, a captured image may be compared to images stored in a memory of a shading object system to identify if an individual is known by a shading object system. In embodiments, facial recognition may be performed on the image to assist in identifying an individual. Continuing with this illustrative example, if an individual is not known and/or recognized, characteristics of an individual's image may be stored in a memory of a shading object system for future reference. In embodiments, characteristics may include hair color, hair length and/or scalp coverage, skin color and/or skin tone, number of freckles, presences of moles and/or lesions. In embodiments, characteristics may comprise medical history such as respiratory illnesses (e.g., asthma), skin cancer, heart conditions, etc. In embodiments where an individual is recognized, a shading object computing device 860 may retrieve a user's characteristics and/or measurements. In embodiments, a shading object computing device may retrieve and/or capture environmental conditions. For example, a shading object computing device may retrieve an air quality measurement, an ozone measurement, a sunlight intensity measurement, a humidity measurement, and/or a temperature measurement. In embodiments, a shading object computing device may analyze the retrieved individual characteristics and/or the received environmental conditions and provide recommendations to an individual as potential actions. For example, if an air quality measurement is low or poor and an individual has asthma, a shading object computing device 860 may provide recommendations for an individual to make sure they have their asthma medication and/or limit their time in the environment. As another illustrative example, if an individual's characteristics indicate that an individual and/or an individual's family has a history of skin cancer, a local time is between 10:00 am and 3:00 pm (highest portion of sunlight, and there is no cloud cover, a shading object computing device may generate recommendations such as requesting that a user stay within a shading area and/or apply sunscreen. In addition, a shading object computing device may analyze the individual's image, identify that a user is sunburned, and may recommend that an individual apply aloe or skin conditioner to a sunburn and/or stay within a shading area.

In embodiments, a shading object computing device 860 may also capture images of an individual and transfer these images (either still images and/or video images) to a third party provider. In embodiments, a third party provider may be a medical professional (e.g., like a dermatologist, a surgeon, or a general practitioner). In embodiments, a medical professional may analyze an image and/or videos and provide an individual with feedback related to an image. For example, a shading object system camera 857 may capture an image of a mole on an individual's chest and/or back. A medical professional may provide a preliminary evaluation of an individual and provide a recommendation to a user for future actions. In embodiments, a shading object system camera 857 may provide a video of an individual's movement after, for example, a surgery. In embodiments, images and/or videos may be provided in real-time, e.g., such as in a Snapchat and/or Facetime. In embodiments, images may be communicated from a shading object camera 857 through a wireless transceiver 1010 or 865 to an access point and onto a global communications network such as the Internet. In embodiments, images and/or videos may be communicated through a mobile application server (middleware) to an application server (e.g., a SMARTSHADE and/or SHADECRAFT application server). In embodiments, images and/or videos may be communicated through the Internet to a medical professional's web server, for example.

In embodiments, SMARTSHADE and/or SHADECRAFT application software (the software being instructions loaded into memory of a smartphone, a mobile application server and/or application server). This may be referred to as a shading object system. In embodiments, a shading object system may control operations of a shading object utilizing the SMARTSHADE and/or SHADECRAFT application software. For example, a portable electronic device may present a menu of options for controlling one or more shading object components. In embodiments, an individual may select a menu item of a shading object mobile app, which may result in commands and/or instructions being transmitted to different components of a shading object and actions being performed. In embodiments, shading object components, after receiving commands and/or instructions, may generate measurements. In embodiments, a shading object may communicate these messages to a shading object computing device 860. In embodiments, measurements may be stored in a memory and/or displayed on a monitor 1425 of a shading object computing device. In embodiments, a shading object component may communicate an acknowledgement message and/or a status indicator to a shading computing device system, which may be stored in a memory and/or displaying on a shading object computing device. In embodiments, a shading computing device system may control operation of multiple shading objects. For example, an individual may control operation of any of the motors in a number of shading objects in via a shading object mobile application on a portable electronic device (e.g., may cause a stem assembly and a central support assembly to rotate around a base assembly). For example, a shading object control process may request measurements from one or more sensors (e.g., sunlight sensors, air quality sensors, tilt sensors). In addition, a shading object control process may activate and/or operate a camera.

In embodiments, a shading object computing device and/or mobile app may allow individuals to purchase, replace and/or return shading object accessories. In embodiments, a shading object computing device and/or mobile app may present a user with various accessories for purchase. For example, an individual may be able to purchase shading object arms/blades, shading fabric, batteries or solar cells for a shading object. In embodiments, a shading object computing device and/or mobile application may also present a menu item allowing individuals to connect to Internet and purchase items from other e-commerce web sites.

In embodiments, a shading object computing device and mobile app may allow individuals to diagnose problems with shading object operation. In embodiments, an individual may initiate diagnostics for a shading object by selection of a menu item in a mobile device application. In embodiments, commands, instructions and/or signals may be communicated to components of a shading object. Measurements and/or signals may be received back from components and if these measurements and/or signals exceed a threshold, a shading object computing device and/or mobile application may generate an error condition and/or message. In embodiments, this error condition and/or message may be communicated to a display 1425. For example, diagnostics may be run on any one of the first, second and/or third motors. In addition, diagnostics may be run on any one of shading object sensors (e.g., environmental sensors, tilt sensor, motion or proximity sensors).

In embodiments, an intelligent shading object or umbrella may be a device on an Internet of Things (IoT). In embodiments, an Internet of Things (IoT) may be a network of physical objects—sensors, devices, vehicles, buildings, and other electronic devices. These objects may comprise items embedded with electronics, software, sensors, and network connectivity, which enables these physical objects to collect and exchange data with each other and/or with servers connected via a global communications network (e.g., an Internet). In embodiments, the IoT may sense and/or control objects across existing wireless communication network infrastructure an global communications network infrastructure. In embodiments, integrating of devices via IoT may create opportunities for more direct integration of a physical world into computer-based systems, which may result in improved efficiency, accuracy and economic benefit. In addition, when IoT is augmented with sensors and actuators, IoT may be integrated or enabled with a more general class of cyber-physical systems, e.g., smart grids, smart homes, intelligent transportation and smart cities. In embodiments, in IoT, for example, may be uniquely identifiable through its embedded computing system but is able to interoperate within the existing Internet infrastructure. If a shading object is integrated into IoT, for example, a shading object may be part of a smart home and/or smart office. For example, a shading object enable with IoT capability, because it may incorporate cameras, may be able to communicate with or be integrated into a home or office security system. Further, if an individual has a smart home, an individual may be able to control operation of, or communicate with an intelligent shading object or umbrella as part of an existing smart home software application (either via a smart phone, mobile communication device, tablet, and/or computer). In addition, an intelligent shading object, if part of IoT, may be able to interface with, communicate with and interact with an existing home security system. Likewise, an intelligent shading object may be able to be an additional sound reproducer (e.g., via speaker(s)) for a home audio and/or video system that is also on the IoT. In addition, an intelligent shading object may be able to integrate itself with an electronic calendar (stored on a computing device) and become part of a notification or alarm system because it will identify when upcoming meetings are occurring. In embodiments, an intelligent shading computing device may utilize artificial intelligence to determine which music to play from a portable electronic device. In embodiments, a memory of an intelligent shading object may have user playlist information, e.g., genre played during certain timeframes, favorites, song played at specific times. In embodiments, an integrated computing device 860 may receive a request to play music and may select a playlist of music based on user's preferences and or usage factors. After a playlist is selected, a shading object computing device 860 may stream selected music from an individual's portable electronic device through a wireless network transceiver and to a sound reproduction system.

In embodiments, a shading object computing device 860 may have computer-readable instructions, stored in a nonvolatile memory, which when executed by a processor, may execute an artificial intelligence process and may provide artificial intelligence functionality. For example, a shading office computing device 860 may receive measurements from environmental sensors, as described above, analyze the measurements, and make recommendations to users regarding sun exposure, heat exposure, and/or hydration. For example, a shading object computing system 860 may receive and analyze temperature measurements and sun intensity measurements, and based on the analysis, provide a recommendation to a shading object user how long the user should be out in the environment or when an individual should hydrate if in the environment. In addition, an individual can input health risk factors, and a shading object computing device 860 may also consider health risk factors when making a recommendation. For example, if a temperature is high and humidity is high, and a user has a heart condition, a shading object computing device system may recommend that a user only spend 30 minutes under a shading object and that during this time, the individual should drink eight ounces of water.

In embodiments, an integrated computing device 860 may also recommend shading object positioning throughout a day based on weather forecasting and/or sun tracking. In embodiments, a shading object computing device may have stored previous positions of different portions of a shading object (e.g., rotation angle of a stem assembly, angle of an upper assembly 112 with respect to a lower assembly 113 of a central support assembly), and may provide a recommendation of a starting shade position based on previous positions of different portions of a shading object. In addition, a shading object computing device 860 may also consider current environmental factors when making recommendations of a shading object starting position and/or positions throughout a day. In addition, a computing device 860 may consider environmental factors and/or sensor readings and provide a recommendation of when sunburn may occur if 1) no sunscreen is used; 2) sunscreen with a specific sun protection factor (SPF) is used; and/or 3) sunscreen is used in a partly cloudy environment.

In embodiments, a computing device 860 integrated into a shading object or umbrella may communicate with or interface with an external artificial intelligence system, such as the Amazon Alexa system or the Google Now system. In embodiments, a user may speak into a microphone located on or integrated within a shading object central support assembly 107 (for example) and ask questions or make requests. These voice signals are converted by the shading object computing device 860 and/or a voice recognition engine or module 815, as discussed previously, and communicated to an external artificial intelligence system (Amazon Alexa and/or Google Now) via a wireless transceiver, a PAN transceiver, and/or a wireless hotspot. In embodiments, a shading object computing device 860 may also comprise an artificial intelligence engine, which may be located on a computing device PCB and perform similar functions to an external artificial intelligence engine (such as Amazon Alexa and/or Google Now). In embodiments, an external artificial intelligence engine may responds to requests, transfer requests to other application servers for processing, and/or perform analysis based on a user request. After an action has been performed and responses and/or confirmations obtained, the external artificial intelligence engine may communicate the responses, answers, and/or confirmations to a shading object computing device. An integrated computing device may provide the responses, answer, and/or confirmations to an individual via a sound reproducing apparatus (e.g., speakers) and/or a visual display apparatus (display, monitor, and/or screen).

In embodiments, a shading computing device may also detect obstacles in a shading area of the shading object. In embodiments, an obstacle may be in a path or orbit of where a shading object may be moving (e.g., a person may be located in an area where shading arm supports are to be deployed and/or a lamp or other object may be in an area where an upper assembly of the central support assembly is being moved in response to a command. In embodiments, a shading object computing device 860 may receive an image or images from one or more shading object camera. In embodiments, a shading object computing device 860 may analyze the captured images and determine if a person and/or object (e.g., an obstacle) is in a path of travel of one or more shading object components. If a shading object computing system determines an obstacle is present, a notification may be communicated to an individual. In embodiments, a notification is sent to a sound system, and an alarm and/or voice warning may be sent out over a shading object speaker. In embodiments, a notification may be sent to a control panel and/or a portable electronic device and a communicated notification message may be displayed to a user. In embodiments, a shading object computing device may communicate commands, instructions and/or signals to controllers and/or controller PCBs to cause motors (e.g., a first, second or third motor) to stop movement, or to redirect movement away from a located obstacle. In embodiments, a shading object computing device 860 may continue to communicate notifications and/or commands, instructions and/or signals until an obstacle moves away from an area of concern (or shading area) or is removed from an area of concern (or shading area). In embodiments, a shading object computing device may also receive notifications, commands, instructions and/or signals from proximity sensors and/or motion sensors, and identify if an obstacle is in a movement path of one or more of a shading objects assemblies and/or components. If a shading object computing device 860 identifies an obstacle, then, as discussed above, notifications may be sent to portable electronic devices and/or sound systems, and commands, instructions, and/or signals may be communicated to controllers and/or controller PCBs for motors in order to stop a motor's operation and/or redirect a direction of an assembly's movement path.

In embodiments, multiple shading objects may be coupled together. In embodiments, by coupling multiple shading objects together mechanically and/or electrically, an individual may be able to operate and control intelligent shading objects or umbrellas in unison (e.g., in other words, same or similar commands, instructions, and/or signals may be sent to multiple shading objects by a single control computing device). In addition, if solar cells are generating an excess power, e.g., more than is necessary for a single rechargeable battery, excess power may be transferred to a rechargeable battery in another shading object coupled to an original shading object. In embodiments, if there is excess power generated by solar cells in a number of coupled shading objects and other local shading objects may not utilize the power, a shading object may transfer and/or relay excess power to an electricity grid and an individual may receive discounts and/or credits for any power delivered back to a grid. In embodiments, a portable electronic device, through a shading object mobile application, may control multiple coupled shading objects. In embodiments, a laptop or other computing device may control multiple coupled shading objects. In embodiments, multiple shading objects may communicate with each other via a personal area network. In embodiments, multiple shading objects may communicate with each other via wireless LAN transceivers.

In embodiments, a cable comprising data, control and power lines may be connected and/or attached between shading objects. In embodiments, a cable may be housed in a base assembly 105 and may extend to a power connector on another shading object. In embodiments, a cable may be housed in a stem assembly 106 and/or a center support assembly 107 and may extend to a power connector on another shading object.

In embodiments, a shading object may comprise an automatic button and a manual button. In embodiments, if a manual button is depressed and/or selected, a shading object may need to be operated in a manual fashion. In embodiments, a shading object may comprise a shutoff button or actuator. In embodiments, if an emergency situation occurs and a shading object needs to be deactivated and/or retracted, then an individual can press the shutoff button or actuator. For example, if high winds occur, a fire is in the area, or all wireless communications are cut off, an individual can immediately deactivate and/or shutdown a shading object.

In embodiments, a base assembly may also a base motor controller PCB, a base motor, a drive assembly and/or wheels. In embodiments, a base assembly may move to track movement of the sun, wind conditions, and/or an individual's commands. In embodiments, a shading object movement control PCB may send commands, instructions, and/or signals to a base assembly identifying desired movements of a base assembly. In embodiments, a shading computing device system (including a SMARTSHADE and/or SHADECRAFT application) or a desktop computer application may transmit commands, instructions, and/or signals to a base assembly identifying desired movements of a base assembly. In embodiments, a base motor controller PCB may receive commands, instructions, and/or signals and may communicate commands and/or signals to a base motor. In embodiments, a base motor may receive commands and/or signals, which may result in rotation of a motor shaft. In embodiments, a motor shaft may be connected, coupled, or indirectly coupled (through gearing assemblies or other similar assemblies) to one or more drive assemblies. In embodiments, a drive assembly may be one or more axles, where one or more axles may be connected to wheels. In embodiments, for example, a base assembly may receive commands, instructions and/or signal to rotate in a counter-clockwise direction approximately 15 degrees. In embodiments, for example, a motor output shaft would rotate one or more drive assemblies rotate a base assembly approximately 15 degrees. In embodiments, a base assembly may comprise more than one motor and/or more than one drive assembly. In this illustrative embodiment, each of motors may be controlled independently from one another and may result in a wider range of movements and more complex movements.

In embodiments, a shading object may also comprise a wind turbine 866. In embodiments, one or more wind turbines 866 may be installed and/or positioned on a shading fabric 715, shading object arms/blades 109, and/or arm support assemblies 108. In embodiments, one or more wind turbines may be installed and/or positioned on a central support assembly. In embodiments, one or more wind turbines 866 may comprise one or more propeller-like blades, which are turned my energy of the wind. In embodiments, one or more blades may be moved about a rotor, which is connected to a shaft, causing rotation of a shaft. Rotation of a shaft may spin a generator which results in generation of electricity (e.g., voltage and/or current). In embodiments, a wind turbine generator 866 may be connected to a rechargeable battery 820 and may supply power to recharge a battery. In embodiments, a wind turbine generator 866 may be connected to other shading object components and provide power (e.g., voltage and/or current) to other shading object components.

In embodiments, a shading object stem assembly 106 may be comprised of stainless steel. In embodiments, a shading object stem may be comprised of a plastic and/or a composite material, or a combination of materials listed above. In embodiments, a shading object stem assembly 106, a base assembly 105, and/or a center support assembly 107 may be comprised and/or constructed by a biodegrable material. In embodiments, a shading object stem assembly 106 may be tubular with a hollow inside except for shelves, ledges, and/or supporting assemblies. In embodiments, a shading object stem assembly 106 may have a coated inside surface. In embodiments, a shading object stem assembly 106 may have a circular circumference or a square circumference. In embodiments, a shading object stem assembly 106 may be a separate physical structure from a shading object center support assembly 107. In embodiments, a shading object stem assembly and a shading object or umbrella center support assembly may be one physical structure. In embodiments, for example, a shading object stem assembly 106 and a shading object center support assembly 107 may be comprised of one extruded material (e.g., a single tubular structure of, for example, stainless steel).

In embodiments, a shading object center support assembly 107 may be comprised of stainless steel. In embodiments, a shading object center support assembly 107 may be comprised of a metal, plastic and/or a composite material, or a combination thereof. In embodiments, a shading object center support assembly 107 may be comprised of wood, steel, aluminum or fiberglass. In embodiments, a shading object center support assembly may be a tubular structure, e.g., may have a circular or an oval circumference. In embodiments, a shading object center support assembly 107 may be a rectangular or triangular structure with a hollow interior. In embodiments, a hollow interior of a shading object center support assembly 107 may have a shelf or other structures for holding or attaching assemblies, PCBs, and/or electrical and/or mechanical components. In embodiments, for example components, PCBs, and/or motors may be attached or connected to an interior wall of a shading object center assembly.

In embodiments, a plurality of arms/blades 109 and/or arm support assemblies 108 may be composed of materials such as plastics, plastic composites, fabric, metals, woods, composites, or any combination thereof. In an example embodiment, arms/blades 109 and/or arm support assemblies 109 may be made of a flexible material. In an alternative example embodiment, arms/blades 109 and/or arm support assemblies 108 may be made of a stiffer material.

In embodiments, a shading object center support assembly 107 may also include a light sensor (not shown). In embodiments, an illumination or projection source that can project light and/or videos onto surfaces of a shading object, arms/blades and/or shading fabric. Although the description above corresponds to the intelligent umbrella of FIGS. 1A and 1B, the description applies to similar components and/or assemblies in the intelligent shading charging system of FIG. 1C.

In embodiments, a center support assembly 107 may comprise an audio transceiver 865 and/or speakers 875. An audio device, such as an iPhone, a digital music player, or the like, may be electronically coupled to the audio transceiver 865 and transmit and/or receive audio signals from the audio device. In an embodiment, an audio transceiver 865 may receive audio signals and transfer audio signals to the speakers 875 so that speakers may reproduce and play sound for shading object users to hear. In an embodiment, audio signals may be transmitted wirelessly between the audio device and the audio transceiver 865, and/or the audio receiver 865 and the speaker 875.

Figure 13A:
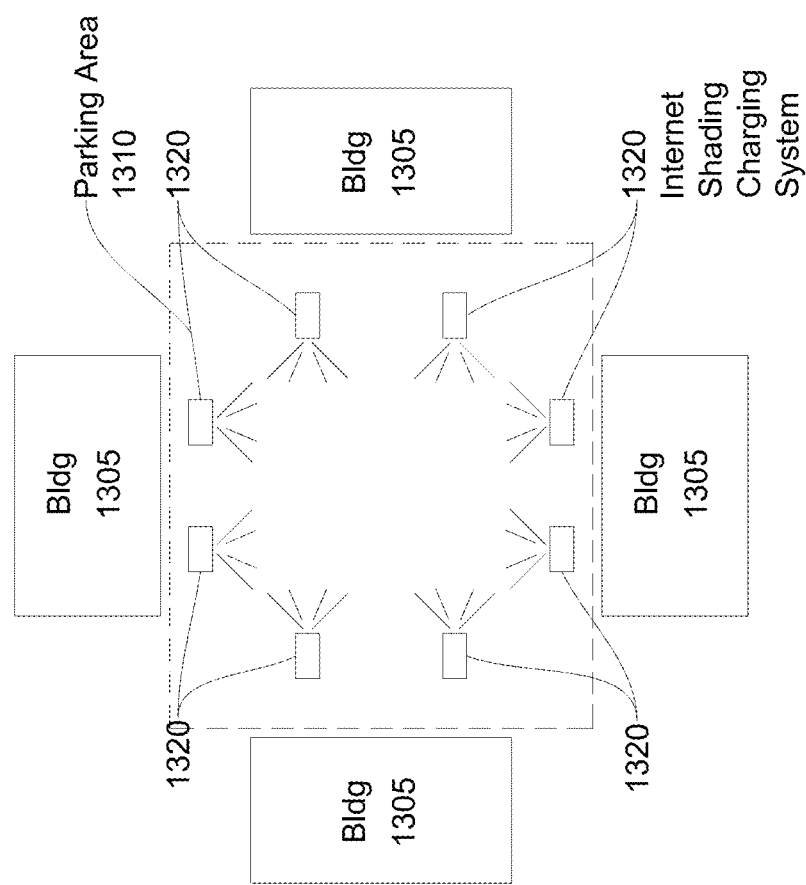

FIGS. 13A and 13B illustrates placements of intelligent shading charging systems in outdoor locations according to embodiments. Placement of intelligent shading charging systems are described in detail in non-provisional patent application Ser. No. 15/212,173, filed Jul. 15, 2016, entitled "Intelligent Charging Shading Systems," which is hereby incorporated by reference.

Figure 13C:
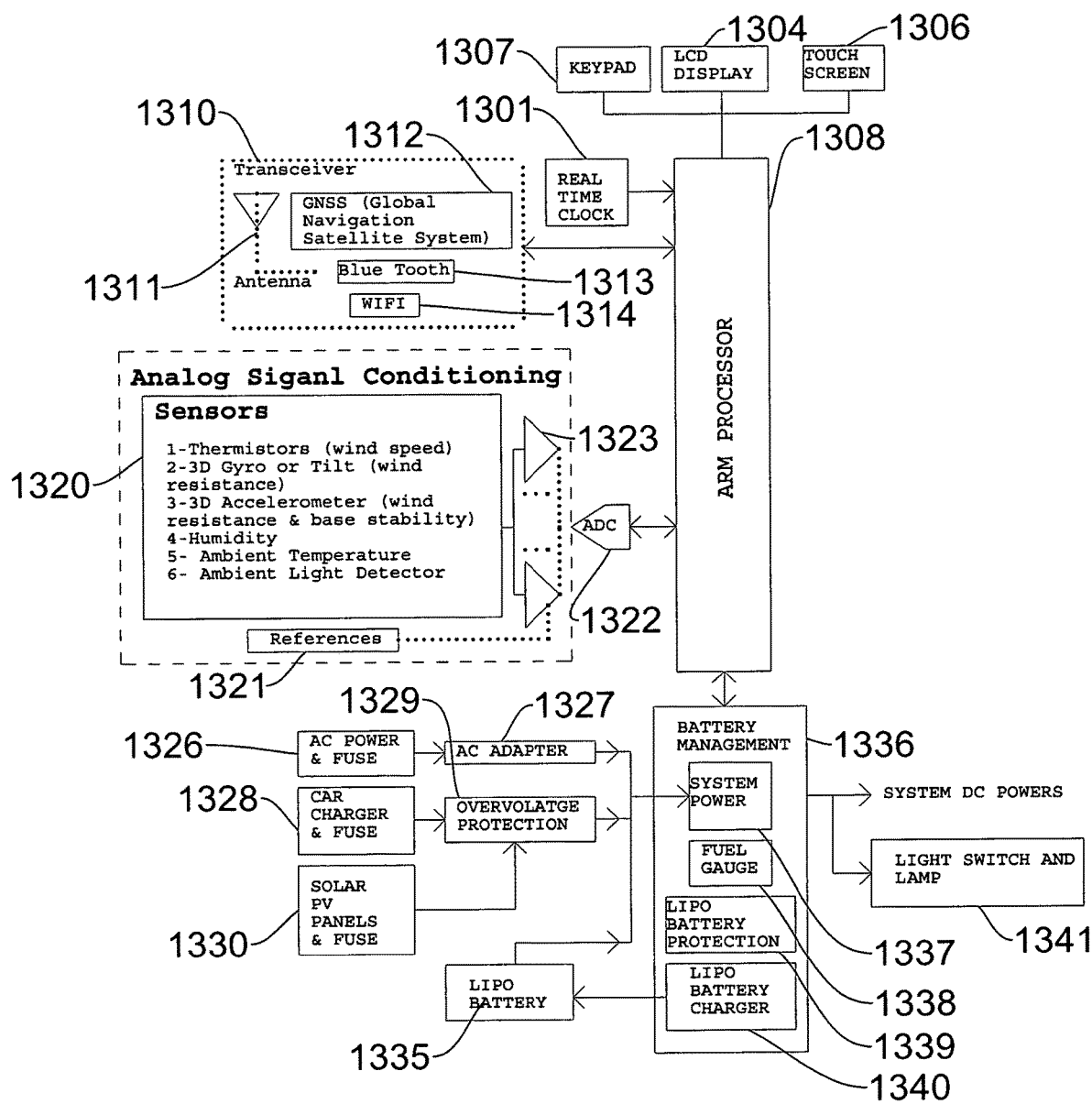
FIGS. 13C and 13D illustrates components and assemblies of a shading object umbrella according to embodiments
Figure 13D:
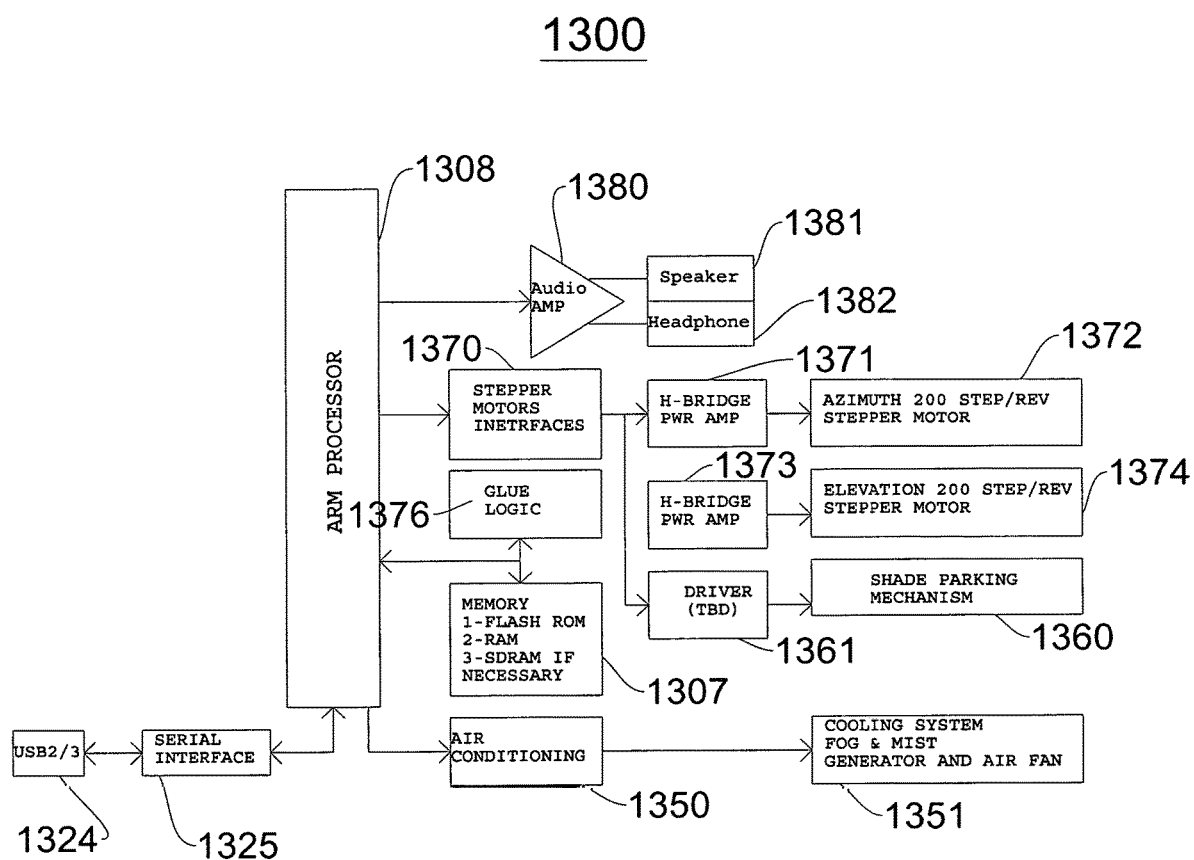

FIGS. 13C and 13D is a block diagram of multiple components within a shading object. In embodiments, multiple components of a shading object and/or intelligent umbrella are described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device," both of which are hereby incorporated by reference.

Figure 14A:
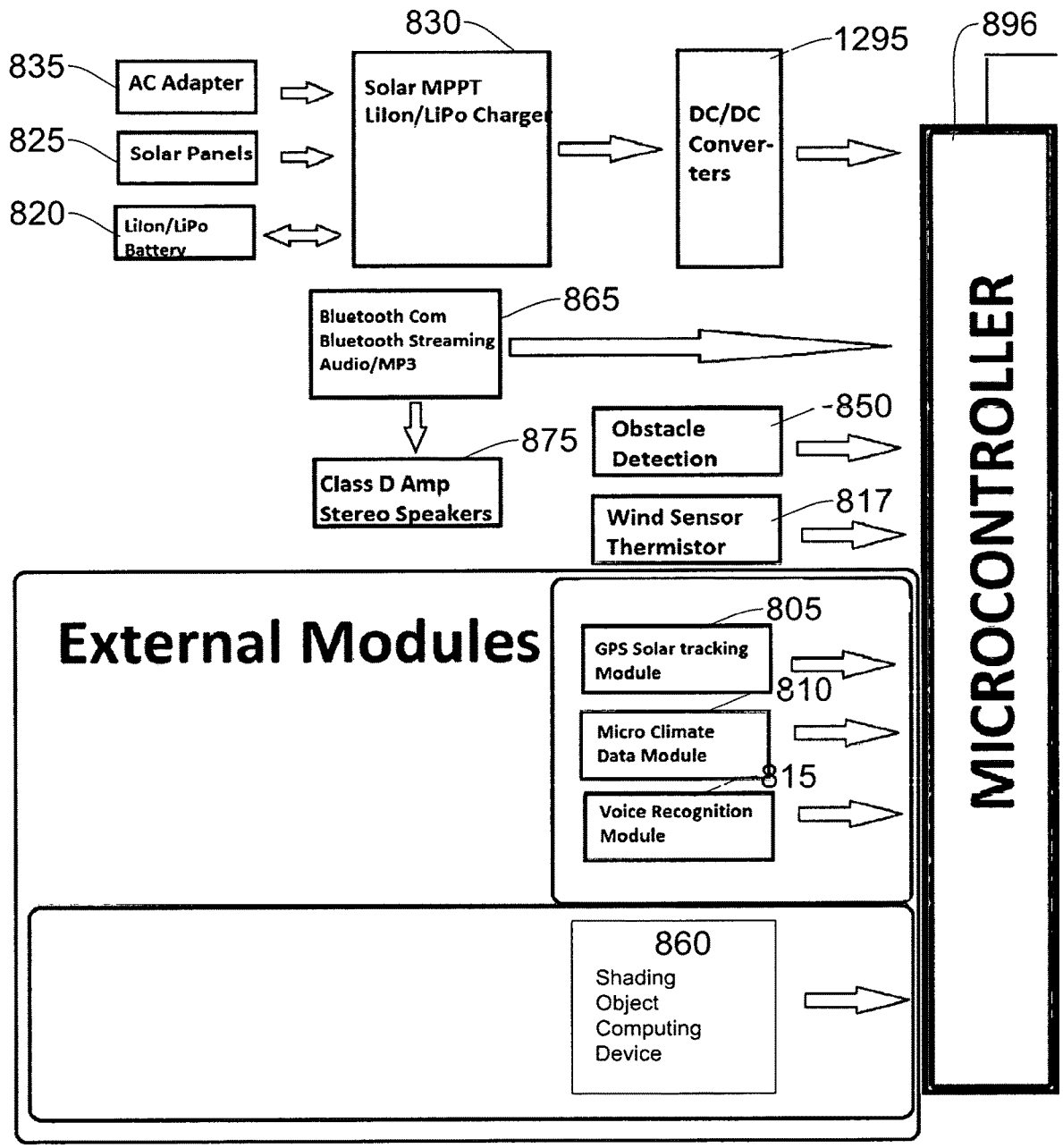
FIGS. 14A AND 14B are a block diagram of multiple assemblies and components or a shading object, intelligent umbrella, or intelligent shading charging system according to embodiments
Figure 14B:
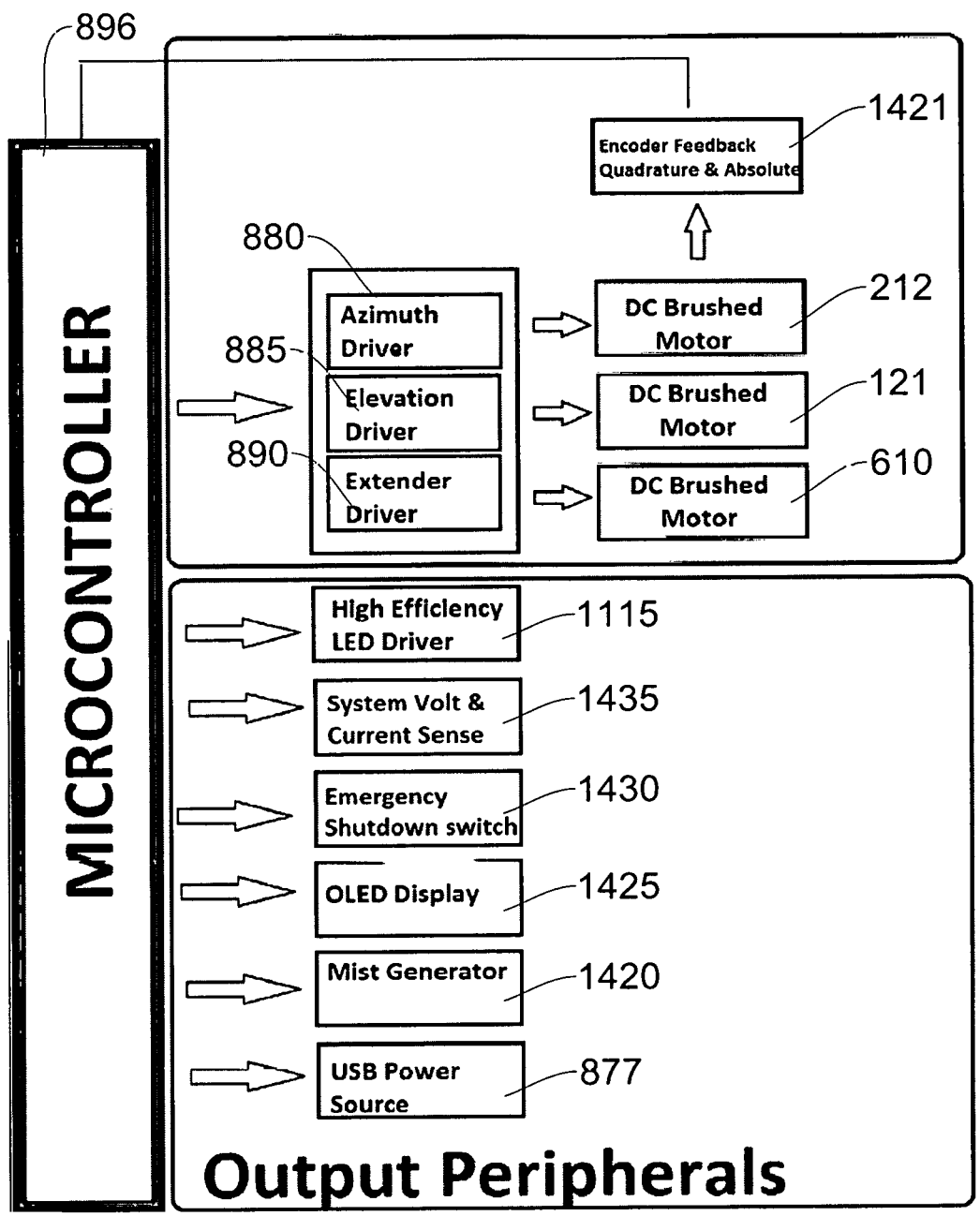

FIGS. 14A and 14B are block diagrams and flow diagrams of a shading object according to embodiments. In embodiments, a shading object 1400 comprises a microcontroller 896, a GPS solar tracking module 805, a micro climate data module 810, a voice recognition module 815. In embodiments, a shading object includes a Bluetooth transceiver 865, class D amplifier and stereo speakers 875, an AC adapter 835, arrays of solar panels 825, a LiIon/LiPo rechargeable battery 820, a solar MPPT LiIon/LiPo Charger or Charging Assembly 830, and DC-to-DC converters 1295. In embodiments, a shading object comprises an obstacle detection module 850 and a wind sensor thermistor 817. In embodiments, a microcontroller 896 may be coupled to an azimuth driver or motor controller 880, an elevation driver or motor controller 885, an extender driver or motor controller 890, each of which are respectively coupled to a respective DC Brushed motor 212, 121 and 610. In embodiments, one or more of the DC brushed motors 212, 121 and 610 are coupled and/or connected to an encoder feedback quadrature and absolute module 1421. In embodiments, an encoder feedback quadrature and absolute module 1421 provides positioning and/or location information about how far a DC brushed motor 212 and/or gearbox assemblies or linear actuators have moved in response to commands, instructions, and/or signals from, for example, the azimuth driver 880. This location and/or position information may be feedback to a microcontroller or processor 896 and the microcontroller/processor 896 may adjust the commands, instructions and/or signals directed to, for example, the azimuth driver 880.

In embodiments, a shading object and/or umbrella may comprise a high efficiency LED driver 1115 and LED lights, a system volt and current sense module and/or circuit 1435, an emergency shutdown switch 1430, a display (e.g., OLED display) 1425, a mist generator system 1420, and/or a USB power source. In embodiments, a user may depress an emergency shutdown switch 1430 to kill or top operations of a shading object. In embodiments, an emergency shutdown switch and/or an on/off switch may be pressed or depressed to resume and/or restart operation. This allows an operator and/or individual to stop movement and/or operation of a shading object in emergency situations, such as when electrical mechanical components and/or computing systems are not operating.

In embodiments, a shading object and/or umbrella may comprise a system volt & current sense circuit 1435 to determine if a shading object is operating outside recommended settings, which may result in dangerous operations. If an out-of-threshold condition is detected by a volt and current sense circuit 1435, a shading object controller may send a shutdown or minimize operation command, instruction and/or signal. This feature may be beneficial if a power source is experiencing spikes and/or surges and may protect components and/or assemblies of a shading object. In addition, a volt and current sense circuit 1435 may sense if components and/or assemblies are drawing too much power (and thus causing dangerous conditions) and may cause commands to be sent from the motion control PCB 895 to stop and/or minimize operations. In addition, a voltage and current sense circuit 1435 may communicate, e.g., via the motion control PCB 895 or directly, alert commands, signals, instructions and/or messages to a sound reproduction system (amplifier and or speaker 875) and/or a display device (e.g., OLED display 1425).

In embodiments, an AC adapter 835 and one or more arrays of solar panels 825 may connect and/or plug-in to a charging assembly 830. In embodiments, a charging assembly 830 may comprise a MPPT LiIon/LiPo Charging Assembly or Charger. In embodiments, a charging assembly 830 may provide power to and/or charge a rechargeable battery. In embodiments, a rechargeable battery 820 may be a LiIon/LiPro rechargeable battery 820. In embodiments, an AC adapter 830 and one or more arrays of solar panels 825 may charge a rechargeable battery 820 (either directly or indirectly). In some circumstances, a power draw (e.g., a voltage and/or current draw) may be too great for only one of the AC adapter 830 or one or more arrays of solar panels 825 to provide power. For example, if one or more assemblies of the intelligent shading object is moving, a large amount of current is needed to power the motor and/or assemblies and neither the AC adapter nor array of solar panels may provide this power. In embodiments, a charging assembly 830 may provide power to one or more DC-to-DC converters 1295. In embodiments, a rechargeable battery may provide power to one or more DC-to-DC converters 1295. In embodiments, DC-to-DC converters 1295 may provide power (e.g., voltage and/or current) to other assemblies and/or components in the intelligent shading object or umbrella. For example, the DC-to-DC converter 1296 may provide power to a motion control PCB 895, any of the motor assemblies, a computing device 860, and/or a sensor module 805 housing telemetry sensors and/or weather variable sensors. In embodiments, some other components may be self-powered, e.g., include and/or integrate batteries. In embodiments, an intelligent shading object may also include power storage components, e.g., capacitors. In embodiments with power storage components, an AC adapter and/or one or more solar arrays may provide power to a power storage components and the power storage components may provide power to a rechargeable batteries 820. In embodiments, an AC adapter 835 and/or arrays of solar panels 825 may provide power to a rechargeable battery 820, and a rechargeable battery 820 may provide power to power storage components. Continuing with this illustrative embodiment, power storage components may be coupled and/or connected to DC-to-DC converters 1295 to provide power to intelligent shading objects assemblies and components. This provides benefit of an intelligent shading object being able to compensate for high current flow during operations and not having to deal with charge/discharge cycles of a rechargeable battery. In embodiments, a charging assembly 830 may monitor power input (e.g., amount of current flow) from a power source (e.g., AC adapter and/or one or more array of solar cells. In embodiments, a charging assembly may communicate a value and/or measurement (in response to a request or command asking for current level) indicating an amount of charge remaining in a rechargeable battery 820 (e.g., a current level). In embodiments, a charging assembly 830 may also monitor solar panel array output and/or efficiency as well as AC power quality.

Some discussions may be focused on single shading objects, intelligent umbrellas, and/or intelligent shading charging systems. However, descriptions included herein may be applicable to multiple shading objects, intelligent umbrellas and/or intelligent shading charging systems. In addition, while discussions may be directed to a software application or process executing on a computing device of a shading object, intelligent umbrella and/or intelligent shading charging system and controlling one shading object, intelligent umbrella and/or intelligent shading charging system, the descriptions also apply to controlling and/or communicating with multiple shading objects, intelligent umbrellas and/or intelligent charging systems.

A computing device may be a server, a computer, a laptop computer, a mobile computing device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually, such as parallel and serial port interfaces, a universal serial bus (USB) interface, and the like.

Memory, in a computing device and/or an intelligent shading object system, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, e.g., memory 1004, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Persistent storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, or a mobile operating system, such as iOS, Android, or Windows Mobile, or the like. A computing device, or a processor or controller in an intelligent shading controller may include or may execute a variety of possible applications, such as a software applications enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A computing device or a processor or controller in an intelligent shading object may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing the optical device (e.g., camera, scanner, optical reader) within a mobile computing device.

Network link typically provides information communication using transmission media through one or more networks to other devices that use or process the information. For example, network link may provide a connection through a network (LAN, WAN, Internet, packet-based or circuit-switched network) to a server, which may be operated by a third party housing and/or hosting service. For example, the server may be the server described in detail above. The server hosts a process that provides services in response to information received over the network, for example, like application, database or storage services. It is contemplated that the components of system can be deployed in various configurations within other computer systems, e.g., host and server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. An intelligent shading umbrella, comprising:
a processor;
a base assembly;
a stem assembly coupled to a base assembly;
a central support assembly coupled to a stem assembly, the central support assembly comprising one or more arm support assemblies and the central support assembly further comprising an upper support assembly, a lower support assembly and a hinging assembly;
one or more blades, coupled to the arm support assemblies; and
an infrared receiver, the infrared receiver to receive signals from a remote device and to communicate signals to control movement of the intelligent shading umbrella, wherein the processor a) to communicate signals to a first motor controller to control rotation of the stem assembly with respect to the base assembly about an azimuth axis; b) the processor to communicate signals to a second motor controller to control movement of the upper support assembly with respect to the lower support assembly via the hinging assembly; and
wherein a first motor and a gearbox assembly are located within the base assembly and coupled together and a rotation of the first motor causes rotation of the gearbox assembly, which causes the stem assembly, the central support assembly, and the one or more blades to rotate with respect to the base assembly, and
wherein the processor communicates signals to a third motor controller to control movement of the arm support assemblies and the one or more blades.

2. An intelligent shading umbrella, comprising:
a processor;
a base assembly;
a stem assembly coupled to a base assembly;
a central support assembly coupled to a stem assembly, the central support assembly comprising one or more arm support assemblies;
one or more blades, coupled to the arm support assemblies; and
an infrared receiver, the infrared receiver to receive signals from a remote device and to communicate signals to control movement of the intelligent shading umbrella,
wherein a first motor and a gearbox assembly are located within the base assembly and coupled together and a rotation of the first motor causes rotation of the gearbox assembly, which causes to the stem assembly to rotate with respect to the base assembly
and wherein the processor to communicate: a) signals to a first motor controller to control rotation of the stem assembly with respect to the base assembly about an azimuth axis; b) communicate signals to a second motor controller to control movement of the center support assembly; c) communicate signals to a third motor controller to control movement of the arm support assemblies and the one or more blades and d) communicate signals to a third motor controller to control deployment of arm support assemblies and/or the one or more blades to an open position that is perpendicular to a resting or closed position.

3. The intelligent shading umbrella of claim 1, further comprising a USB power assembly, the USB power assembly to provide power to an electronic device coupled to the USB power assembly.

4. The intelligent shading umbrella of claim 1, further comprising one or more solar power cells, the solar power cells to generate power for the intelligent umbrella.

5. The intelligent shading umbrella of claim 4, further comprising a rechargeable battery, the one or more solar power cells coupled to a charging assembly that charges the rechargeable battery.

6. The intelligent shading umbrella of claim 1, further comprising a DC power supply port, the DC power supply port to couple to a DC power supply and to recharge the rechargeable battery.

7. The intelligent shading umbrella of claim 1, further comprising a DC power system.

8. An intelligent shading umbrella, comprising:
a processor;
a base assembly;
a stem assembly coupled to a base assembly;
a central support assembly coupled to a stem assembly, the central support assembly comprising one or more arm support assemblies and the central support assembly further comprising an upper support assembly, a lower support assembly and a hinging assembly;
one or more blades, coupled to the arm support assemblies;
an infrared receiver, the infrared receiver to receive signals from a remote device and to communicate signals to control movement of the intelligent shading umbrella, wherein the processor a) to communicate signals to a first motor controller to control rotation of the stem assembly with respect to the base assembly about an azimuth axis; b) the processor to communicate signals to a second motor controller to control movement of the upper support assembly with respect to the lower support assembly via the hinging assembly; and
further comprising a remote control docking port, the remote control docking port connecting to a remote control,
wherein a first motor and a gearbox assembly are located within the base assembly and coupled together and a rotation of the first motor causes rotation of the gearbox assembly, which causes the stem assembly, the central support assembly, and the one or more blades to rotate with respect to the base assembly.

9. The intelligent shading umbrella of claim 8, wherein the remote control docking port recharges a remote control.

10. The intelligent shading umbrella of claim 1, further comprising a proximity sensor, the proximity sensor to detect an object or individual being present within an area around the intelligent shading umbrella, and to prevent moving the intelligent shading umbrella to a closed position if the object or individual is present in the area surrounding the intelligent shading umbrella.

* * * * *